US011841449B2

(12) United States Patent
Kumar et al.

(10) Patent No.: US 11,841,449 B2
(45) Date of Patent: Dec. 12, 2023

(54) METHOD AND APPARATUS FOR 5G POSITIONING ACCURACY IMPROVEMENT IN PRESENCE OF PHASE NOISE

(71) Applicant: QUALCOMM Incorporated, San Diego, CA (US)

(72) Inventors: Mukesh Kumar, Hyderabad (IN); Guttorm Ringstad Opshaug, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/869,394

(22) Filed: Jul. 20, 2022

(65) Prior Publication Data

US 2022/0365164 A1 Nov. 17, 2022

Related U.S. Application Data

(63) Continuation of application No. 16/846,097, filed on Apr. 10, 2020, now Pat. No. 11,422,223.

(30) Foreign Application Priority Data

Oct. 10, 2019 (IN) .............................. 201921040916

(51) Int. Cl.
*G01S 5/02* (2010.01)
*H04W 64/00* (2009.01)

(52) U.S. Cl.
CPC ........... *G01S 5/0221* (2013.01); *H04W 64/00* (2013.01)

(58) Field of Classification Search
None
See application file for complete search history.

(56) References Cited

U.S. PATENT DOCUMENTS 5,045,861 A * 9/1991 Duffett-Smith ........... G01S 5/02
342/463
2004/0260506 A1* 12/2004 Jones ...................... G01S 11/02
702/150

(Continued)

FOREIGN PATENT DOCUMENTS

GB 2569699 A * 6/2019 ............. H04L 27/14
WO WO-2018204756 A1 * 11/2018 ......... H04B 10/6165

(Continued)

OTHER PUBLICATIONS

3GPP TSG RAN WG1 Meeting #101 R1-2003642 e-meeting, May 25-Jun. 5, 2020 (Year: 2020).*

(Continued)

*Primary Examiner* — Nizar N Sivji
(74) *Attorney, Agent, or Firm* — Procopio, Cory, Hargreaves & Savitch LLP

(57) ABSTRACT

A mobile device and base station are enabled to support improved positioning accuracy in the presence of phase noise in high frequency radio network, such as in 5G New Radio network operating in mmWave. Phase Tracking Reference Signal (PTRS) may be transmitted with Positioning Reference Signals (PRS) and used for positioning and/or used to correct the phase offset between symbols in the PRS. A request may be made to transmit PTRS alone or with the PRS, or that the PRS is transmitted with a specific PRS frame structure, e.g., with a specific comb value, that minimizes the impact of phase noise. The PTRS or a phase ramp of the staggered symbols in the PRS may be used to estimate and correct the phase offset. Less than all of the symbols transmitted in the PRS may be used to generate positioning measurements to minimize the impact of phase noise.

18 Claims, 20 Drawing Sheets

(56) References Cited

U.S. PATENT DOCUMENTS

| | | | |
|---|---|---|---|
| 2010/0260154 A1* | 10/2010 | Frank | G01S 5/10 |
| | | | 370/336 |
| 2010/0331009 A1* | 12/2010 | Krishnamurthy | G01S 5/0236 |
| | | | 455/456.1 |
| 2014/0064238 A1* | 3/2014 | Zancho | H04L 25/022 |
| | | | 370/330 |
| 2017/0134199 A1 | 5/2017 | Wang et al. | |
| 2017/0339658 A1* | 11/2017 | Wang | G01S 5/021 |
| 2018/0017661 A1 | 1/2018 | Morioka | |
| 2018/0020423 A1* | 1/2018 | Wang | H04W 64/00 |
| 2018/0054340 A1 | 2/2018 | Rico Alvarino et al. | |
| 2019/0238247 A1* | 8/2019 | Lee | H04L 27/12 |
| 2019/0285722 A1 | 9/2019 | Markhovsky et al. | |
| 2019/0288888 A1* | 9/2019 | Rico Alvarino | H04L 5/0048 |
| 2019/0305901 A1 | 10/2019 | Opshaug et al. | |
| 2019/0356463 A1 | 11/2019 | Zhang et al. | |
| 2019/0379509 A1 | 12/2019 | Stauffer et al. | |
| 2020/0052740 A1 | 2/2020 | Zhang et al. | |
| 2021/0109188 A1 | 4/2021 | Kumar et al. | |
| 2021/0320769 A1* | 10/2021 | Cha | G01S 5/06 |

FOREIGN PATENT DOCUMENTS

| | | |
|---|---|---|
| WO | 2018228868 A1 | 12/2018 |
| WO | WO-2021056588 A1 * | 4/2021 |

OTHER PUBLICATIONS

ETSI TS 136 211 V9.1.0 (Apr. 2010) (Year: 2010).*

Impact of Frequency-Hopping NB-IoT Positioning in 4G and Future 5G Networks—2017 (Year: 2017).*

International Preliminary Report on Patentability—PCT/US2020/046435 The International Bureau of WIPO—Geneva, Switzerland, Apr. 21, 2022.

International Search Report and Written Opinion—PCT/US2020/046435—ISA/EPO—Oct. 21, 2020.

Yinan Qi., et al., "On the Phase Tracking Reference Signal (PT-RS) Design for 5G New Radio (NR)", arxiv.org, Cornell University Library, 201 Olin Library Cornell University Ithaca, NY 14853, Jul. 19, 2018 (Jul. 19, 2018), XP081246672, the whole document, 6 pages.

* cited by examiner

METHOD AND APPARATUS FOR 5G POSITIONING ACCURACY IMPROVEMENT IN PRESENCE OF PHASE NOISE

CROSS-REFERENCE TO RELATED APPLICATIONS

This application is a continuation of U.S. Ser. No. 16/846,097, entitled "METHOD AND APPARATUS FOR 5G POSITIONING ACCURACY IMPROVEMENT IN PRESENCE OF PHASE NOISE," filed Apr. 10, 2020, which claims under 35 USC § 119 the benefit of and priority to India Provisional Application No. 201921040916, filed Oct. 10, 2019, and entitled "METHOD AND APPARATUS FOR 5G POSITIONING ACCURACY IMPROVEMENT IN PRESENCE OF PHASE NOISE," both of which are assigned to the assignee hereof and are incorporated herein by reference in their entireties.

BACKGROUND

Field

The subject matter disclosed herein relates to wireless communications systems, and more particularly to methods and apparatuses for position location of a mobile device.

Relevant Background

It is often desirable to know the location of a mobile device such as a cellular phone, or other wireless communication device. For example, a location services (LCS) client may desire to know the location of a mobile device in the case of an emergency services call or to provide some service to the user of the mobile device such as navigation assistance, direction finding, or asset tracking. The terms "location", "location estimate", "position", "position estimate" and "position fix" are synonymous and are used interchangeably herein.

SUMMARY

A mobile device and base station are enabled to support improved positioning accuracy in the presence of phase noise in high frequency radio network, such as in 5G New Radio network operating in mmWave. Phase Tracking Reference Signal (PTRS) may be transmitted with Positioning Reference Signals (PRS) and used for positioning and/or used to correct the phase offset between symbols in the PRS. A request may be made to transmit PTRS alone or with the PRS, or that the PRS is transmitted with a specific PRS frame structure, e.g., with a specific comb value, that minimizes the impact of phase noise. The PTRS or a phase ramp of the staggered symbols in the PRS may be used to estimate and correct the phase offset. Less than all of the symbols transmitted in the PRS may be used to generate positioning measurements to minimize the impact of phase noise.

A method of estimating a position of a mobile device performed by an entity in a wireless network, includes receiving reference symbols transmitted by one or more second entities in the wireless network; estimating phase offsets between each symbol relative to an anchor symbol in the reference symbols resulting from clock changes; and generating positioning measurements using the phase offsets in the reference symbols for estimating the position of the mobile device.

An entity in a wireless network capable of estimating a position of a mobile device, includes an external interface for receiving and sending messages; at least one memory; and at least one processor coupled to the external interface and the at least one memory, the at least one processor configured to: receive reference symbols transmitted by one or more second entities in the wireless network; estimate phase offsets between each symbol relative to an anchor symbol in the reference symbols resulting from clock changes; and generate positioning measurements using the phase offsets in the reference symbols for estimating the position of the mobile device.

An entity in a wireless network capable of estimating a position of a mobile device, includes means for receiving reference symbols transmitted by one or more second entities in the wireless network; means for estimating phase offsets between each symbol relative to an anchor symbol in the reference symbols resulting from clock changes; and means for generating positioning measurements using the phase offsets in the reference symbols for estimating the position of the mobile device.

A non-transitory computer readable storage medium including program code stored thereon, the program code is operable to configure at least one processor in an entity for supporting estimating a position of a mobile device, includes program code to receive reference symbols transmitted by one or more second entities in the wireless network; program code to estimate phase offsets between each symbol relative to an anchor symbol in the reference symbols resulting from clock changes; and program code to generate positioning measurements using the phase offsets in the reference symbols for estimating the position of the mobile device.

A method of estimating a position of a mobile device performed by an entity in a wireless network, includes establishing a positioning session between the mobile device and a base station in the wireless network; requesting positioning reference signals are transmitted with a comb value; receiving positioning reference signals with the comb value from a second entity in the wireless network; and generating positioning measurements using the positioning reference signals with the comb value for estimating the position of the mobile device.

An entity in a wireless network capable of estimating a position of a mobile device, includes an external interface for receiving and sending messages; at least one memory; and at least one processor coupled to the external interface and the at least one memory, the at least one processor configured to: establish a positioning session between the mobile device and a base station in the wireless network; request positioning reference signals are transmitted with a comb value; receive positioning reference signals with the comb value from a second entity in the wireless network; and generate positioning measurements using the positioning reference signals with the comb value for estimating the position of the mobile device.

An entity in a wireless network capable of estimating a position of a mobile device, includes means for establishing a positioning session between the mobile device and a base station in the wireless network; means for requesting positioning reference signals are transmitted with a comb value; means for receiving positioning reference signals with the comb value from a second entity in the wireless network; and means for generating positioning measurements using the positioning reference signals with the comb value for estimating the position of the mobile device.

A non-transitory computer readable storage medium including program code stored thereon, the program code is operable to configure at least one processor in an entity for supporting estimating a position of a mobile device, includes program code to establish a positioning session between the mobile device and a base station in the wireless network; program code to request positioning reference signals are transmitted with a comb value; program code to receive positioning reference signals with the comb value from a second entity in the wireless network; and program code to generate positioning measurements using the positioning reference signals with the comb value for estimating the position of the mobile device.

A method of estimating a position of a mobile device performed by an entity in a wireless network, includes receiving positioning reference signals comprising a plurality of symbols where each symbol is comprised of a plurality of sub-carriers from a second entity in the wireless network; and generating positioning measurements using less than all of the plurality of symbols in the positioning reference signals for estimating the position of the mobile device.

An entity in a wireless network capable of estimating a position of a mobile device, includes an external interface for receiving and sending messages; at least one memory; and at least one processor coupled to the external interface and the at least one memory, the at least one processor configured to: receive positioning reference signals comprising a plurality of symbols where each symbol is comprised of a plurality of sub-carriers from a second entity in the wireless network; and generate positioning measurements using less than all of the plurality of symbols in the positioning reference signals for estimating the position of the mobile device.

An entity in a wireless network capable of estimating a position of a mobile device, includes means for receiving positioning reference signals comprising a plurality of symbols where each symbol is comprised of a plurality of sub-carriers from a second entity in the wireless network; and means for generating positioning measurements using less than all of the plurality of symbols in the positioning reference signals for estimating the position of the mobile device.

A non-transitory computer readable storage medium including program code stored thereon, the program code is operable to configure at least one processor in an entity for supporting estimating a position of a mobile device, includes program code to receive positioning reference signals comprising a plurality of symbols where each symbol is comprised of a plurality of sub-carriers from a second entity in the wireless network; and program code to generate positioning measurements using less than all of the plurality of symbols in the positioning reference signals for estimating the position of the mobile device.

A method of estimating a position of a mobile device performed by an entity in a wireless network, includes receiving positioning reference signals comprising a plurality of symbols where each symbol is comprised of a plurality of sub-carriers from a second entity in the wireless network, the plurality of symbols being staggered; determining a phase offset between each symbol relative to an anchor symbol; removing phase offset from each symbol; generating positioning measurements using the plurality of staggered symbols with removed phase offset for estimating the position of the mobile device.

An entity in a wireless network capable of estimating a position of a mobile device, includes an external interface for receiving and sending messages; at least one memory; and at least one processor coupled to the external interface and the at least one memory, the at least one processor configured to: receive positioning reference signals comprising a plurality of symbols where each symbol is comprised of a plurality of sub-carriers from a second entity in the wireless network, the plurality of symbols being staggered; determine a phase offset between each symbol relative to an anchor symbol; remove phase offset from each symbol; generate positioning measurements using the plurality of staggered symbols with removed phase offset for estimating the position of the mobile device.

An entity in a wireless network capable of estimating a position of a mobile device, includes means for receiving positioning reference signals comprising a plurality of symbols where each symbol is comprised of a plurality of sub-carriers from a second entity in the wireless network, the plurality of symbols being staggered; means for determining a phase offset between each symbol relative to an anchor symbol; means for removing phase offset from each symbol; means for generating positioning measurements using the plurality of staggered symbols with removed phase offset for estimating the position of the mobile device.

A non-transitory computer readable storage medium including program code stored thereon, the program code is operable to configure at least one processor in an entity for supporting estimating a position of a mobile device, includes program code to receive positioning reference signals comprising a plurality of symbols where each symbol is comprised of a plurality of sub-carriers from a second entity in the wireless network, the plurality of symbols being staggered; program code to determine a phase offset between each symbol relative to an anchor symbol; program code to remove phase offset from each symbol; program code to generate positioning measurements using the plurality of staggered symbols with removed phase offset for estimating the position of the mobile device.

Figure 1:
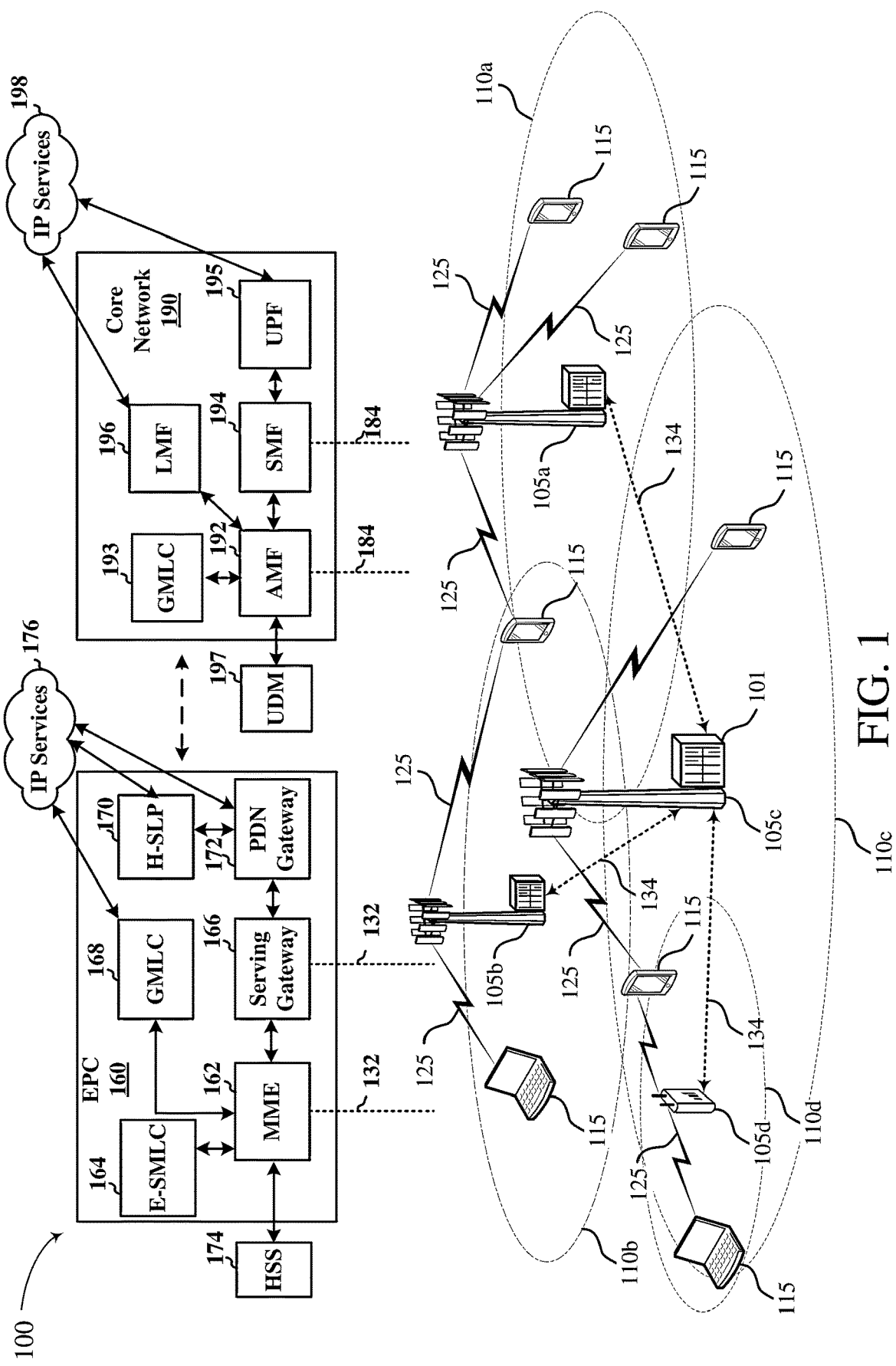
FIG. 1 shows an architecture of an exemplary system capable of providing location services to a mobile device.

Elements are indicated by numeric labels in the figures with like numbered elements in different figures representing the same element or similar elements. Different instances of a common element are indicated by following a numeric label for the common element with a distinct numeric suffix. In this case, a reference to the numeric label without a suffix indicates any instance of the common element. For example, FIG. 1 contains four distinct network cells, labelled 110*a*, 110*b*, 110*c*, and 110*d*. A reference to a cell 110 then corresponds to any of the cells 110*a*, 110*b*, 110*c*, and 110*d*.

DETAILED DESCRIPTION

The terms "mobile device", "mobile stations" (MS), "user equipment" (UE) and "target" are used interchangeably herein and may refer to a device such as a cellular or other wireless communication device, personal communication system (PCS) device, personal navigation device (PND), Personal Information Manager (PIM), Personal Digital Assistant (PDA), laptop, smartphone, tablet or other suitable mobile device which is capable of receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

In addition, the terms MS, UE, "mobile device" or "target" are intended to include all devices, including wireless and wireline communication devices, computers, laptops, etc., which are capable of communication with a server, such as via the Internet, WiFi, cellular wireless network, Digital Subscriber Line (DSL) network, packet cable network or other network, and regardless of whether satellite signal reception, assistance data reception, and/or position-related processing occurs at the device, at a server, or at another device associated with the network. Any operable combination of the above are also considered a "mobile device."

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5th Generation (5G) new radio (NR) operating in mmWave bands) network.

Radio technologies, such as 5G mmWave bands, can offer a much larger available spectrum bandwidth than older technologies, such as LTE, which is considered as one of the most promising approaches to significantly boost the capacity in 5G NR. However, devices and network radio nodes operating with high frequencies, e.g., mmWave bands, suffer from phase noise. Without correction of the phase noise, the performance of a 5G NR network could potentially suffer significant losses. For example, without correction, phase noise will have a direct effect on the accuracy of a final position fix in 5G NR network.

The present application describes mechanisms for improving positioning accuracy in 5G NR network in the presence of phase noise, for example, as illustrated in the attached appendix.

FIG. 1 illustrates a wireless communication network 100 according to embodiments of the present disclosure. The network 100 includes BSs 105, UEs 115, and one or more core networks which may be, e.g., an Evolved Packet Core (EPC) 160 (sometimes referred to as an LTE network 160) or a 5G Core (5GC) network 190 (sometimes referred to as the 5G NR network 190). In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with one or more core networks and with one another. The core networks may provide user authentication, access authorization, tracking, Internet Protocol (IP) connectivity, and other access, routing, or mobility functions.

The EPC 160, by way of example, may include a Mobility Management Entity (MME) 162, an Enhanced Serving Mobile Location Center (E-SMLC) 164, a Serving Gateway 166, a Gateway Mobile Location Center (GMLC) 168, a Home Secure User Plane Location (SUPL) Location Platform (H-SLP) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. The E-SMLC 164 may support location determination of the UEs, e.g., using the 3GPP control plane (CP) location solution. All user Internet protocol (IP) packets are transferred through the Serving Gateway 166, which itself is connected to the PDN Gateway 172. The PDN Gateway 172 provides UE IP address allocation as well as other functions. The PDN Gateway 172 is connected to the IP Services 176. The IP Services 176 may include the Internet, an intranet, an IP Multimedia Subsystem (IMS), a PS Streaming Service, and/or other IP services. The GMLC 168 may provide location access to the UE on behalf of external clients, e.g., within IP Services 176. The H-SLP 170 may support the SUPL User Plane (UP) location solution defined by the Open Mobile Alliance (OMA) and may support location services for UEs based on subscription information for the UEs stored in H-SLP 170.

The 5GC 190 may include an Access and Mobility Management Function (AMF) 192, a Gateway Mobile Location Center (GMLC) 193, a Session Management Function (SMF) 194, and a User Plane Function (UPF) 195, and a Location Management Function (LMF) 196. The AMF 192 may be in communication with a Unified Data Management (UDM) 197. The AMF 192 is the control node that processes the signaling between the UEs 104 and the 5GC 190 and which, for positioning functionality, may communicate with the LMF 196, which supports location determination of UEs. The GMLC 193 may be used to allow an external client, within IP Services 198, to receive location information regarding the UEs. All user Internet protocol (IP) packets may be transferred through the UPF 195. The UPF 195 provides UE IP address allocation as well as other functions. The UPF 195 is connected to the IP Services 198. The IP Services 198 may include the Internet, an intranet, an IP Multimedia Subsystem (IMS), a PS Streaming Service, and/or other IP services.

At least some of the BSs 105 (e.g., which may be an example of an evolved NodeB (eNB), a next generation NodeB (gNB), or an access node controller (ANC)) may interface with the core networks through backhaul links 132 and/or 184 (e.g., S1, S2, etc.) and may perform radio configuration and scheduling for communication with the UEs 115. In various examples, the BSs 105 may communicate, either directly or indirectly (e.g., through core networks), with each other over backhaul links 134 and/or 184 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into min-slots, as described in greater detail herein. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a sector identity value (e.g., 0, 1, 2, etc.). The UE 115 may then receive a secondary synchronization signal (SSS). The SSS may enable radio frame synchronization, and may provide a cell identity value, which may be combined with the PSS identity value to identify the physical cell identity. The SSS may also enable detection of a duplexing mode and a cyclic prefix length. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more System Information Blocks (SIBs). For example, SIB1 may contain cell access parameters and scheduling information for other SIB s. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In some examples, wireless communications network 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core networks 160 or 190 supporting radio bearers for user plane data. At the Physical layer, transport channels may be mapped to physical channels.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (for example, between a common control region or common search space and one or more UE-specific control regions or UE-specific search spaces).

As described herein, wireless communications network 100 may support NR and support communications between the one or more base stations 105 and supported UEs 115 using communication links 125. The UEs 115 may be dispersed throughout the wireless communications network 100, and each UE 115 may be stationary or mobile. Wireless communications network 100 may minimize always-on transmission and support forward capability, including transmission of reference signals based on a need at a base station 105 or a UE 115. As part of the communication, each of the base stations 105 and UEs 115 may support reference signal transmission for operations, including channel estimation, beam management and scheduling, and wireless device positioning within the one or more coverage areas 110.

For example, the base stations 105 may transmit one or more downlink reference signals for NR communications, including channel state information reference signal (CSI-RS) transmission. Each of the CSI-RS transmissions may be configured for a specific UE 115 to estimate the channel and report channel quality information. The reported channel quality information may be used for scheduling or link adaptation at the base stations 105 or as part of a mobility or beam management procedure for directional transmission associated with the enhanced channel resources.

In some examples, the base stations 105 may transmit one or more additional downlink reference signals for communication, including a positioning reference signal (PRS) transmission. The PRS transmission may be configured for a specific UE 115 to measure and report one or more report parameters (for example, report quantities) associated with positioning and location information. A base station 105 may use the reported information as part of a UE-assisted positioning technique. The PRS transmission and report parameter feedback may support various location services (for example, navigation systems and emergency communications). In some examples, the report parameters supplement one or more additional location systems supported by the UE 115 (such as global positioning system (GPS) technology).

A base station 105 may configure a PRS transmission on one or more PRS resources of a channel. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

Aspects of wireless communications network 100 may include use of PRS transmissions by the base station 105 or sounding reference signal (SRS) transmissions by the UE 115 for UE location determination. For downlink-based UE location determination, a location server, e.g., an LMF 196 in 5G core network 190 and E-SMLC 164 in EPC 160, may be used to provide positioning assistance, such as PRS assistance data (AD) to the UE 115. In UE-assisted positioning, the location server may receive measurement reports from the UE 115 that indicates position measurements for one or multiple base stations 105 with which location server may determine a position estimate for the UE 115, e.g., using OTDOA, or other desired techniques. In some implementations, the location server may be located at a base station 105.

A position estimation of the UE 115 may be determined using reference signals, such as PRS signals, from one or more base stations 105. Positioning methods, such as Observed Time Difference of Arrival (OTDOA), DL Time Difference of Arrival (DL-TDOA), DL Angle of Departure (DL AoD), Enhanced Cell ID (ECID) are position methods that may be used to estimate the position of the UE 115 using reference signals from base stations. OTDOA, for example, relies on measuring Reference Signal Time Differences (RSTDs) between downlink (DL) signals received from a base station for a reference cell and base station(s) for one or more neighbor cells. The DL signals for which RTSDs may be obtained comprise a Cell-specific Reference Signal (CRS) and a Positioning Reference Signal (PRS)—e.g. as defined in 3GPP TS 36.211.

Other positioning methods may use reference signals transmitted by or received by base stations. While the present disclosure may be detailed with reference to a single positioning method for brevity, it should be understood that present disclosure is applicable to multiple positioning methods, including downlink-based positioning methods, uplink based positioning methods and downlink and uplink based positioning methods. For example, other positioning methods include, e.g., downlink based positioning methods such as DL Time Difference of Arrival (DL-TDOA), DL Angle of Departure (DL AoD), Enhanced Cell ID (ECID); uplink based positioning methods, e.g., UL Time Difference of Arrival (UL-TDOA), UL Angle of Arrival (UL AoA), UL Relative Time of Arrival (UL-RTOA); and downlink and uplink based positioning methods, e.g., Round-trip time (RTT) with one or more neighboring base stations.

Figure 2:
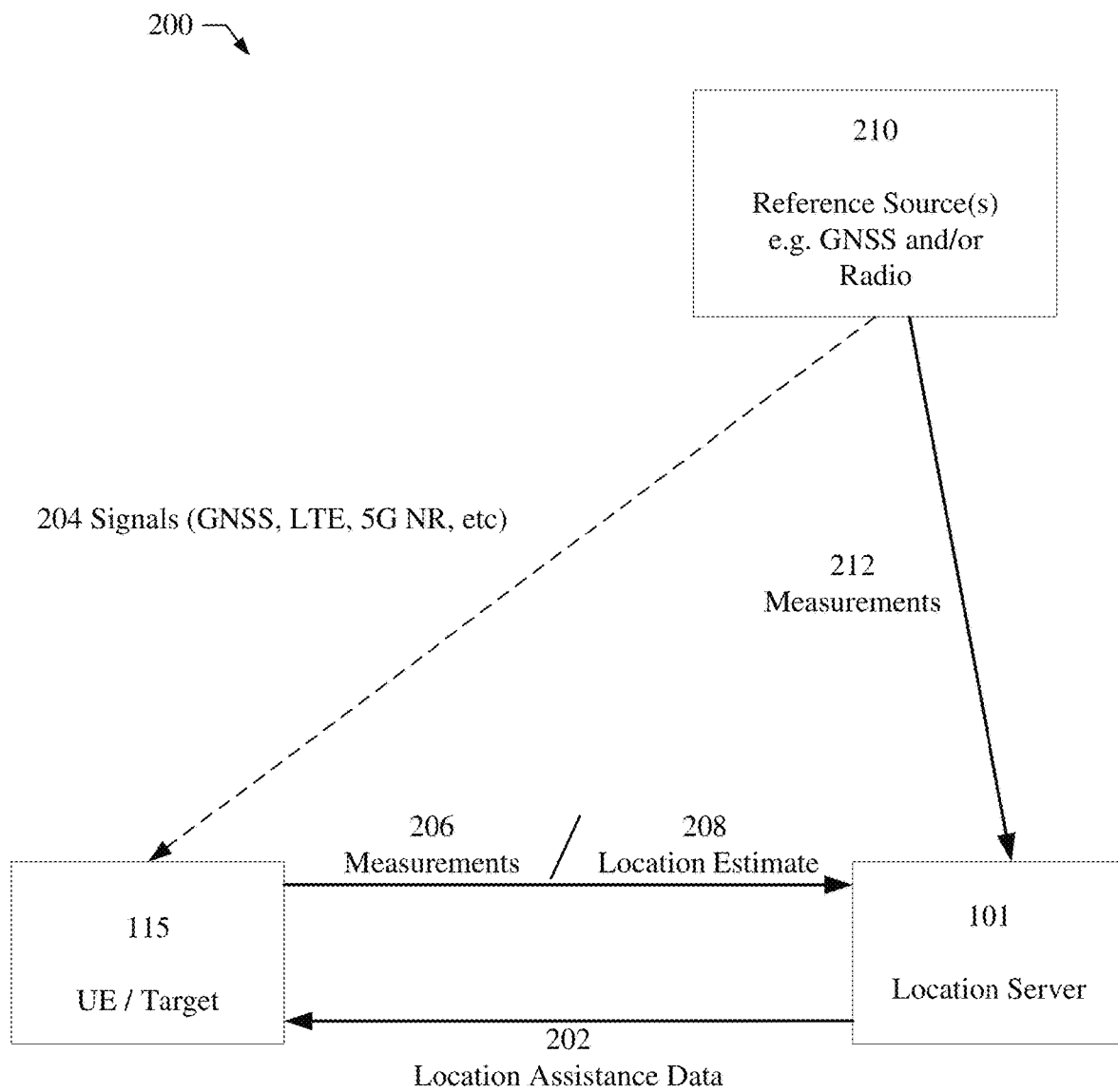
FIG. 2 shows a simplified block diagram illustrating entities in a system capable of determining the location of a mobile device.

FIG. 2 shows a simplified block diagram illustrating some entities in a system 200 capable of determining the location of UE 115. Referring to FIG. 2, location server 201 (e.g., LMF 196 or E-SMLC 164) may provide location assistance data 202 to UE 115, e.g., via base station 105 shown in FIG. 1, which may be used to assist UE 115 in acquiring and measuring signals 204 from reference source(s) 210 (e.g. which may base stations 105 or satellite vehicles (SVs) for Global Navigation Satellite System (GNSS) 105), and/or in deriving or refining a location estimate 208 from measurements 206. Location assistance data 202 may include base station almanac (BSA) data for nearby base stations 105 such as cell identities, TP identities, DL PRS/NPRS signal characteristics, transmission timing, antenna coordinates, and/or approximate expected RSTD measurements. Location assistance data 202 may also or instead include information for SVs such as timing and ephemeris data.

In some embodiments, UE 115 may take the form, e.g., of a Secure User Plane (SUPL) Enabled Terminal (SET), and may communicate with base station 105 to provide an approximate location estimate 208 to location server 201 via a base station 105 (e.g. a current serving cell identity for UE 115) and in response receive location assistance data 202 applicable to the approximate location of UE 115. The UE 115 may use the location assistance data 202 to obtain measurements 206 from reference source(s) 210 (e.g. which may comprise SVs and/or base stations 105), and may provide resulting location information to the location server 201. The location information, in some implementations, may be the measurements 206 themselves. The measurements 206 may comprise RSTD measurements in the case of reference sources 210 that include base stations 105 and/or may comprise GNSS pseudo-range or code phase values in the case of reference sources 210 that include SVs. The location server 201 may then generate a location estimate for UE 115 based on the measurements 206, which may then be communicated to a Location Services (LCS) client (not shown in FIG. 2) and/or to UE 115. In some implementations, (e.g. if assistance data 202 includes the locations of base stations 105 and/or precise orbital data for SVs), UE 115 rather than location server 201 may determine a location estimate for UE 115 from the measurements 206. In this implementation, the location information sent by the UE 115 to location server 201 may be the determined location estimate rather than or in addition to the measurements 206.

UE 115 may measure signals from reference source(s) 210 to obtain measurements 206 and/or location estimate 208. Reference source(s) 210 may represent SVs and/or base stations 105 associated with cells 110 in network. UE 115 may obtain measurements 206 by measuring pseudo-ranges for SVs and/or OTDOA RSTDs, or other location measurements from base stations 105. The OTDOA RSTD measurements may be based on the measured arrival times (e.g. TOA values) of downlink radio signals (e.g. PRS or CRSsignals) from a plurality of base stations (such as gNodeBs for 5G NR) including one or more "neighbor cells" or "neighboring cells" relative to a "reference cell."

In some instances, the OTDOA related measurements (such as RSTDs) obtained by UE 115 may be sent to location server 201 to derive a position estimate for UE 115. The UE 115 may provide the RSTDs, including an identification of the reference cell and the neighbor cell for each RSTD measurement, to the location server 201 as measurements 206. The location estimate 208 provided to the location server 201 may be, e.g., a rough estimate of the position of the UE 115 or information from which a rough position of the UE 115 may be estimated, such as the cell ID of the cell serving UE 115 (the serving cell). In response, the location server 201 may identify the reference cell (typically, the serving cell) and neighboring cells for the OTDOA RSTD measurements, and may provide location assistance data 202 to the UE 115 including reference cell information and neighbor cell information.

The OTDOA measurements (e.g., RSTD measurements) obtained by UE 115 may in principle be performed on any DL signals from base stations, such as cell-specific reference signals (CRS) or synchronization signals. For improved hearability, however, Positioning Reference Signals (PRS) transmitted by base stations may be preferred for OTDOA measurements. PRS signals, which are defined in 3GPP TS 36.211, are transmitted by a base station (eNodeB) in special positioning subframes that are grouped into positioning occasions.

In some implementations, the UE 115 may transmit uplink (UL) signals 204 to the reference source(s) 210, and the reference source(s) 210 measure the signals to obtain measurements 212. Reference source(s) 210 in this implementation may represent base stations 105 associated with cells 110 in network. The reference source(s) 210 may obtain measurements 212 by measuring UL Time Difference of Arrival (UL-TDOA), or other location measurements from UE 115. In some implementations, the UE 115 may transmit UL signals measured by reference source(s) 210 and the reference source(s) 210 may transmit DL signals measured by the UE 115 for multi-cell measurements, e.g., Round-Trip Time (RTT) measurements, that may be used for positioning of the UE 115.

Figure 3A:
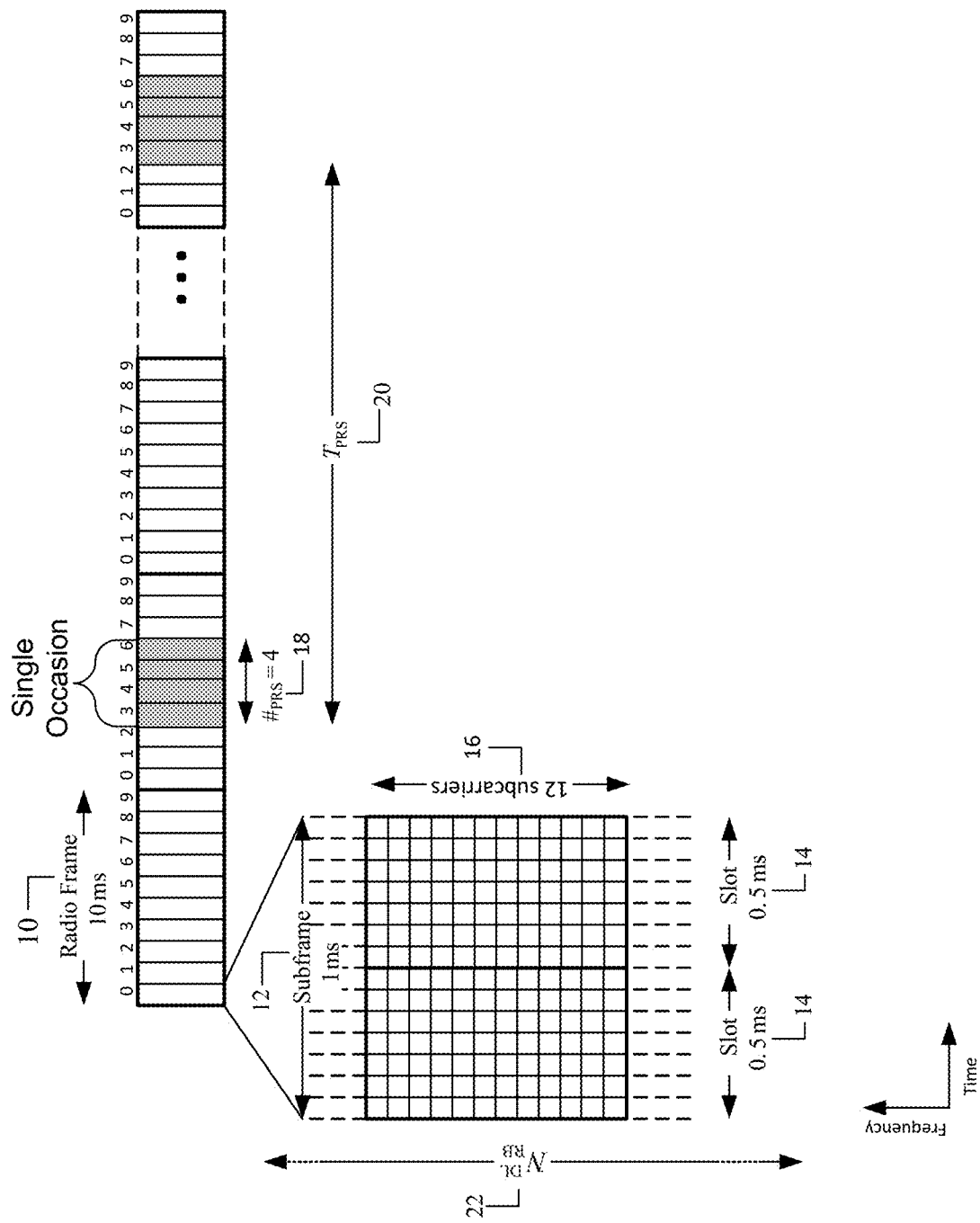
FIG. 3A shows the structure of an exemplary Long Term Evolution (LTE) frame with Positioning Reference Signals (PRS).

FIG. 3A shows the structure of an exemplary conventional LTE frame sequence for any cell that supports LTE with PRS positioning occasions, and is similarly to that used for SGNR. In FIG. 3A, time is represented on the X (horizontal) axis, while frequency is represented on the Y (vertical) axis. As shown in FIG. 3A, downlink and uplink LTE Radio Frames 10 are of 10 ms duration each. For downlink Frequency Division Duplex (FDD) mode, Radio Frames 10 are organized into ten subframes 12 of 1 ms duration each. Each subframe 12 comprises two slots 14, each of 0.5 ms duration.

In the frequency domain, the available bandwidth may be divided into uniformly spaced orthogonal subcarriers 16. For example, for a normal length cyclic prefix using 15 KHz spacing, subcarriers 16 may be grouped into a group of 12 subcarriers. Each grouping, which comprises 12 subcarriers 16, in FIG. 3A, is termed a resource block and in the example above the number of subcarriers in the resource block may be written as $N_{SC}^{RB}=12$. For a given channel bandwidth, the number of available resource blocks on each channel 22, which is also called the transmission bandwidth configuration 22, is given by $N_{RB}^{DL}$ 22. For example, for a 3 MHz channel bandwidth in the above example, the number of available resource blocks on each channel 22 is given by $N_{RB}^{DL}=15$.

Referring to FIG. 1, in some embodiments, base stations 105a, 105b, 105c corresponding to cells 110a, 110b, 110c, respectively, may transmit PRS signals. PRS signals are transmitted by a base station (e.g. eNodeB or gNodeb) in special positioning subframes that are grouped into positioning occasions (also referred to as PRS positioning occasions and PRS occasions). For example, in LTE, a positioning occasion can comprise a number, denoted herein as $\#_{PRS}$, of between 1 and 160 consecutive positioning subframes and can occur periodically at intervals of 5, 10, 20, 40, 80, 160, 320, 640, or 1280 milliseconds. In the example shown in FIG. 3A, the number of consecutive positioning subframes for a single positioning occasion 18 is 4 and may be written as $\#_{PRS}=4$. The positioning occasions recur with PRS Periodicity 20. In FIG. 3A, PRS Periodicity 20 is denoted by $T_{PRS}$. In some embodiments, $T_{PRS}$ may be measured in terms of the number of subframes between the start of consecutive positioning occasions.

Within each positioning occasion 18, PRS may be transmitted with a constant power. PRS can also be transmitted with zero power (i.e., muted). Muting, which turns off a regularly scheduled PRS transmission, may be useful when PRS patterns between cells overlap. Muting aids signal acquisition by UE 115. Muting may be viewed as the non-transmission of a PRS for a given positioning occasion in a particular cell. Muting patterns may be signaled to UE 115 using bitstrings. For example, in a bitstring signaling a muting pattern, if a bit at position j is set to "0", then an MS may infer that the PRS is muted for the $j^{th}$ positioning occasion.

To further improve hearability of PRS, positioning subframes may be low-interference subframes that are transmitted without user data channels. As a result, in ideally synchronized networks, PRS s may receive interference from other cell PRS s with the same PRS pattern index (i.e., with the same frequency shift), but not from data transmissions. The frequency shift, in LTE, for example, is defined as a function of the Physical Cell Identifier (PCI) resulting in an effective frequency re-use factor of 6.

The PRS configuration parameters such as the number of consecutive positioning subframes, periodicity, muting pattern, PRS code sequence, etc., may be configured by core networks 160 or 190 and may be signaled to UE 115 (e.g., by location server 164/196 via base station 105) as part of the OTDOA assistance data. For example, LPP or LPPe messages exchanged between UE 115 and location server 164/196 may be used to transfer location assistance data 202 from location server 164/196 to UE 115 including OTDOA assistance data. OTDOA assistance data may include reference cell information and neighbor cell information. The reference cell and neighbor cell information may each contain the PCIs of the cells as well as PRS configuration parameters for the cells.

The OTDOA assistance data may include "expected RSTD" parameters, which provide UE 115 with information about the approximate RSTD values UE 115 is expected to measure at its current location together with an uncertainty of the expected RSTD parameter. The expected RSTD together with the uncertainty defines then a search window for UE 115 where UE 115 is expected to measure the RSTD value. "Expected RSTDs" for cells included in the OTDOA assistance data neighbor cell information are usually provided relative to an OTDOA assistance data reference cell. OTDOA assistance data may also include PRS configuration information parameters, which allow UE 115 to determine approximately when a PRS positioning occasion occurs on signals received from various cells, and to determine the PRS sequence transmitted from various cells in order to measure a TOA.

Figure 3B:
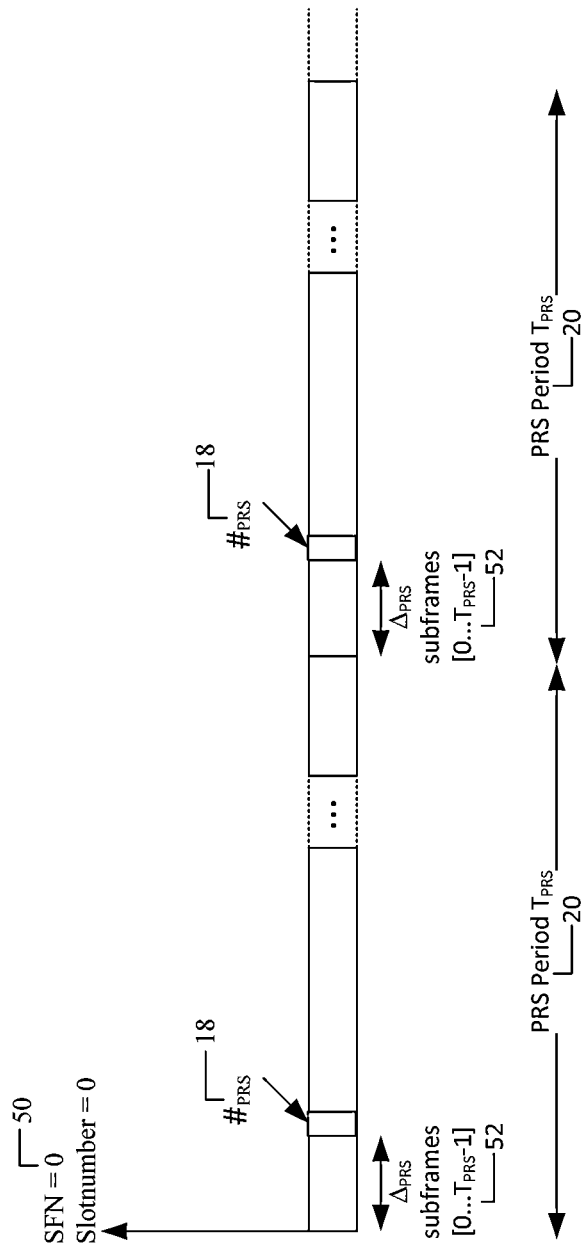
FIG. 3B illustrates the relationship between the System Frame Number (SFN), the cell specific subframe offset and the PRS Periodicity in an LTE frame.

FIG. 3B illustrates the conventional relationship between the System Frame Number (SFN), the cell specific subframe offset ($\Delta_{PRS}$) and the PRS Periodicity 20. Typically, the cell specific PRS subframe configuration is defined by a "PRS Configuration Index" $I_{PRS}$ included in the OTDOA assistance data. The cell specific subframe configuration period and the cell specific subframe offset for the transmission of positioning reference signals are defined based on the $I_{PRS}$, in the 3GPP specifications listed in Table 1 below.

TABLE 1

Positioning reference signal subframe configuration

| PRS configuration Index $I_{PRS}$ | PRS periodicity $T_{PRS}$ (subframes) | PRS subframe offset $\Delta_{PRS}$ (subframes) |
| --- | --- | --- |
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-2404 | 5 | $I_{PRS}$ − 2400 |
| 2405-2414 | 10 | $I_{PRS}$ − 2405 |
| 2415-2434 | 20 | $I_{PRS}$ − 2415 |
| 2435-2474 | 40 | $I_{PRS}$ − 2435 |
| 2475-2554 | 80 | $I_{PRS}$ − 2475 |
| 2555-4095 | Reserved | |

A PRS configuration is defined with reference to the System Frame Number (SFN) of a cell that transmits PRS. PRS instances, for the first subframe of a PRS positioning occasion, satisfy $$(10 \times n_f + [n_s/2] - \Delta_{PRS}) \bmod T_{PRS} = 0, \quad \text{eq. 1}$$

where, $n_f$ is the SFN with 0≤SFN≤1023,
$n_s$ is the slot number of the radio frame with 0≤$n_s$≤19,
$T_{PRS}$ is the PRS period, and
$\Delta_{PRS}$ is the cell-specific subframe offset.

As shown in FIG. 3B, the cell specific subframe offset $\Delta_{PRS}$ 52 may be defined in terms of the number of subframes transmitted starting from System Frame Number 0, Slot Number 0 50 to the start of a PRS positioning occasion. In FIG. 3B, the number of consecutive positioning subframes in a positioning occasion 18 is #$_{PRS}$=4.

In some embodiments, when UE 115 receives a PRS configuration index $I_{PRS}$ in the OTDOA assistance data, UE 115 may determine PRS periodicity $T_{PRS}$ and PRS subframe offset $\Delta_{PRS}$ using Table 1. Upon obtaining information about the frame and slot timing i.e., the SFN and slot number ($n_f$, $n_s$) for cell 145-k, UE 115 may determine the frame and slot when a PRS is scheduled in cell 145-k.

The OTDOA assistance data is determined by location server 164/196 and includes assistance data for a reference cell, and a number of neighbor cells. Additionally, in a request for location information (e.g. a request for OTDOA RSTD measurements) sent by location server 164/196 to UE 115, the location server 164/196 typically specifies a response time, which defines some reporting time interval (e.g. 16 seconds long) within which measurements must be made by the UE 115 for a set of cells. During the reporting interval (also referred to herein as a reporting time interval or response time), the UE 115 may collect measurements from each cell during one or more positioning occasions for that cell, which may occur with a frequency of, e.g., 160 ms. Accordingly, the UE 115 may collect approximately 100 measurements for different cells during a 16 second reporting time interval if positioning occasions for each cell have a periodicity of 160 milliseconds. Conventionally, however, at the end of the response time, the UE 115 returns only a single RSTD (OTDOA) measurement for each cell, even though more than one TOA measurement may have been obtained for that cell during the reporting interval.

As bandwidth increases, phase noise will likewise increase. With radio technologies, such as e.g., 5G mmWave, phase noise will have a prominent effect on positioning methods. Without correction of the phase noise, will have a direct effect on the accuracy of a final position fix in 5G NR network.

Figure 4:
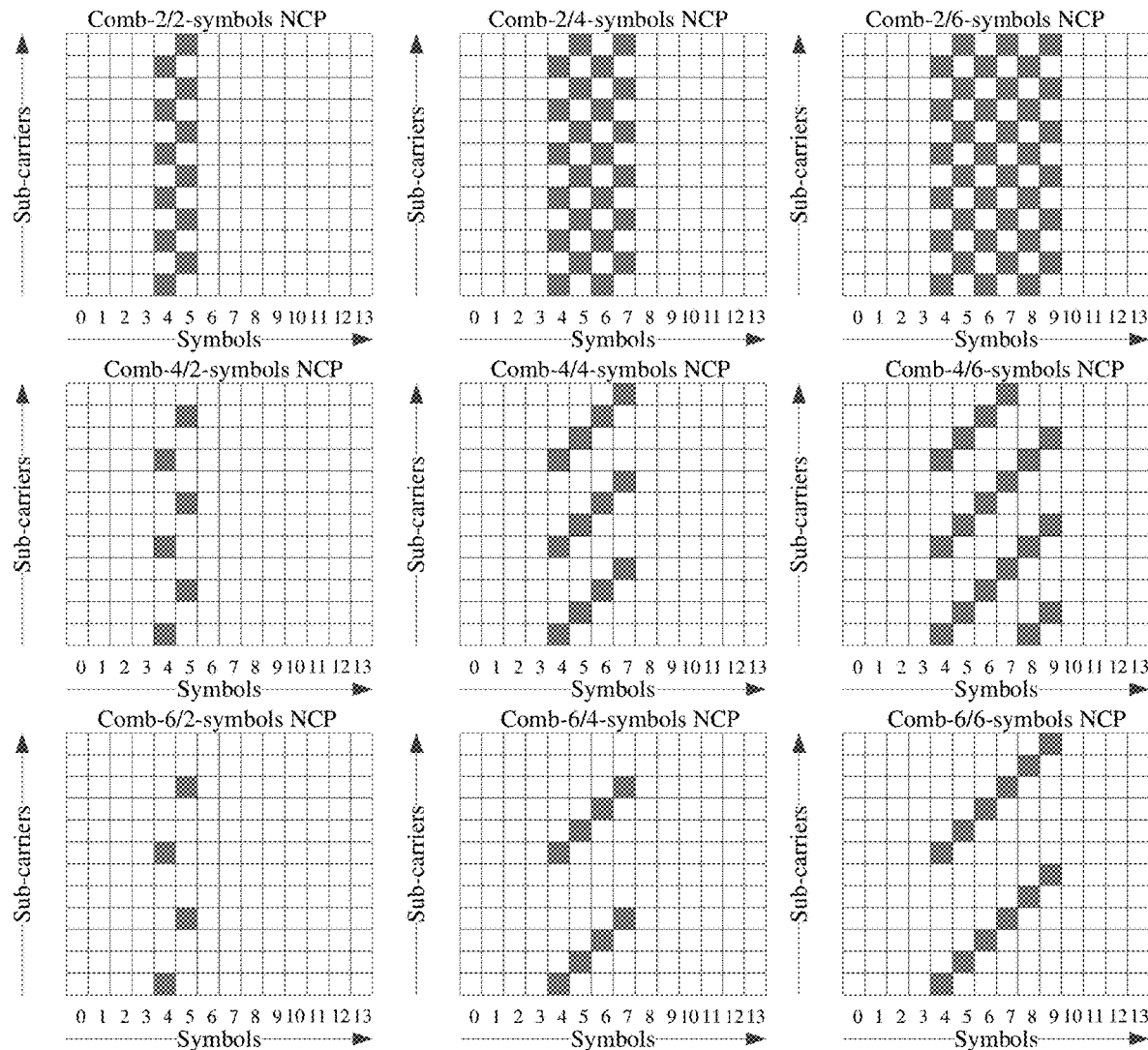
FIG. 4 illustrates a nine different positioning reference signal (PRS) frame structures with varying symbol and comb values.

FIG. 4 illustrates a nine different positioning reference signal (PRS) frame structures proposed in the 3GPP release 16. Each PRS frame structure illustrates the transmission of a downlink (DL or UL) PRS with a shaded square. It should be understood that the PRS transmissions may be downlink by the base stations or uplink by the UE. While the term DL-PRS or the term UL-PRS are sometimes used herein, it should be understood that unless otherwise stated this is not intended to indicate that use of one is to the exclusion of the other in this disclosure. The PRS frame structures are identified with the number of symbols of the subframe in each sub-carrier, during which DL-PRS are transmitted and the frequency of transmission of each symbol, referred to as comb. The term "symbol" is well defined in LTE and NR as a collection of sub-carriers transmitted over some common and fixed time duration. For example, the top left PRS frame structure illustrates DL-PRS transmitted at two symbols of the subframe in each sub-carrier, i.e., symbols 4 and 5 and each symbol is transmitted every second subcarrier, and is thus referred to as a comb-2, symbol 2 PRS frame structure. The top row of FIG. 4 illustrate three PRS frame structures with 2, 4, and 6 symbols, all of which have a comb 2 structure, the middle row illustrates three PRS frame structures with 2, 4, and 6 symbols, all of which have a comb 4 structure, and the bottom row illustrates three PRS frame structures with 2, 4, and 6 symbols, all of which have a comb 6 structure. For example, the top left PRS frame structure uses 2 symbols (symbols 4 and 5), where only every other sub-carrier is utilized within each symbol (comb-2). Similarly, the bottom right PRS frame structure uses 6 symbols, and only every sixth sub-carrier is utilized within each symbol.

Phase noise is produced by clock changes in the UE 115, which results in phase offsets between the symbols in the PRS frame structure. The phase noise may manifest itself as jitter, and may increase the Error Vector Magnitude (EVM) for a modulation constellation. With the presence of phase noise, a reference signal in one symbol cannot be used to anchor data modulation in a different symbol. The jitter impact, however, is common-mode for all sub-carriers of a given symbol. A phase tracking reference signal (PTRS) may be used by a UE in to measure the phase change from one symbol to another (e.g. using a strong signal), and correct it. PTRS is defined by 3GPP for data, and not for PRS. For example, PTRS is defined in 3GPP Technical Specification 38.211, section 6.4.1.2 for uplink and section 7.4.1.2 for downlink. In some implementations, other reference symbols or reference signals that span multiple symbols may be used. The resource elements in symbols in PTRS are unstaggered, i.e., it uses the same set of sub-carriers in all symbols, which simplifies phase comparison from one symbol to the next because phase ramp impact, i.e., delay, is common-mode for a sub-carrier. In contrast, the symbols in a PRS frame structure, such as that shown in FIG. 4 are staggered, and thus, suffer from phase ramp impact.

From a positioning standpoint, Rel-16 currently has defined DL-PRS as any combination of comb {2,4,6} and {2,4,6} symbols, as illustrated in FIG. 4. The full frequency spectrum may be used, i.e., all sub-carriers within the bandwidth of the signal are used, which would require coherent combination of measurements from different symbols. The impact of phase noise in this case is that it could break the assumption of coherency among symbols.

Figure 5A:
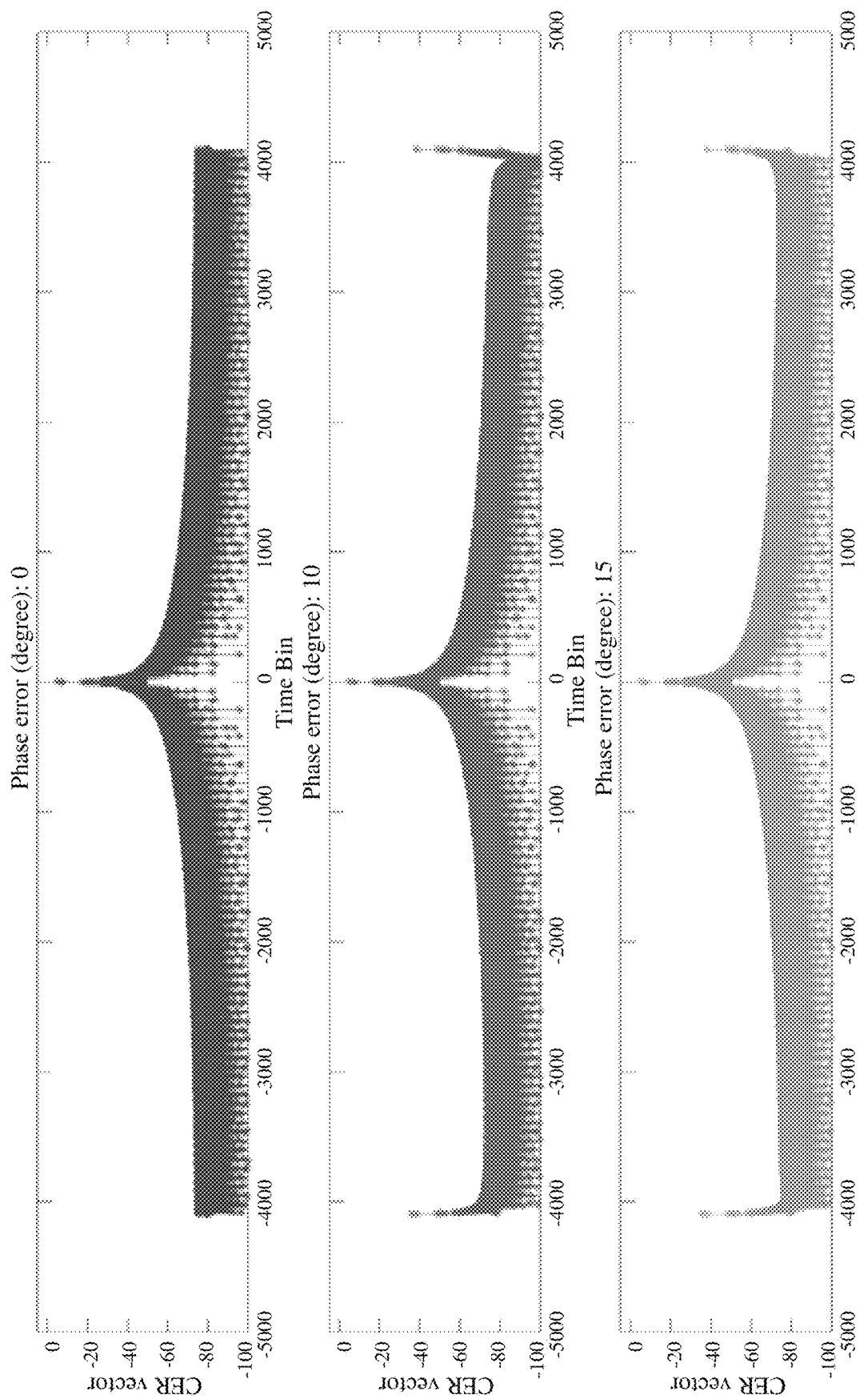
FIG. 5A illustrates an example of the effect of modeled phase noise on CER peak for a PRS frame structure with a comb value of 2 and a symbol value of 2 for a phase error of 0°, 10°, and 15°.
Figure 5B:
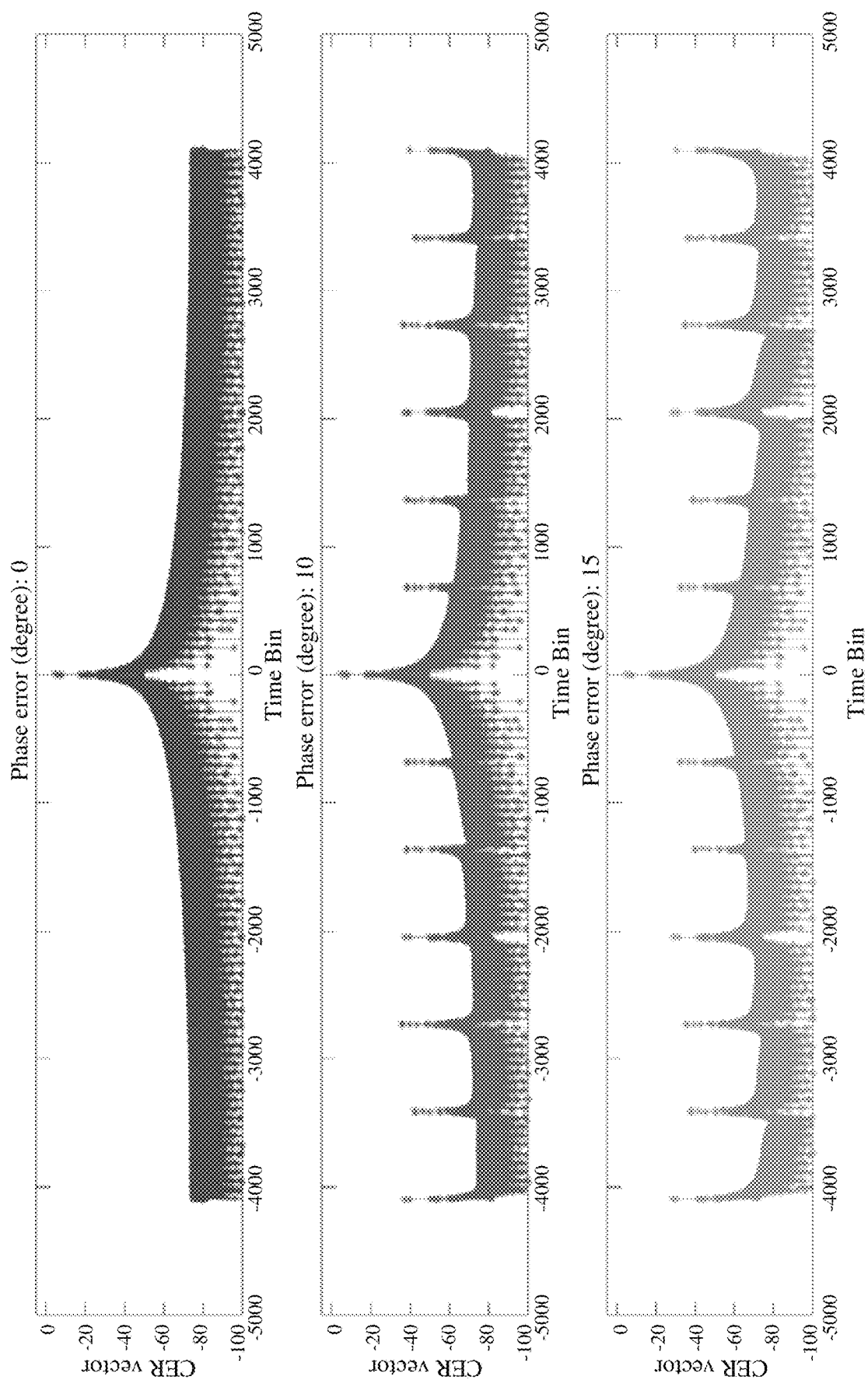
FIG. 5B illustrates an example of the effect of modeled phase noise on CER peak for a PRS frame structure with a comb value of 12 and a symbol value of 12 for a phase error of 0°, 10°, and 15°.

FIG. 5A illustrates an example of the effect of modeled phase noise on Channel Energy Response (CER), sometimes known as correlation peak, for a PRS frame structure with a comb value of 2 and a symbol value of 2 for a phase error of 0°, 10°, and 15°. As can be seen, side lobes are generated at approximately ±4000 in the time bin for phase errors of 10° and 15°, but in general there is little effect of phase noise. FIG. 5B, in contrast, illustrates an example of the effect of modeled phase noise on CER peak for a PRS frame structure that has comb 12 and symbol 12 and 275 resource blocks, for a phase error of 0°, 10°, and 15°. While the PRS frame structures in the current 3GPP specification use up to comb 6 and symbol 6 structure, as illustrated in FIG. 4, comb 12 and symbol 12 have been proposed, moreover, FIG. 5B is illustrative of the effect of phase noise on PRS structures with larger comb and symbol numbers. As can be seen, a significant number of side lobes are generated for phase errors of 10° and 15°.

Figure 6A:
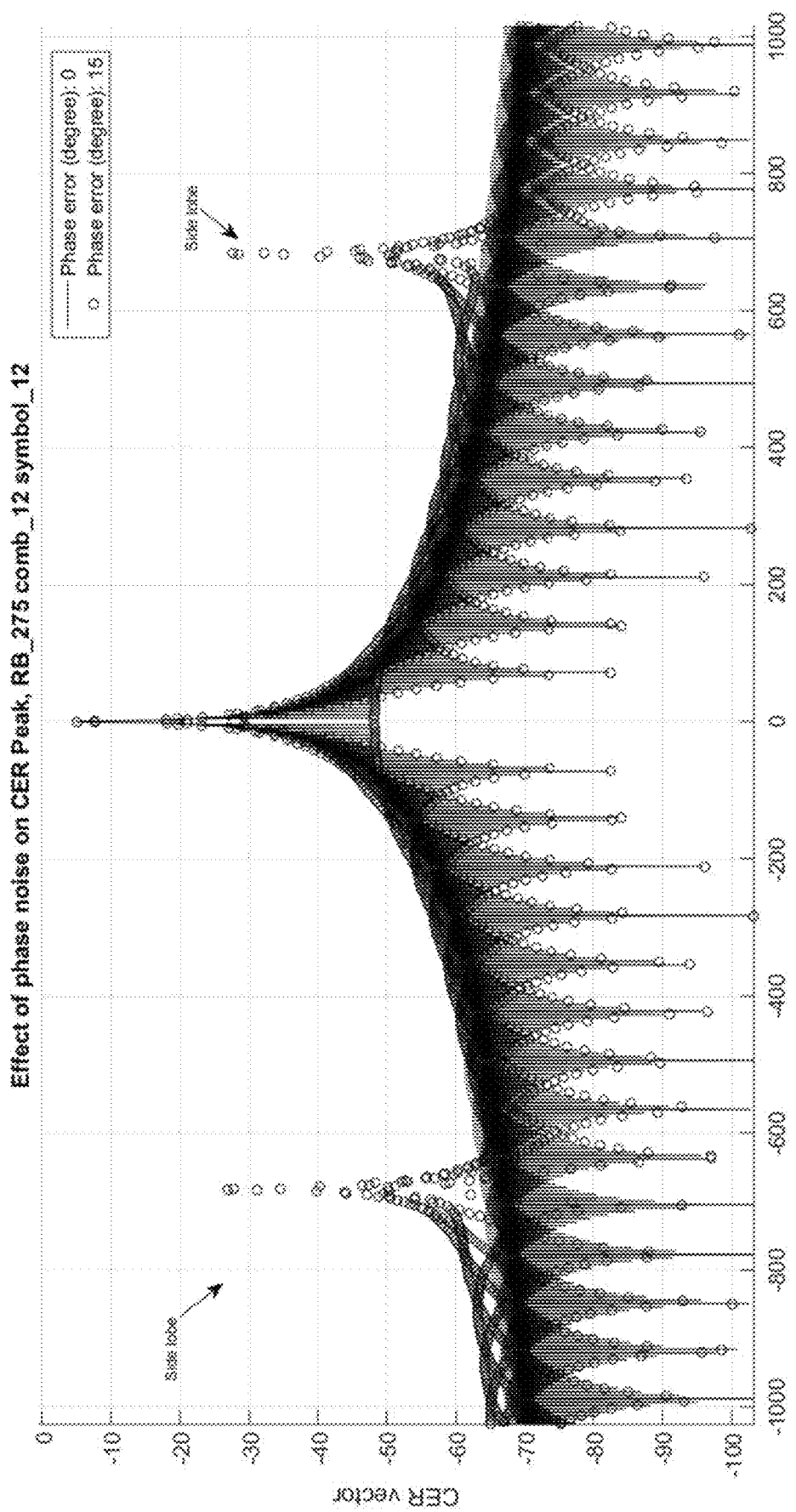
FIGS. 6A and 6B illustrates closer views of the effect of phase noise on CER peak for a PRS frame structure that has comb 12 and symbol 12 for a phase error of 0° and 15°, in a clean channel and in a channel with Additive White Gaussian Noise (AWGN), respectively.
Figure 6B:
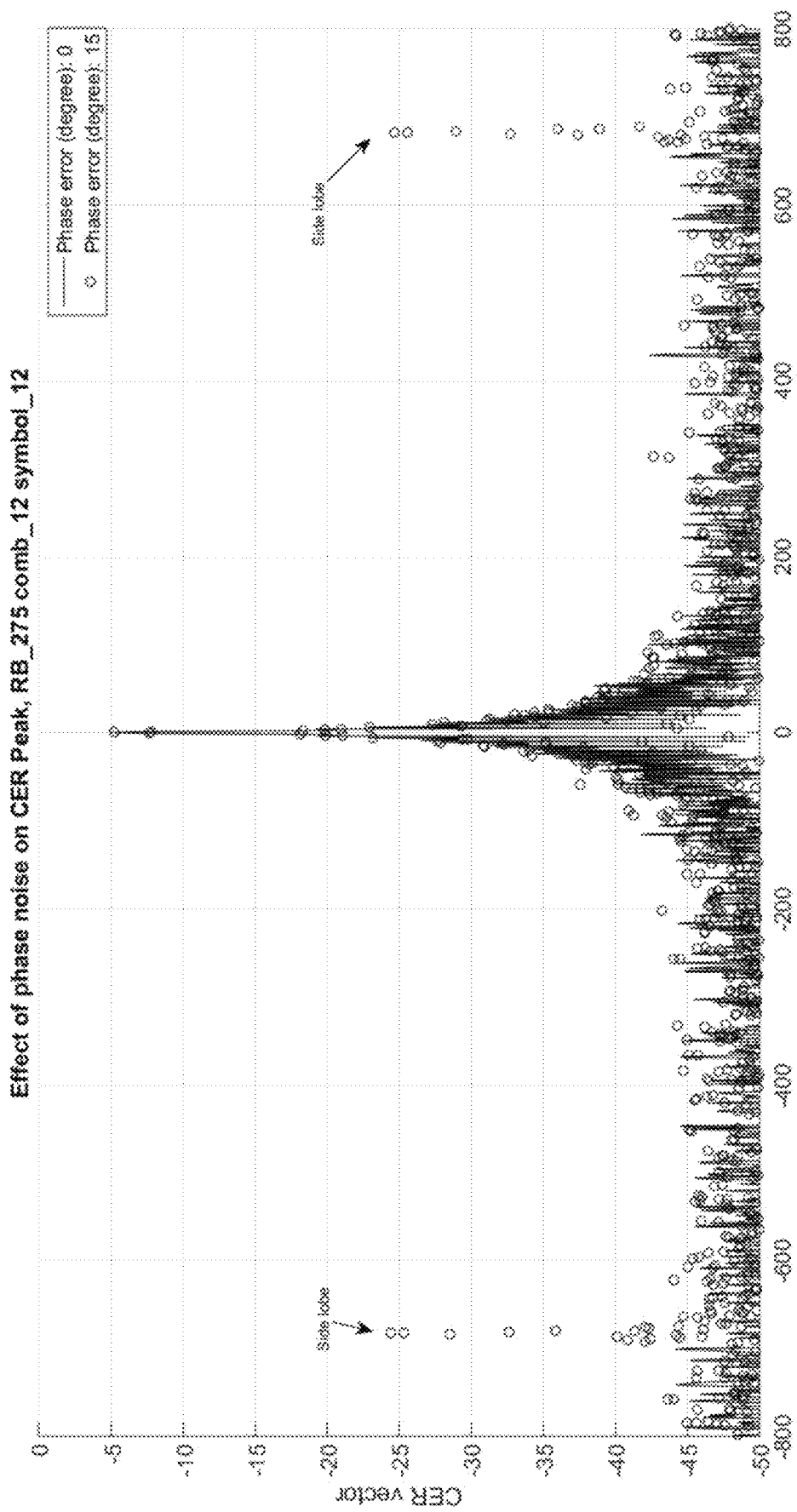

FIGS. 6A and 6B illustrates closer views of the effect of phase noise on CER peak for a PRS frame structure that has comb 12 and symbol 12 and 275 resource blocks for a phase error of 0° and 15°, in a clean channel and in a channel with Additive White Gaussian Noise (AWGN), respectively. As can be seen, as phase noise increases, side lobes are produced, e.g., a phase error of 15 degrees produces large side lobes at approximately ±690 in the time bin. Additional side lobes are present in larger time bins, as illustrated in FIG. 5B. Further, the overall noise floor also increases as phase noise increases. The presence of side lobes makes identification of the center peak difficult and prone to error and can lease to false detection of the earliest arrival peak. Additionally, there is a small signal to noise ratio (SNR) decrease for the CER peaks as phase noise increases. Accordingly, the phase error requires correction, particularly when the PRS structure has a larger comb and symbol numbers.

As illustrated in the comparison of FIGS. 5A and 5B, when the PRS frame structure has sufficiently small comb and symbol, phase noise may have little effect on positioning measurements. As the comb and symbol in the PRS frame structure increases, the phase noise will have a larger effect on positioning measurements. The UE 115 may report to a location server, e.g., LMF 196 or E-SMLC 164, if positioning measurements are limited by phase noise, e.g., based on a determination using collected positioning measurements or based on the capabilities of the UE 115 and the comb and symbol of a PRS frame structure that can be accommodated by the UE 115. Similarly, a base station 105 may report to the location server, e.g., LMF 196 or E-SMLC 164, if positioning measurements are limited by phase noise, and the UE 115 may transmit a PRS frame structure that can be accommodated.

Accordingly, it may be desirable for a UE or base station to determine whether positioning measurements are limited by phase noise. In some implementations, the UE 115 or base station 105 may determine if positioning measurements are limited by phase noise using the measured ToA. For example, the UE 115 or base station 105 may examine the CER vector structure, e.g., illustrated in FIGS. 5A and 5B. The UE 115 or base station 105 may determine the positioning measurements are limited by phase noise if the number of side lobes or if the magnitude of side lobes is above a predetermined threshold. In one embodiment, modeled CER vectors for different symbol lengths and comb values (such as that shown in FIGS. 5A and 5B may be used to compare to a detected CER vector. For example, if detectable peaks in a CER vector appear at an offset from a main lobe that corresponds to +/− side lobes of a modeled CER vector for a corresponding symbol length and comb value, this may indicate that the peaks are due to phase noise.

With PTRS being unstaggered, and PRS positioning signals typically staggered, there may be several implementations that may be used to alleviate the impact from phase noise. For example, the PTRS signals may be used for positioning. Unstaggered signals, such as those used in PTRS, produce alias terms in time domain. Accordingly, external constraints may be used to resolve the ambiguities produced when PTRS signals are used for positioning. In another implementation, a mix of staggered PRS signals and unstaggered PTRS signals may be used. For example, the UE may measure phase noise using the PTRS resource elements (REs) and correct the measurements of PRS accordingly. The use of PTRS with PRS, however, would reduce the orthogonality of the PRS frame structure as a whole. In another implementation, only the staggered PRS may be used. For example, with the staggered signal, attempting to estimate a common phase difference from one symbol to another would be impacted by phase ramp, i.e., delay. The phase ramp may be estimated and used to correct the measurements of PRS accordingly. In another implementation, a PRS frame structure with a comb value of 1 may be used. With a comb-1 signal, no coherent phase combining is needed. Different cells measured in different symbols would have a phase error corresponding to the phase noise, but this would not impact the estimate of time-of-arrival.

Figure 7A:
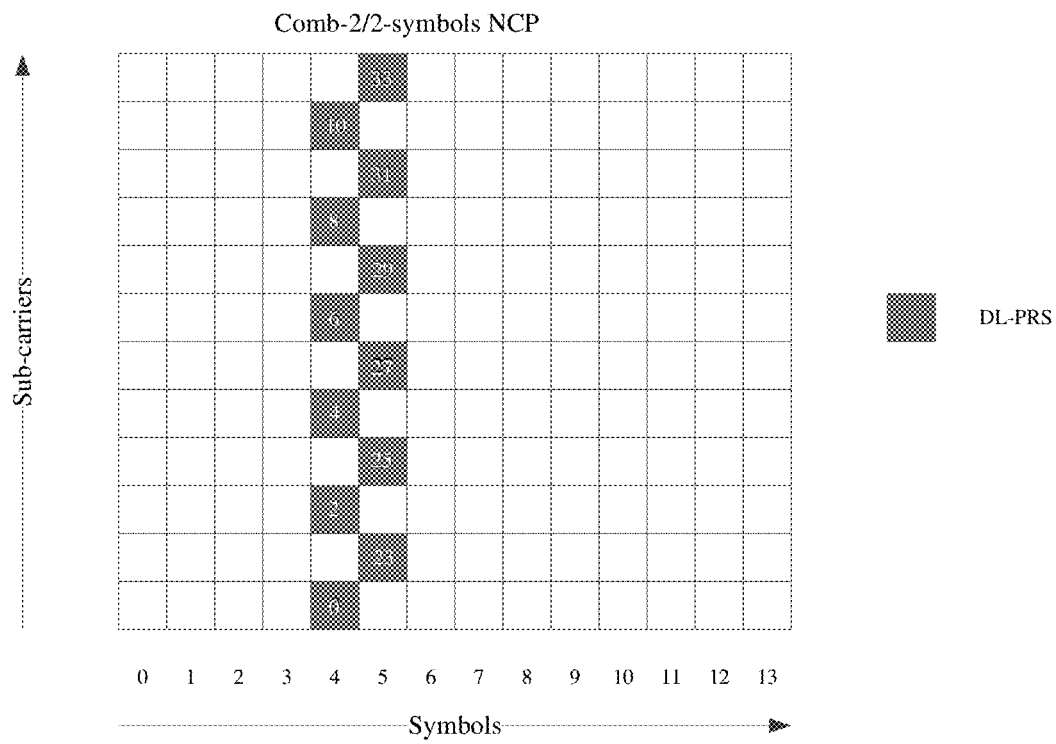
FIGS. 7A and 7B illustrate one implementation of estimating phase noise using a phase ramp of staggered symbols in the PRS frame structure.
Figure 7B:
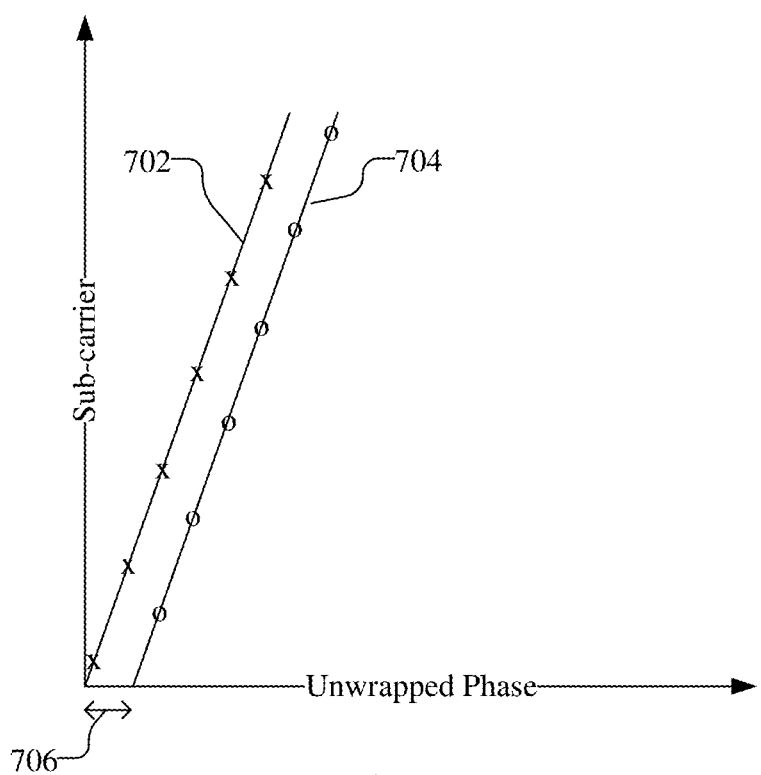

FIGS. 7A and 7B illustrate one implementation of determining the presence of phase noise by the UE 115 or base station 105 using a phase ramp of staggered symbols in the PRS frame structure. FIG. 7A illustrates a comb 2, symbol 2 PRS frame structure that may be received by a UE or base station. The post-correlation phase estimate is illustrated by the number in each Resource Element (RE). For example, symbol 4 has a 0° phase in the first sub-carrier, a 2° phase in the third sub-carrier, etc., while symbol 5 has a 23° phase in the second sub-carrier, a 25° phase in the fourth sub-carrier, etc. The slope of the phase ramp for each symbol may be determined and used to determine the phase offset between the symbols. Based on the phases shown in FIG. 7A, symbols 4 and 5 both have phase ramp slopes of 2° per 2 sub-carriers. The phase equation for symbol 4 may be: Phase(sub-carrier)=0+1*sub_carrier_index; while the phase equation of symbol 5 may be: Phase(sub-carrier)=22+1*sub_carrier_index. FIG. 7B, by way of example, is a graph illustrating the unwrapped phase relative to sub-carrier for symbol 4 with line 702 and symbol 5 with line 704. The separation between lines 702 and 704, e.g., arrow 706, illustrates the phase error between the symbol 4 and symbol 5 due to phase noise. If additional symbols are used in the PRS frame structure, the phase difference between each symbol relative to an anchor symbol, e.g., symbol 4, may be similarly determined. The UE or base station may thus determine if phase noise is present. If the impact of phase noise is large, e.g. greater in magnitude than a threshold of e.g. 5 degrees, the UE or base station may determine if correction of phase noise is required. The UE or base station may estimate the phase offset and correct it in the positioning measurements or may request that the base station, e.g., transmit a new PRS signal with a different PRS frame structure, e.g., if estimating and correcting the phase offset is computationally costly and would take additional power.

The UE 115 or base station may report to the location server, e.g., LMF 196 or E-SMLC 164, if it is determined that positioning measurements are limited by phase noise, e.g., based on a determination using collected positioning measurements or based on the capabilities of the UE 115 or base station 105. In some implementations, the UE 115 or base station 105 may request a specific PRS frame structure, e.g., a comb value of 2 or 1. In other implementations, the UE may request that a phase tracking reference signal (PTRS) is provided along with the PRS signals. The PTRS may be used to estimate phase offset in the PRS signals, which can then be corrected accordingly. In some implementations, the PTRS may be transmitted without PRS signals by the base station 105 and the PTRS signals are used for determining positioning measurements, as discussed above. In another implementation, the PTRS may be transmitted within the PRS frame structure, e.g., a mix of staggered DL-PRS and unstaggered PTRS.

Figure 8A:
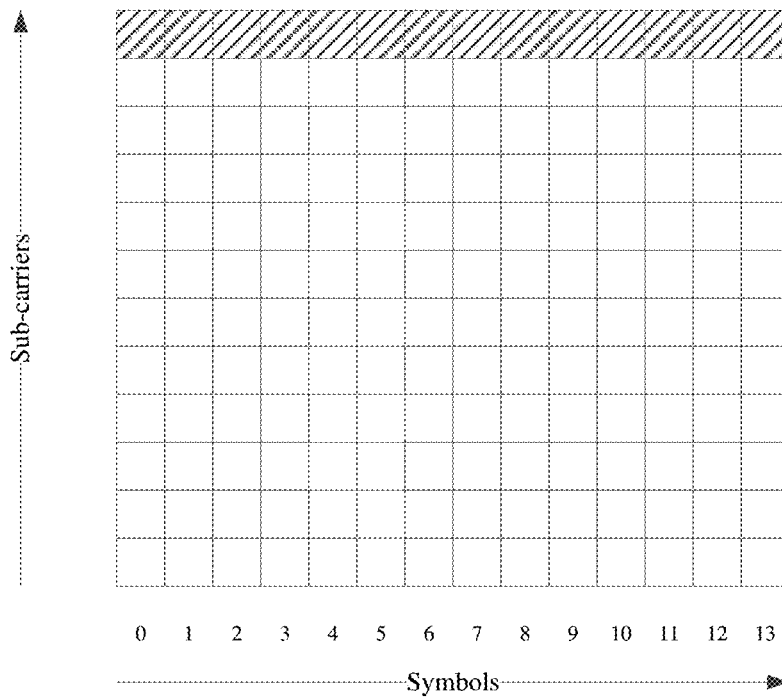
FIG. 8A illustrates a slot configuration that includes unstaggered phase tracking reference signal (PTRS) without DL-PRS for positioning.

FIG. 8A illustrates a slot configuration in which only PTRS is transmitted without PRS. PTRS may be used for positioning and for phase noise estimation. The UE 115 or base station 105 may use the PTRS to estimate phase offset between symbols, e.g., with respect to an anchor symbol. For example, the UE 115 or base station 105 may estimate phase noise error of symbols 1-13 with respect to symbol 0, then correct the phase error of symbols based on that phase error estimate. After correction, the PTRS may be processed coherently to generate the positioning measurement. While the PTRS is well suited for estimating phase noise, the use of only PTRS may result in alias terms in the CER vector and, accordingly, ambiguities in the resulting positioning measurements. The ambiguities, however, may be resolved using external constraints or additional information obtained by the UE 115 or base station 105.

Figure 8B:
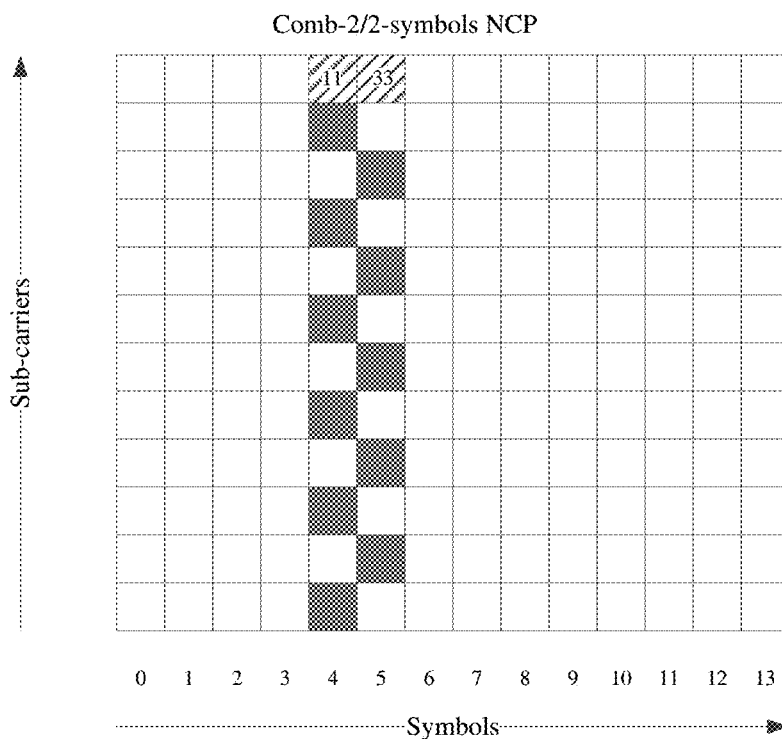
FIG. 8B illustrates a PRS frame structure that is a mix of staggered DL PRS and unstaggered PTRS, which may be used to estimate phase noise.

FIG. 8B illustrates a comb 2, symbol 2 PRS frame structure that is a mix of staggered PRS and unstaggered PTRS, which may be used to estimate the phase offset in PRS signals, which can then be used to correct the phase offset. PRS are well suited for making positioning measurements (e.g. no alias/ambiguities), but less suited for estimating phase noise because PRS signals are staggered. The use of a mix of staggered PRS and unstaggered PTRS is complementary for estimating phase noise and for making positioning measurements, as it provides the benefit of PTRS for phase noise estimation and most of the benefit (less 1 sub-carrier per RB) of PRS for position measurements. As illustrated, the PTRS may be included unstaggered in the same symbol subframes as the DL-PRS, e.g., symbol 4 and symbol 5, in one of the sub-carriers. A UE 115 or base station 105 may estimate phase noise error of symbol 5 with respect to symbol 4 by making observations on PTRS (one sub-carrier per RB), then correct the phase error of all sub-carriers of symbol 5 based on that phase error estimate. After correction, a somewhat limited PRS (lacking 1 sub-carrier per RB) may be processed coherently using both symbols to generate the positioning measurement. For example, as illustrated in FIG. 8B, a phase error is present, illustrated by the difference in the numbers in the REs of the different symbols of the PTRS. The PTRS symbol 4 has an 11° phase, while symbol 5 has a 33° phase in the same sub-carrier. The phase error between symbol 5 and symbol 4 is thus, 33°−11°=22°. If additional symbols are used in the PRS frame structure, the phase difference between each symbol relative to an anchor symbol, e.g., symbol 4, may be similarly determined.

Once the phase offset is estimated, e.g., using the phase ramp discussed in FIGS. 7A and 7B or using PTRS discussed in FIG. 8B, the phase offset in the PRS signals may be corrected and the DL-PRS processed coherently to generate positioning measurements. For example, the phase offset between each symbol and the anchor symbol may be subtracted out of each symbol prior to coherently combining all the symbols for integration to generate the positioning measurement.

Figure 9:
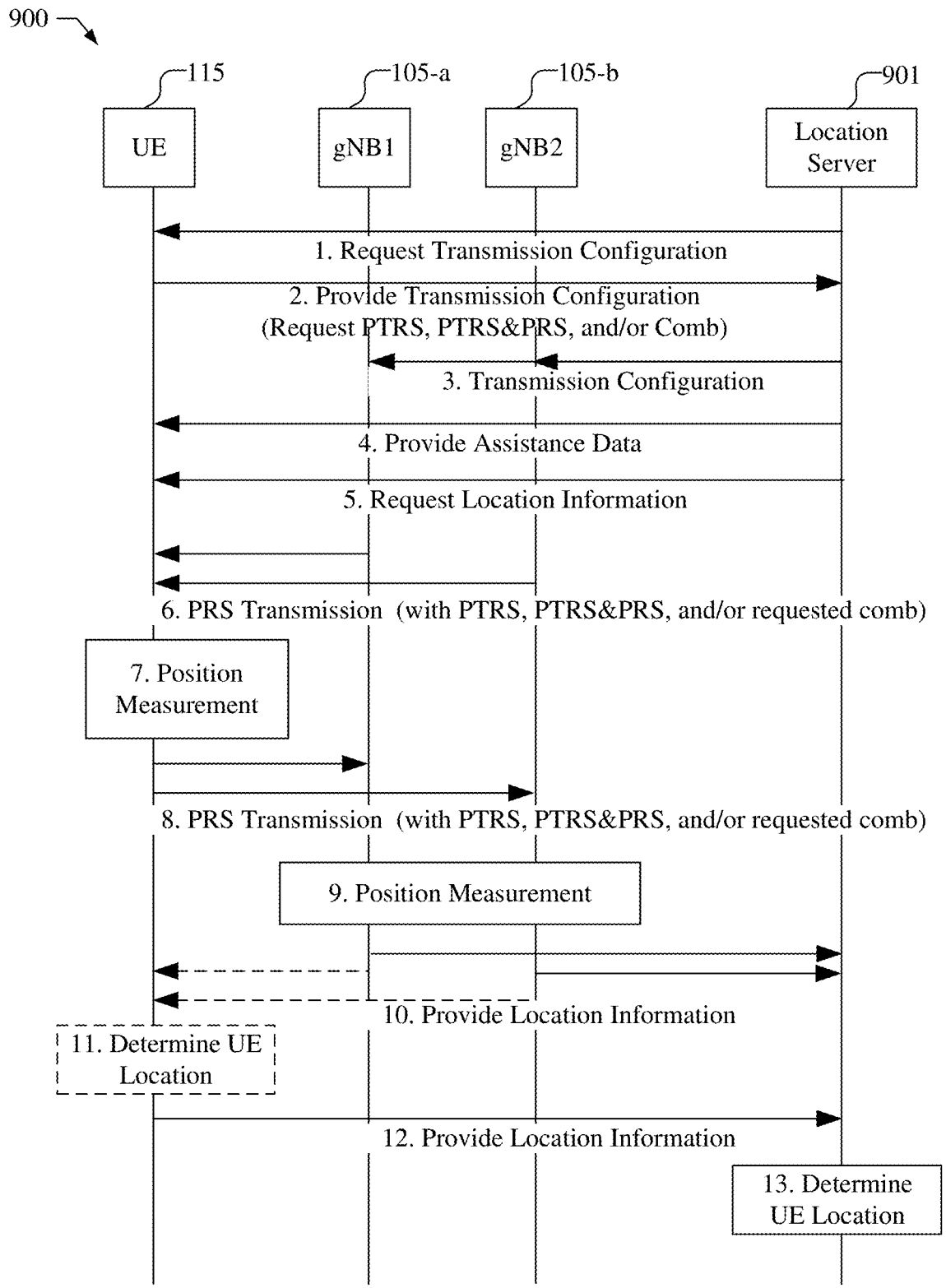
FIG. 9 illustrates an exemplary message flow that supports requesting PTRS for positioning, PTRS with DL-PRS and/or UL-PRS signals or a specific PRS frame structure to reduce the impact of phase noise.

FIG. 9 shows a signaling flow 900 that illustrates various messages sent between components of the communication network 100 depicted in FIGS. 1 and 2, during a location session for performing positioning measurements in a high frequency, e.g., mmWave band, network while reducing the effects of phase noise. In signaling flow 900, the UE 115 may request that PTRS is provided by itself or along with the DL-PRS signals or that a specific PRS frame structure, e.g., a comb value of 2 or 1, which will reduce the impact of phase noise. The base station 105 may make a similar request for UL-PRS signals from the UE 115. While the flow diagram 900 is discussed, for ease of illustration, in relation to a 5G NR wireless access using gNBs 105, signaling flows similar to FIG. 9 involving other types of high frequency networks and base stations will be readily apparent to those with ordinary skill in the art. Location server 901 may be, e.g., LMF 196 for a 5G NR network, or an E-SMLC 164 in LTE. Moreover, location server 901 may be located coincident with a gNB, such as the serving gNB 105-a, or may be located remotely in the core network, e.g., core network 160 or 190 shown in FIG. 1. Furthermore, in some embodiments, the UE 115 itself may be configured to determine its location using, for example, assistance data provided to it. FIG. 9 illustrates implementations for several different positioning methods that may be used separately or combined. For example, FIG. 9 illustrates DL based positioning measurements, UL based positioning measurements and DL and UL based positioning measurements, any of which may be used. In the signaling flow 900, it is assumed that the UE 115 and location server 901 communicate using the LPP positioning protocol referred to earlier, although use of NPP or a combination of LPP and NPP or other future protocol, such as NRPPa, is also possible.

At stage 1, the location server 901 sends a Request Transmission Configuration message to the UE 115, e.g., to request transmission configuration from the UE 115.

At stage 2, the UE 115 returns a Provide Transmission Configuration message to the location server 901 to provide a request that PTRS is provided for positioning or that a mix of PTRS and DL-PRS signals are provided for positioning. The transmission configuration may additionally or alternative include a request a specific PRS frame structure, e.g., a comb value of 2 or 1, which will reduce the impact of phase noise. In some implementations, the transmission configuration may be the configuration of the UL-PRS signals that will be transmitted by the UE 115. In some implementations, the transmission configuration may be the configuration of the DL-PRS signals that the UE 115 can accommodate and the UL-PRS signals that will be transmitted by the UE 115.

At stage 3, the location server 901 sends a Transmission Configuration message to the gNBs 105 that includes, e.g., an indication to transmit PTRS, a mix of PTRS with DL-PRS, or a specific PRS frame structure requested at stage 2. The message may be part of a future NRPPa protocol.

At stage 4, the location server 901 may send an LPP Provide Assistance Data message to the UE 115 to provide positioning assistance data to assist the UE 115 to acquire and measure the PRS signals and optionally determine a location from the PRS measurements.

At stage 5, the location server 901 sends an LPP Request Location Information message to the UE 115 to request the UE 115 to measure DL PRS transmission by the gNBs 105. For example, the location server 901 may request measurements of RSTD if OTDOA is used. The location server 901 may also indicate whether UE based positioning is requested whereby the UE 115 determines its own location. In some implementations, the location server 901 may also include in the LPP Request Location Information message a request for location measurements for other position methods which do not use PRS (e.g. WiFi positioning or A-GNSS positioning).

At stage 6, the gNBs 105 transmit PRS signals with the requested PTRS, a mix of PTRS with DL-PRS, and/or requested PRS frame structure, e.g., with a comb value of 2 or 1.

At stage 7, the UE 115 may acquire the PRS transmitted by the gNBs 105 at stage 6 and perform the desired position measurements. The UE 115, for example, may measure TOA, RSTD, OTDOA, or AoD. If the DL PRS signals are transmitted with the requested comb value, e.g., comb 2 or comb 1, the phase noise will have little impact on the position measurement and the UE 115 may perform position measurements without need to estimate and correct the phase offset. If PTRS is transmitted by itself, the UE 115 may use the PTRS for positioning after estimating and correcting the phase offset before generating the positioning measurements. If PTRS is transmitted with the DL PRS, the UE 115 may use the PTRS to estimate the phase offset between symbols in the PRS signals and then correct the phase offset before generating the positioning measurements using the corrected PRS signals.

At stage 8, the UE 115 may transmit UL PRS signals, e.g., SRS, with PTRS, a mix of PTRS with UL-PRS, and/or requested PRS frame structure, e.g., with a comb value of 2 or 1.

At stage 9, the base stations 105 may acquire the PRS transmitted by the UE 115 at stage 8 and perform the desired position measurements. The base stations 105 for example, may measure UL-TDOA, UL AoA, or UL-RTOA. If the UL PRS signals are transmitted with the comb value of 2 or 1, the phase noise will have little impact on the position measurement and the UE base station 105 may perform position measurements without need to estimate and correct the phase offset. If PTRS is transmitted by itself, the base station 105 may use the PTRS for positioning after estimating and correcting the phase offset before generating the positioning measurements. If PTRS is transmitted with the UL PRS, the base station 105 may use the PTRS to estimate the phase offset between symbols in the PRS signals and then correct the phase offset before generating the positioning measurements using the corrected PRS signals.

At stage 10, the base stations 105 send a Provide Location Information message to the location server 901 and includes the PRS measurements (and any other measurements) obtained at stage 8. In some implementations, e.g., where DL and UL based positioning methods are used, the base station may send the Provide Location Information message to the UE 115, as illustrated with dotted lines.

At stage 11, if UE 115 based positioning was requested at stage 5, the UE 115 may determine its location based on the PRS measurements (and any other measurements) obtained at stage 7 and the assistance data received at stage 4, and the Provide Location Information message from the base station at stage 10, if used.

At stage 12, the UE 115 sends a Provide Location Information message to the location server 901 and includes the PRS measurements (and any other measurements) obtained at stage 7 and/or the UE location obtained at stage 11.

At stage 13, the location server 901 determines the UE location based on any PRS measurements (and any other measurements) received at one or more of stage 12, stage 10, or the combination of stage 12 and stage 10, or may verify a UE location received at stage 12.

Figure 10:
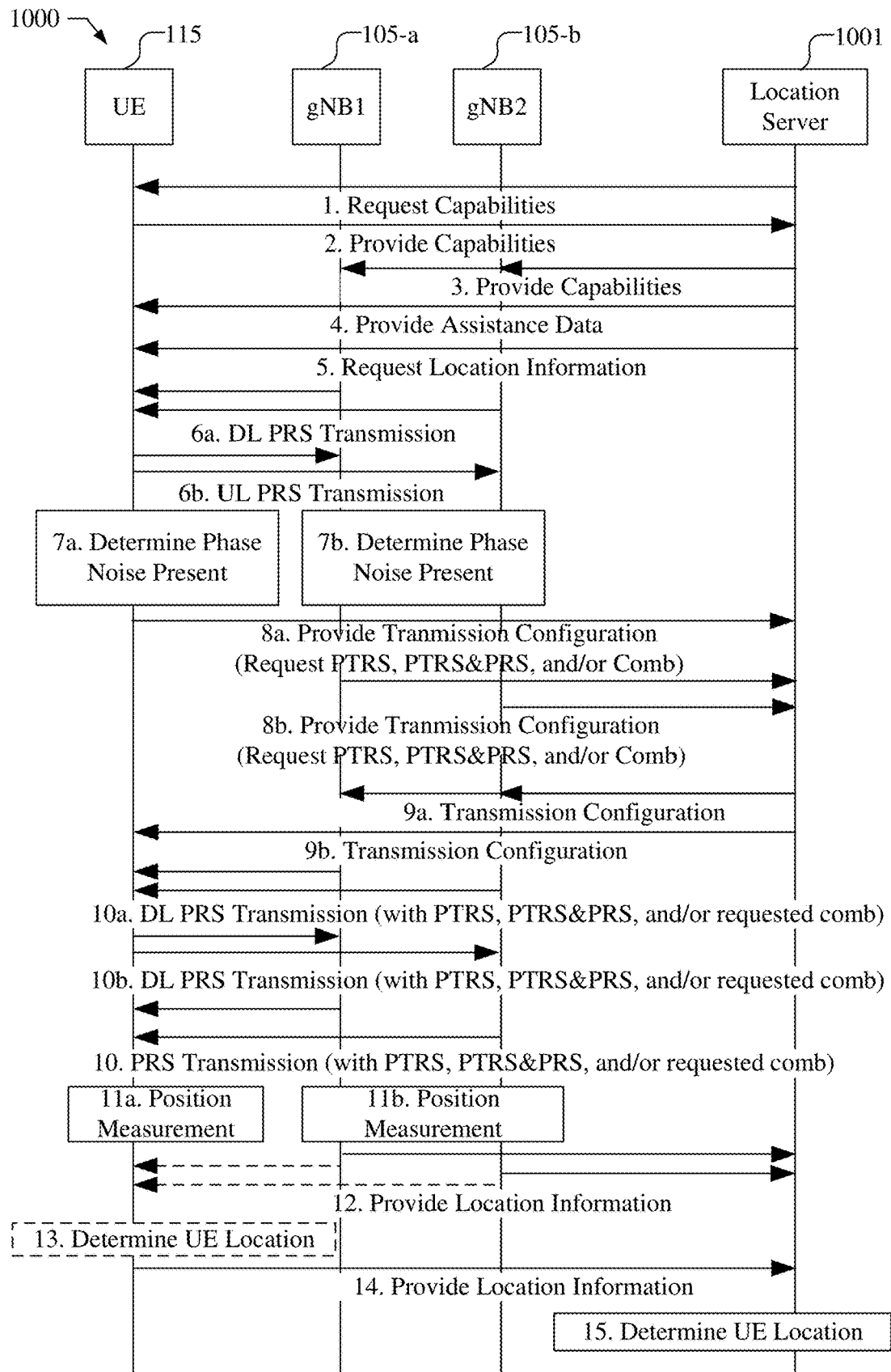
FIG. 10 illustrates an exemplary message flow that supports determining the presence of phase noise in the PRS and in response requesting PTRS with PRS signals or a specific PRS frame structure to reduce the impact of phase noise.

FIG. 10 shows another signaling flow 1000 that illustrates various messages sent between components of the communication network 100 depicted in FIGS. 1 and 2, during a location session for performing positioning measurements in a high frequency, e.g., mmWave band, network while reducing the effects of phase noise. In signaling flow 1000, the UE 115 may determine whether phase noise is present and may impact the positioning measurement and in response requests that additional PRS signals are transmitted with PTRS or with a specific PRS frame structure, e.g., a comb value of 2 or 1, which will reduce the impact of phase noise. The base station 105 may make a similar request for UL-PRS signals from the UE 115. While the flow diagram 1000 is discussed, for ease of illustration, in relation to a 5G NR wireless access using gNBs 105, signaling flows similar to FIG. 10 involving other types of high frequency networks and base stations will be readily apparent to those with ordinary skill in the art. Location server 1001 may be, e.g., LMF 196 for a 5G NR network, or an E-SMLC 164 in LTE. Moreover, location server 1001 may be located coincident with a gNB, such as the serving gNB 105-a, or may be located remotely in the core network, e.g., core network 160 or 190 shown in FIG. 1. Furthermore, in some embodiments, the UE 115 itself may be configured to determine its location using, for example, assistance data provided to it. FIG. 10 illustrates implementations for several different positioning methods that may be used separately or combined. For example, FIG. 10 illustrates DL based positioning measurements, UL based positioning measurements and DL and UL based positioning measurements, any of which may be used.

In the signaling flow 1000, it is assumed that the UE 115 and location server 1001 communicate using the LPP positioning protocol referred to earlier, although use of NPP or a combination of LPP and NPP or other future protocol, such as NRPPa, is also possible.

At stage 1, the location server 1001 sends a Request Capabilities message to the UE 115, e.g., to request the positioning capabilities of the UE 115.

At stage 2, the UE 115 returns a Provide Capabilities message to the location server 1001 to provide the positioning capabilities of the UE 115. The positioning capabilities may include, e.g., the minimum number of resource blocks required by the UE 115 for positioning measurements or a desired positioning accuracy, which may be provided to the serving base station 105-a.

At stage 3, the location server 1001 sends a Provide Capabilities message to the gNBs 105 that includes, e.g., the relevant information provided by UE 115 at stage 2.

At stage 4, the location server 1001 may send a Provide Assistance Data message to the UE 115 to provide positioning assistance data to assist the UE 115 to acquire and measure the PRS signals and optionally determine a location from the PRS measurements.

At stage 5, the location server 1001 sends a Request Location Information message to the UE 115 to request the UE 115 to measure DL PRS transmission by the gNBs 105. For example, the location server 1001 may request measurements of RSTD if OTDOA is used. The location server 1001 may also indicate whether UE based positioning is requested whereby the UE 115 determines its own location. In some implementations, the location server 1001 may also include in the Request Location Information message a request for location measurements for other position methods which do not use PRS (e.g. WiFi positioning or A-GNSS positioning).

At stage 6a, the gNBs 105 transmit DL PRS signals.

At stage 6b, the UE 115 transmits UL PRS signals, e.g., SRS.

At stage 7a, the UE 115 may acquire the DL PRS transmitted by the gNBs 105 at stage 6a and determine whether phase noise is present, e.g., as discussed in FIGS. 6A, 6B, 7A and 7B.

At stage 7b, the base stations 105 may acquire the UL PRS transmitted by the UE 115 at stage 6b and determine whether phase noise is present, e.g., as discussed in FIGS. 6A, 6B, 7A and 7B.

At stage 8a, if it is determined that there is sufficient phase noise to impact positioning measurements in stage 7a, the UE 115 may send a Provide Transmission Configuration message to the location server 1001 to request that PTRS is provided for positioning or that a mix of PTRS and DL-PRS signals are provided for positioning. The transmission configuration may additionally or alternatively include a request a specific PRS frame structure, e.g., a comb value of 2 or 1, which will reduce the impact of phase noise.

At stage 8b, if it is determined that there is sufficient phase noise to impact positioning measurements in stage 7b, one or more base stations 105 may send a Provide Transmission Configuration message to the location server 1001 to request that PTRS is provided for positioning or that a mix of PTRS and UL-PRS signals are provided for positioning. The transmission configuration may additionally or alternatively include a request a specific PRS frame structure, e.g., a comb value of 2 or 1, which will reduce the impact of phase noise.

At stage 9a, the location server 1001 sends a Transmission Configuration message to the gNBs 105 that includes, e.g., an indication to transmit PTRS, a mix of PTRS with DL-PRS, or a specific PRS frame structure requested at stage 8a.

At stage 9b, the location server 1001 sends a Transmission Configuration message to the UE 115 that includes, e.g., an indication to transmit PTRS, a mix of PTRS with UL-PRS, or a specific PRS frame structure requested at stage 8b.

At stage 10a, the gNBs 105 transmit DL PRS signals with the requested PTRS, a mix of PTRS with DL-PRS, and/or requested PRS frame structure, e.g., with a comb value of 2 or 1.

At stage 10b, the gNBs 105 transmit UL PRS signals, e.g., SRS, with the requested PTRS, a mix of PTRS with UL-PRS, and/or requested PRS frame structure, e.g., with a comb value of 2 or 1.

At stage 11a, the UE 115 may acquire the DL PRS transmitted by the gNBs 105 at stage 10a and perform the desired position measurements. The UE 115, for example, may measure obtain TOA, RSTD, OTDOA, or AoD. If the DL PRS signals are transmitted with the requested comb value, e.g., comb 2 or comb 1, the phase noise will have little impact on the position measurement and the UE 115 may perform position measurements without need to estimate and correct the phase offset. If PTRS is transmitted with the DL PRS, the UE 115 may use the PTRS to estimate the phase offset between symbols in the PRS signals and then correct the phase offset before generating the positioning measurements using the corrected PRS signals.

At stage 11b, the base stations 105 may acquire the UL PRS transmitted by the UE 115 at stage 10b and perform the desired position measurements. The base stations 105, for example, may measure UL-TDOA, UL AoA, or UL-RTOA. If the UL PRS signals are transmitted with the comb value of 2 or 1, the phase noise will have little impact on the position measurement and the UE base station 105 may perform position measurements without need to estimate and correct the phase offset. If PTRS is transmitted by itself, the base station 105 may use the PTRS for positioning after estimating and correcting the phase offset before generating the positioning measurements. If PTRS is transmitted with the UL PRS, the base station 105 may use the PTRS to estimate the phase offset between symbols in the PRS signals and then correct the phase offset before generating the positioning measurements using the corrected PRS signals.

At stage 12, the base stations 105 send a Provide Location Information message to the location server 1001 and includes the PRS measurements (and any other measurements) obtained at stage 11b. In some implementations, e.g., where DL and UL based positioning methods are used, the base station may send the Provide Location Information message to the UE 115, as illustrated with dotted lines.

At stage 13, if UE 115 based positioning was requested at stage 5, the UE 115 determines its location based on the PRS measurements (and any other measurements) obtained at stage 11a and the assistance data received at stage 4, and the Provide Location Information message from the base station at stage 12, if used.

At stage 14, the UE 115 sends a Provide Location Information message to the location server 1001 and includes the PRS measurements (and any other measurements) obtained at stage 11a and/or the UE location obtained at stage 13.

At stage 15, the location server 1001 determines the UE location based on any PRS measurements (and any other measurements) received at one or more of stage 14, stage 12, or the combination of stages 14 and 12, or may verify a UE location received at stage 14.

Figure 11:
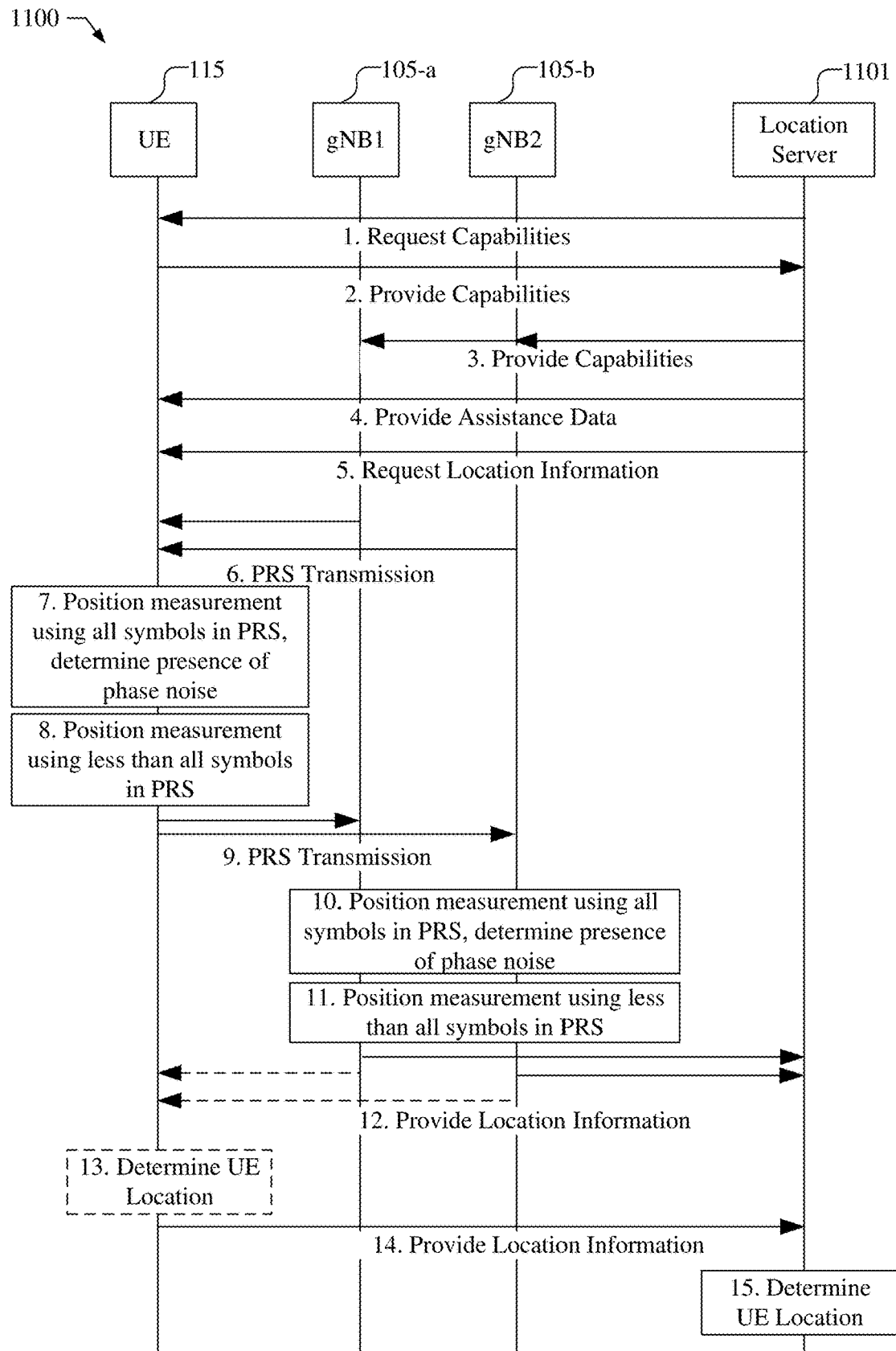
FIG. 11 illustrates an exemplary message flow that supports using less than all symbols included in the received PRS for positioning measurement in order to reduce the impact of phase noise.

FIG. 11 shows a signaling flow 1100 that illustrates various messages sent between components of the communication network 100 depicted in FIGS. 1 and 2, during a location session for performing positioning measurements in a high frequency, e.g., mmWave band, network while reducing the effects of phase noise. In signaling flow 1100, the UE 115 may use less than all symbols in DL PRS for positioning measurement in order to reduce the impact of phase noise. The base station 105 similarly use less than all symbols in UL PRS for positioning measurement in order to reduce the impact of phase noise. While the flow diagram 1100 is discussed, for ease of illustration, in relation to a 5G NR wireless access using gNBs 105, signaling flows similar to FIG. 11 involving other types of high frequency networks and base stations will be readily apparent to those with ordinary skill in the art. Location server 1101 may be, e.g., LMF 196 for a 5G NR network, or an E-SMLC 164 in LTE. Moreover, location server 1101 may be located coincident with a gNB, such as the serving gNB 105-a, or may be located remotely in the core network, e.g., core network 160 or 190 shown in FIG. 1. Furthermore, in some embodiments, the UE 115 itself may be configured to determine its location using, for example, assistance data provided to it. FIG. 11 illustrates implementations for several different positioning methods that may be used separately or combined. For example, FIG. 11 illustrates DL based positioning measurements, UL based positioning measurements and DL and UL based positioning measurements, any of which may be used. In the signaling flow 1100, it is assumed that the UE 115 and location server 1101 communicate using the LPP positioning protocol referred to earlier, although use of NPP or a combination of LPP and NPP or other future protocol, such as NRPPa, is also possible.

At stage 1, the location server 1101 sends a Request Capabilities message to the UE 115, e.g., to request the positioning capabilities of the UE 115.

At stage 2, the UE 115 returns a Provide Capabilities message to the location server 1101 to provide the positioning capabilities of the UE 115. The positioning capabilities may include, e.g., the minimum number of resource blocks required by the UE 115 for positioning measurements or a desired positioning accuracy, which may be provided to the serving base station 105-a.

At stage 3, the location server 1101 sends a Provide Capabilities message to the gNBs 105 that includes, e.g., the relevant information provided by UE 115 at stage 2.

At stage 4, the location server 1101 may send a Provide Assistance Data message to the UE 115 to provide positioning assistance data to assist the UE 115 to acquire and measure the PRS signals and optionally determine a location from the PRS measurements.

At stage 5, the location server 1101 sends a Request Location Information message to the UE 115 to request the UE 115 to measure DL PRS transmission by the gNBs 105. For example, the location server 1101 may request measurements of RSTD if OTDOA is used. The location server 1101 may also indicate whether UE based positioning is requested whereby the UE 115 determines its own location. In some implementations, the location server 1101 may also include in the Request Location Information message a request for location measurements for other position methods which do not use PRS (e.g. WiFi positioning or A-GNSS positioning).

At stage 6, the gNBs 105 transmit DL PRS signals.

At stage 7, the UE 115 may acquire the DL PRS transmitted by the gNBs 105 at stage 6 and perform the desired position measurements using all of the symbols in the PRS frame structure. The UE 115, for example, may measure obtain TOA, RSTD, OTDOA, or AoD. The UE 115 may determine whether phase noise is present, e.g., as discussed in FIGS. 6A, 6B, 7A and 7B.

At stage 8, if it is determined that there is sufficient phase noise to impact positioning measurements in stage 7, the UE 115 may perform the desired position measurements using less than all of the symbols in the PRS frame structure. The UE 115, for example, may measure obtain TOA, RSTD, OTDOA, or AoD. Using less than all of the symbols in the PRS frame structure to generate position measurements reduces the impact of phase noise.

At stage 9, the UE 115 may transmit UL-PRS signals, e.g., SRS.

At stage 10, the base stations 105 may acquire the PRS transmitted by the UE 115 at stage 9 and perform the desired position measurements. The base stations 105 for example, may measure UL-TDOA, UL AoA, or UL-RTOA. The base stations 105 may determine whether phase noise is present, e.g., as discussed in FIGS. 6A, 6B, 7A and 7B.

At stage 11, if it is determined that there is sufficient phase noise to impact positioning measurements in stage 10, the base stations 105 may perform the desired position measurements using less than all of the symbols in the PRS frame structure. The base stations, for example, may measure UL-TDOA, UL AoA, or UL-RTOA. Using less than all of the symbols in the PRS frame structure to generate position measurements reduces the impact of phase noise.

At stage 12, the base stations 105 send a Provide Location Information message to the location server 1101 and includes the PRS measurements (and any other measurements) obtained at stage 11. In some implementations, e.g., where DL and UL based positioning methods are used, the base station may send the Provide Location Information message to the UE 115, as illustrated with dotted lines.

At stage 13, if UE 115 based positioning was requested at stage 5, the UE 115 determines its location based on the positioning measurements (and any other measurements) obtained at stage 8 and the assistance data received at stage 4, and the Provide Location Information message from the base station at stage 10, if used. In some implementations, the estimated position may further use the positioning measurements generated at stage 7. For example, a first set of alias terms may be found in the positioning measurements generated using all of the symbols in stage 7 and a second set of alias terms may be found in the positioning measurements generated using less than all of the symbols in stage 8. Alias terms that are not common to both the first set and second set of alias terms maybe rejected during estimation of the position of the UE 115.

At stage 14, the UE 115 sends a Provide Location Information message to the location server 1101 and includes the positioning measurements (and any other measurements) obtained at stage 8 and optionally at stage 7 and/or the UE location obtained at stage 13.

At stage 15, the location server 1101 determines the UE location based on any positioning measurements (and any other measurements) received at one or more of stage 14, stage 12, or the combination of stage 14 and stage 12 or may verify a UE location received at stage 14. In some implementations, the estimated position may use the positioning measurements generated at stages 7 and 8, stage 10 and 11, or stages 7, 8, 10, and 11. For example, a first set of alias terms may be found in the positioning measurements generated using all of the symbols in stage 7 and a second set of alias terms may be found in the positioning measurements generated using less than all of the symbols in stage 8. Alias terms that are not common to both the first set and second set of alias terms maybe rejected during estimation of the position of the UE 115.

Figure 12:
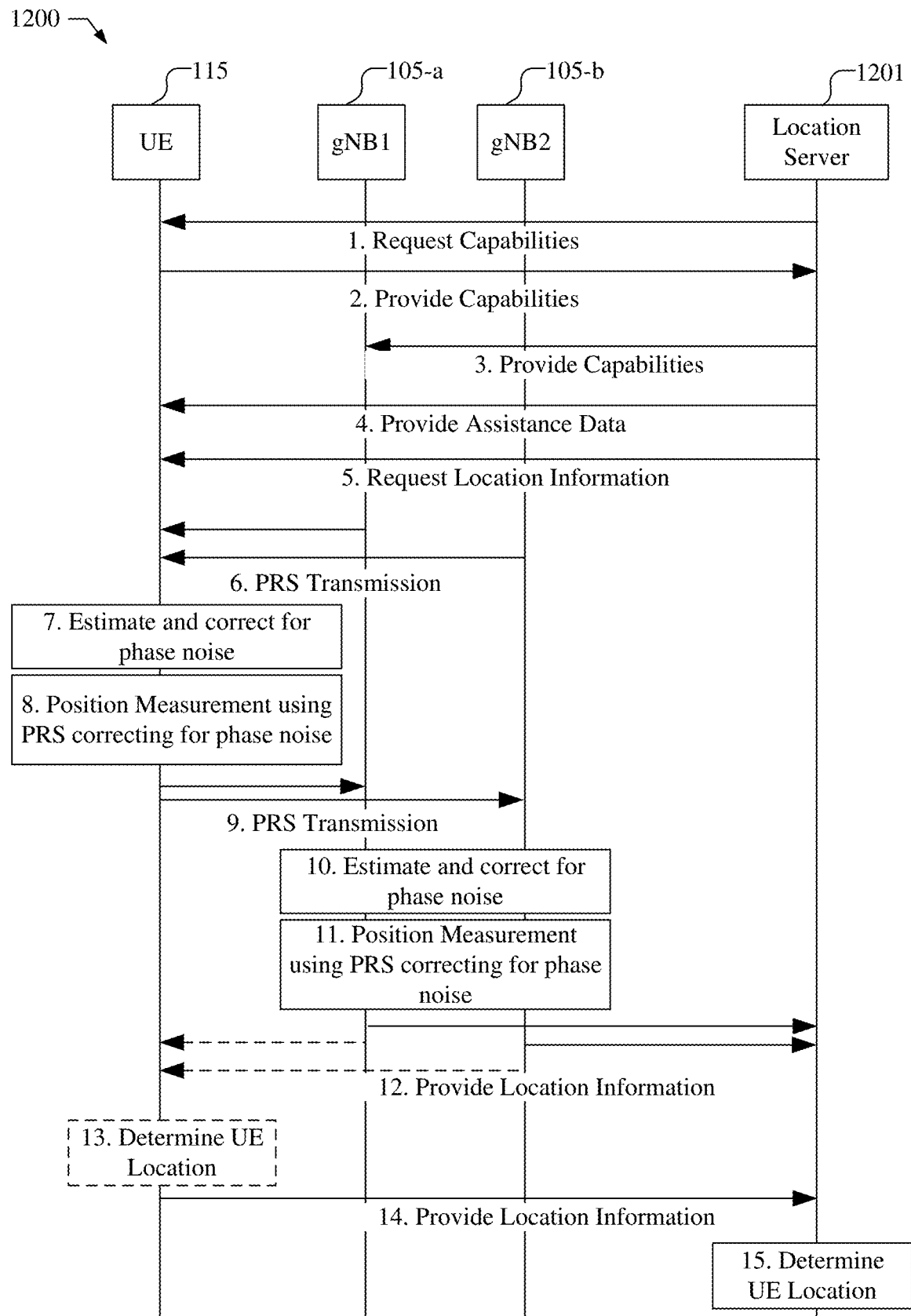
FIG. 12 illustrates an exemplary message flow that supports estimating and correcting phase noise present in PRS transmissions.

FIG. 12 shows a signaling flow 1200 that illustrates various messages sent between components of the communication network 100 depicted in FIGS. 1 and 2, during a location session for performing positioning measurements in a high frequency, e.g., mmWave band, network while reducing the effects of phase noise. In signaling flow 1200, the UE 115 may estimate and correct phase noise in the DL PRS transmissions. The base station 105 may similarly estimate and correct phase noise in UL PRS transmissions. While the flow diagram 1200 is discussed, for ease of illustration, in relation to a 5G NR wireless access using gNBs 105, signaling flows similar to FIG. 12 involving other types of high frequency networks and base stations will be readily apparent to those with ordinary skill in the art. Location server 101 may be, e.g., LMF 196 for a 5G NR network, or an E-SMLC 164 in LTE. Moreover, location server 1201 may be located coincident with a gNB, such as the serving gNB 105-a, or may be located remotely in the core network, e.g., core network 160 or 190 shown in FIG. 1. Furthermore, in some embodiments, the UE 115 itself may be configured to determine its location using, for example, assistance data provided to it. FIG. 12 illustrates implementations for several different positioning methods that may be used separately or combined. For example, FIG. 12 illustrates DL based positioning measurements, UL based positioning measurements and DL and UL based positioning measurements. In the signaling flow 1200, it is assumed that the UE 115 and location server 1201 communicate using the LPP positioning protocol referred to earlier, although use of NPP or a combination of LPP and NPP or other future protocol, such as NRPPa, is also possible.

At stage 1, the location server 1201 sends a Request Capabilities message to the UE 115, e.g., to request the positioning capabilities of the UE 115.

At stage 2, the UE 115 returns a Provide Capabilities message to the location server 1201 to provide the positioning capabilities of the UE 115. The positioning capabilities may include, e.g., the minimum number of resource blocks required by the UE 115 for positioning measurements or a desired positioning accuracy, which may be provided to the serving base station 105-a.

At stage 3, the location server 1201 sends a Provide Capabilities message to the gNBs 105 that includes, e.g., the relevant information provided by UE 115 at stage 2.

At stage 4, the location server 1201 may send a Provide Assistance Data message to the UE 115 to provide positioning assistance data to assist the UE 115 to acquire and measure the PRS signals and optionally determine a location from the PRS measurements.

At stage 5, the location server 1201 sends a Request Location Information message to the UE 115 to request the UE 115 to measure DL PRS transmission by the gNBs 105. For example, the location server 1201 may request measurements of RSTD if OTDOA is used. The location server 1201 may also indicate whether UE based positioning is requested whereby the UE 115 determines its own location. In some implementations, the location server 1201 may also include in the Request Location Information message a request for location measurements for other position methods which do not use PRS (e.g. WiFi positioning or A-GNSS positioning).

At stage 6, the gNBs 105 transmit DL PRS signals.

At stage 7, the UE 115 may acquire the DL PRS transmitted by the gNBs 105 at stage 6 and estimate and correct the phase noise, e.g., as discussed in FIGS. 6A, 6B, 7A and 7B. In some implementations, PTRS may be transmitted with the PRS transmission in stage 6 and the phase noise may be estimated using PTRS, e.g., as discussed in FIGS. 8A and 8B. Thus, the UE 115 may estimate the phase offset between symbols in the PRS signals and then correct the phase offset of each symbol.

At stage 8, the UE 115 may generate the desired position measurements using the corrected PRS signals. The UE 115, for example, may measure TOA, RSTD, OTDOA, or AoD.

At stage 9, the UE 115 may transmit UL-PRS signals, e.g., SRS.

At stage 10, the base stations 105 may acquire the UL PRS transmitted by the UE 115 at stage 9 and estimate and correct the phase noise, e.g., as discussed in FIGS. 6A, 6B, 7A and 7B. In some implementations, PTRS may be transmitted with the PRS transmission in stage 9 and the phase noise may be estimated using PTRS, e.g., as discussed in FIGS. 8A and 8B. Thus, the UE 115 may estimate the phase offset between symbols in the PRS signals and then correct the phase offset of each symbol.

At stage 11, the base stations 105 may generate the desired position measurements using the corrected PRS signals. The base stations 105, for example, may measure UL-TDOA, UL AoA, or UL-RTOA.

At stage 12, the base stations 105 send a Provide Location Information message to the location server 1201 and includes the PRS measurements (and any other measurements) obtained at stage 11. In some implementations, e.g., where DL and UL based positioning methods are used, the base station may send the Provide Location Information message to the UE 115, as illustrated with dotted lines.

At stage 13, if UE 115 based positioning was requested at stage 5, the UE 115 determines its location based on the PRS measurements (and any other measurements) obtained at stage 7 and the assistance data received at stage 4, and the Provide Location Information message from the base station at stage 10, if used.

At stage 14, the UE 115 sends a Provide Location Information message to the location server 1201 and includes the PRS measurements (and any other measurements) obtained at stage 8 and/or the UE location obtained at stage 13.

At stage 15, the location server 1201 determines the UE location based on any PRS measurements (and any other measurements) received at one or more of stage 12, stage 14, or both stage 12 and 14, or may verify a UE location received at stage 14.

Figure 13:
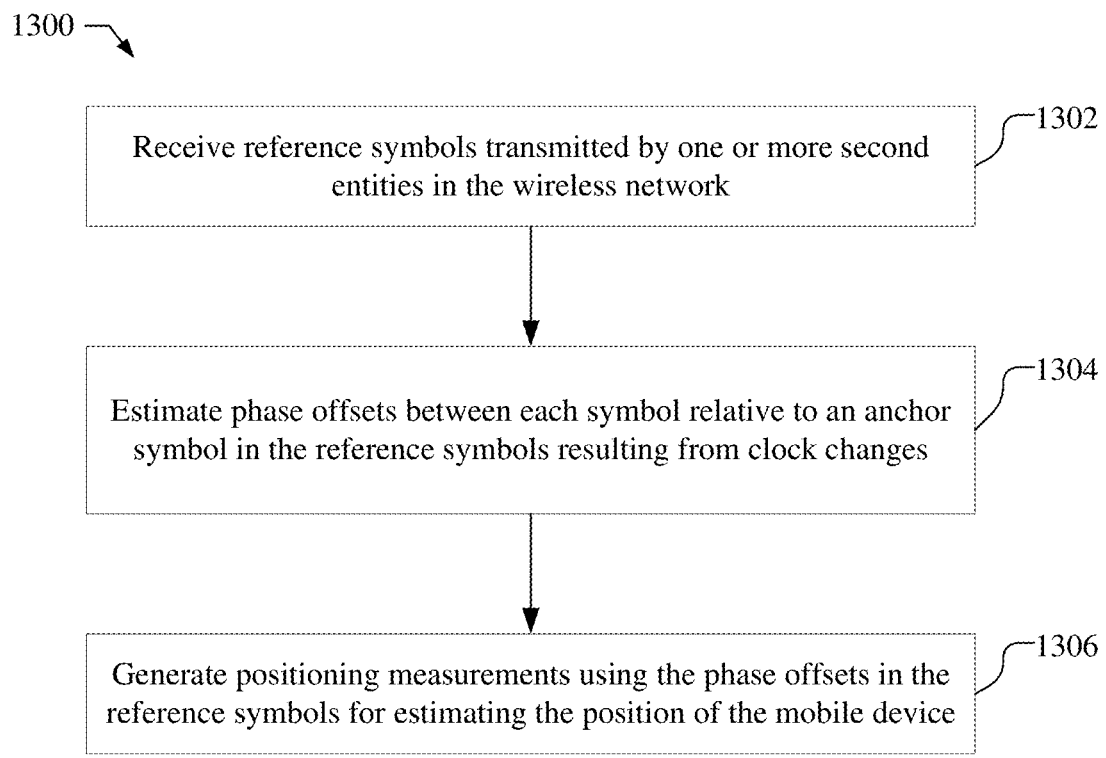
FIG. 13 illustrates a flowchart for an exemplary method of using PTRS with transmitted PRS signals for estimating a position of a mobile device.

FIG. 13 shows a flowchart for an exemplary method 1300 for estimating a position of a mobile device performed by an entity in a wireless network, such as a mobile device (e.g., UE 115) or a base station (e.g., gNB 105) in a manner consistent with disclosed embodiments.

At block 1302, the mobile device receives reference symbols transmitted by one or more second entities in the wireless network, e.g., as discussed at stage 6 of FIG. 9 or stage 10 of FIG. 10, and FIGS. 8A and 8B. At block 1304, the mobile device estimates phase offsets between each symbol relative to an anchor symbol in the reference symbols resulting from clock changes, e.g., as discussed at stage 7 of FIG. 9 or stage 11 of FIG. 10, and FIGS. 8A and 8B. At block 1306, positioning measurements using the phase offsets in the reference symbols are generated for estimating the position of the mobile device, e.g., as discussed at stage 7 of FIG. 9 or stage 11 of FIG. 10, and FIGS. 8A and 8B.

In some implementations, the reference signals may be phase tracking reference symbols.

In some implementations, generating positioning measurements using the phase offsets in the reference symbols includes correcting the phase offset between each symbol in the reference symbols based on the estimated phase offsets in the reference symbols, e.g., as discussed at stage 7 of FIG. 9 or stage 11 of FIG. 10, and FIG. 8A. Positioning measurements are generated using the corrected reference symbols for estimating the position of the mobile device, e.g., as discussed at stage 7 of FIG. 9 or stage 11 of FIG. 10, and FIG. 8A.

In some implementations, the reference symbols are transmitted within a frame structure for the positioning reference signals, e.g., as illustrated in FIGS. 8A and 8B.

In some implementations, the method may further include receiving positioning reference signals with the reference symbols, the positioning reference signals comprising a plurality of symbols where each symbol is comprised of a plurality of sub-carriers, e.g., as discussed at stage 6 of FIG. 9 or stage 10 of FIG. 10, and FIGS. 8A and 8B. For example, in some implementations, generating positioning measurements using the phase offsets in the reference symbols includes correcting the phase offset between each symbol in the positioning reference signals based on the estimated phase offsets in the reference symbols, e.g., as discussed at stage 7 of FIG. 9 or stage 11 of FIG. 10, and FIG. 8B. Positioning measurements may be generated using the corrected positioning reference signals for estimating the position of the mobile device, e.g., as discussed at stage 7 of FIG. 9 or stage 11 of FIG. 10, and FIG. 8B.

In some implementations, the mobile device may request that the reference symbols are transmitted for positioning, e.g., as discussed at stage 2 of FIG. 9 or stage 8 of FIG. 10. In some implementations, the mobile device may receive positioning reference signals without reference symbols from the base station, e.g., as discussed at stage 6 of FIG. 10. The mobile device may determine a presence of phase noise in the received positioning reference signals without reference symbols, e.g., as discussed at stage 7 of FIG. 10. Requesting that the reference symbols are transmitted for positioning may be in response to the presence of the phase noise, e.g., as discussed at stage 8 of FIG. 10.

In some implementations, the phase offset may be estimated by determining a phase of each symbol in the reference symbols, and determining the phase offset between each symbol relative to an anchor symbol in the reference symbol based on the phase of the each symbol in the reference symbols, e.g., as discussed in reference to FIGS. 8A and 8B.

In some implementations, the entity is the mobile device, and the one or more second entities are one or more base stations. The method may further include estimating the position of the mobile device using the positioning measurements, e.g., as discussed at stage 11 in FIG. 9 and stage 13 in FIGS. 10-12.

In some implementations, the method may further include sending the positioning measurements to a location server for estimating the position of the mobile device, e.g., as discussed at stages 10 or 12 in FIG. 9 and stages 12 or 14 in FIGS. 10-12.

In some implementations, the entity is a base station, and the one or more second entities is the mobile device.

Figure 14:
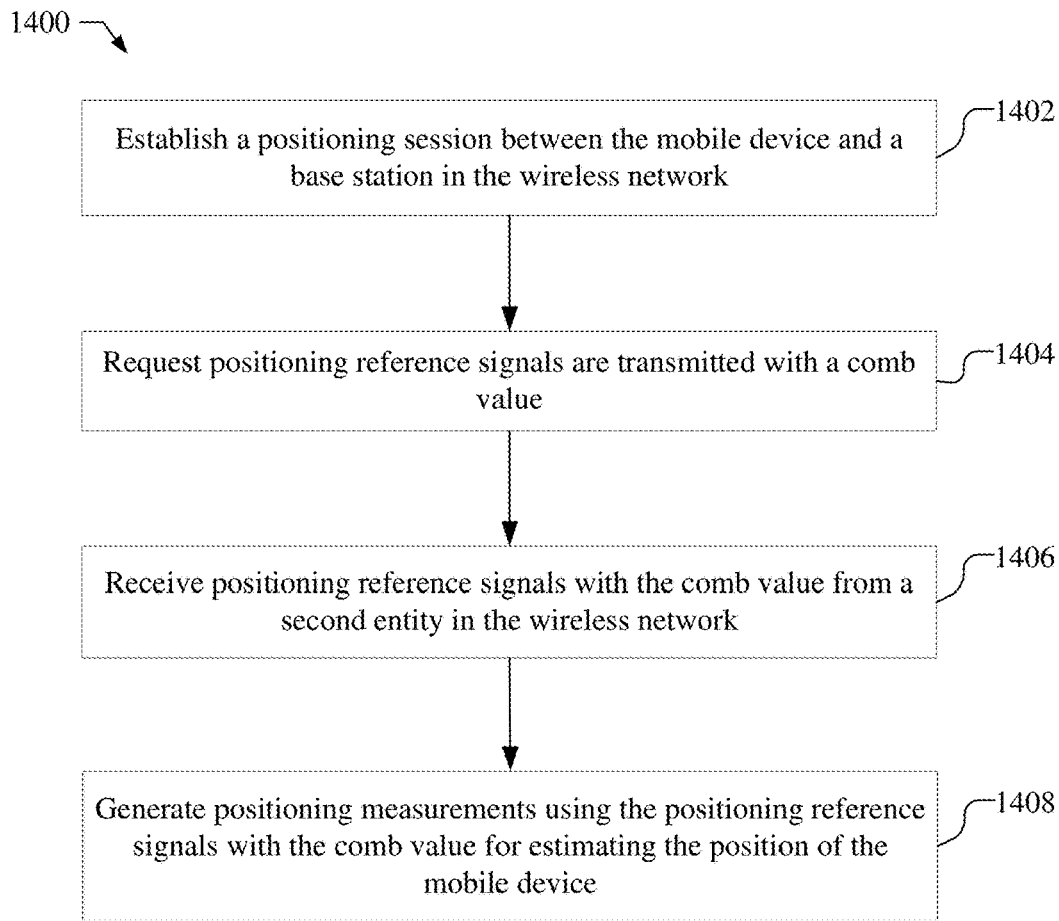
FIG. 14 illustrates a flowchart for an exemplary method of requesting a specific comb value in the PRS frame structure to reduce the impact of phase noise while estimating a position of a mobile device.

FIG. 14 shows a flowchart for an exemplary method 1400 for estimating a position of a mobile device performed by an entity in a wireless network, such as a mobile device (e.g., UE 115) or a base station (e.g., gNB 105) in a manner consistent with disclosed embodiments.

At block 1402, the mobile device establishes a positioning session between the mobile device and a base station in the wireless network, e.g., as discussed stages 1 and 2 of FIG. 9 or stages 1 and 2 of FIG. 10. At block 1404, the mobile device requests that positioning reference signals are transmitted with a comb value, e.g., as discussed at stage 2 of FIG. 9 or stage 8 of FIG. 10. At block 1406, positioning reference signals with the comb value are received from a second entity in the wireless network, e.g., as discussed at stage 6 of FIG. 9 or stage 10 of FIG. 10. At block 1408, positioning measurements are generated using the positioning reference signals with the comb value for estimating the position of the mobile device, e.g., as discussed at stage 7 of FIG. 9 or stage 11 of FIG. 10.

In one implementation, the positioning reference signals with the comb value received from the second entity are a second set of positioning reference signals with a second comb value, e.g., as illustrated at stage 6 and 8 of FIG. 10. The mobile device receives a first set of positioning reference signals from the second entity before requesting the second set positioning reference signals are transmitted with the second comb value, the first set of positioning reference signals having a first comb value that is larger than the second comb value, e.g., as discussed at stage 6 of FIG. 10. The mobile device determines a presence of phase noise in the first set of positioning reference signals with the first comb value, e.g., as discussed at stage 7 of FIG. 10. Requesting the second set of positioning reference signals are transmitted with the second comb value is in response to the presence of the phase noise in the first set of positioning reference signals with the first comb value, e.g., as discussed at stage 8 of FIG. 10.

In some implementations, the comb value is comb-2 or smaller, e.g., as discussed at stage 6 of FIG. 9 or stage 10 of FIG. 10.

In some implementations, the entity is the mobile device, and the second entity is the base station. The method may further include estimating the position of the mobile device using the positioning measurements, e.g., as discussed at stage 11 in FIG. 9 and stage 13 in FIGS. 10-12.

In some implementations, the method may further include sending the positioning measurements to a location server for estimating the position of the mobile device, e.g., as discussed at stages 10 or 12 in FIG. 9 and stages 12 or 14 in FIGS. 10-12.

In some implementations, the entity is the base station, and the second entity is the mobile device.

Figure 15:
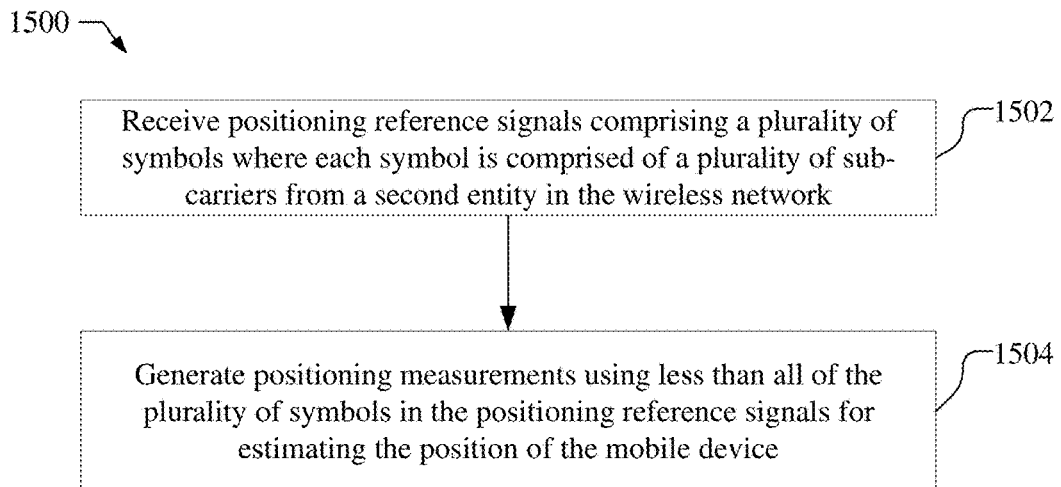
FIG. 15 illustrates a flowchart for an exemplary method of using less than all symbols included in the received PRS to reduce the impact of phase noise while estimating a position of a mobile device.

FIG. 15 shows a flowchart for an exemplary method 1500 for estimating a position of a mobile device performed by an entity in a wireless network, such as a mobile device (e.g., UE 115) or a base station (e.g., gNB 105) in a manner consistent with disclosed embodiments.

At block 1502, the mobile device receives positioning reference signals comprising a plurality of symbols where each symbol is comprised of a plurality of sub-carriers from a second entity in the wireless network, e.g., as discussed at stage 6 of FIG. 11. At stage 1504, the mobile device generates positioning measurements using less than all of the plurality of symbols in the positioning reference signals for estimating the position of the mobile device, e.g., as discussed at stage 8 of FIG. 11.

In some implementations, the mobile device determines a presence of phase noise in the received positioning reference signals using all of the plurality of symbols, e.g., as discussed at stage 7 of FIG. 11. The positioning measurements may be generated using less than all of the plurality of symbols in response to the presence of the phase noise, e.g., as discussed at stage 8 of FIG. 11. For example, the presence of phase noise in the received positioning reference signals may be determined using all of the plurality of symbols by generating positioning measurements using all of the plurality of symbols in the positioning reference signals, e.g., as discussed at stage 7 of FIG. 11. Phase nose may be detected in the positioning measurements using all of the plurality of symbols, e.g., as discussed at stage 7 of FIG. 11. The process may further include "using the positioning measurements generated using all of the plurality of symbols in the positioning reference signals to generate the positioning measurements using less than all of the plurality of symbols in the positioning reference signals for estimating the position of the mobile device, e.g., as discussed at stage 9 of FIG. 11. For example, the mobile device may find a first set of alias terms in the positioning measurements generated using all of the plurality of symbols in the positioning reference signals, find a second set of alias terms in the positioning measurements generated using less than all of the plurality of symbols, and reject alias terms that are not common to the first set and the second set during estimating the position of the mobile device, e.g., as discussed at stage 9 of FIG. 11.

In some implementations, the entity is the mobile device, and the second entity is a base station. The method may further include estimating the position of the mobile device using the positioning measurements, e.g., as discussed at stage 11 in FIG. 9 and stage 13 in FIGS. 10-12.

In some implementations, the method may further include sending the positioning measurements to a location server for estimating the position of the mobile device, e.g., as discussed at stages 10 or 12 in FIG. 9 and stages 12 or 14 in FIGS. 10-12.

In some implementations, the entity is a base station, and the second entity is the mobile device.

Figure 16:
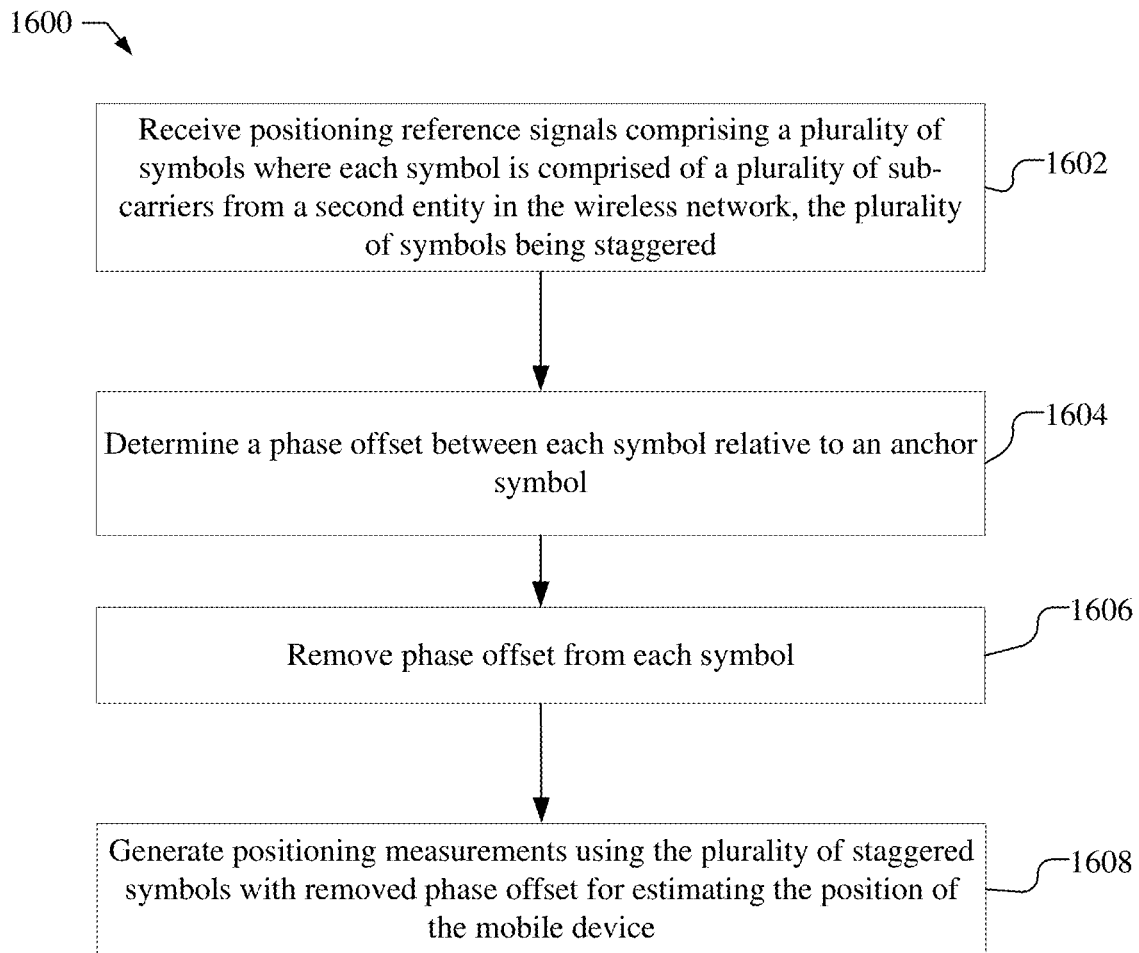
FIG. 16 illustrates a flowchart for an exemplary method of estimating and correcting phase noise present in PRS transmissions for estimating a position of a mobile device.

FIG. 16 shows a flowchart for an exemplary method 1600 for estimating a position of a mobile device performed by an entity in a wireless network, such as a mobile device (e.g., UE 115) or a base station (e.g., gNB 105) in a manner consistent with disclosed embodiments.

At block 1602, the mobile device receives positioning reference signals comprising a plurality of symbols where each symbol is comprised of a plurality of sub-carriers from a second entity in the wireless network, the plurality of symbols being staggered, e.g., as discussed at stage 6 of FIG. 9, stage 10 of FIG. 10, and stage 6 of FIG. 12. At block 1604, the mobile device determines a phase offset between each symbol relative to an anchor symbol, e.g., as discussed at stage 7 of FIG. 9, stage 11 of FIG. 10, and stage 7 of FIG. 12. At block 1606, the mobile device removes phase offset from each symbol, e.g., as discussed at stage 7 of FIG. 9, stage 11 of FIG. 10, and stage 7 of FIG. 12. At block 1608, the mobile device generates positioning measurements using the plurality of staggered symbols with removed phase offset for estimating the position of the mobile device, e.g., as discussed at stage 7 of FIG. 9, stage 11 of FIG. 10, and stage 8 of FIG. 12.

In one implementation, determining the phase offset between each symbol relative to the anchor symbol includes receiving reference symbols with the positioning reference signals, e.g., as discussed at stage 6 of FIG. 9, stage 10 of FIG. 10, and stage 6 of FIG. 12. The phase of the reference symbols is determined, e.g., as discussed at stage 7 of FIG. 9, stage 11 of FIG. 10, and stage 7 of FIG. 12. The phase offset between each symbol relative to the anchor symbol is determined based on the phase of the reference symbols, e.g., as discussed at stage 7 of FIG. 9, stage 11 of FIG. 10, and stage 7 of FIG. 12. For example, the reference signals may be phase tracking reference symbols.

In one implementation, determining the phase offset between each symbol relative to the anchor symbol includes determining for each symbol a phase ramp between sub-carriers, e.g., as discussed at FIGS. 7A and 7B and stage 7 of FIG. 12. The phase offset between each symbol relative to the anchor symbol is determined based on the phase ramp, e.g., as discussed at FIGS. 7A and 7B and stage 7 of FIG. 12.

In one implementation, the entity is the mobile device, and the second entity is a base station. The method may further include estimating the position of the mobile device using the positioning measurements, e.g., as discussed at stage 11 in FIG. 9 and stage 13 in FIGS. 10-12.

In some implementations, the method may further include sending the positioning measurements to a location server for estimating the position of the mobile device, e.g., as discussed at stages 10 or 12 in FIG. 9 and stages 12 or 14 in FIGS. 10-12.

In some implementation, the entity is a base station, and the second entity is the mobile device.

Figure 17:
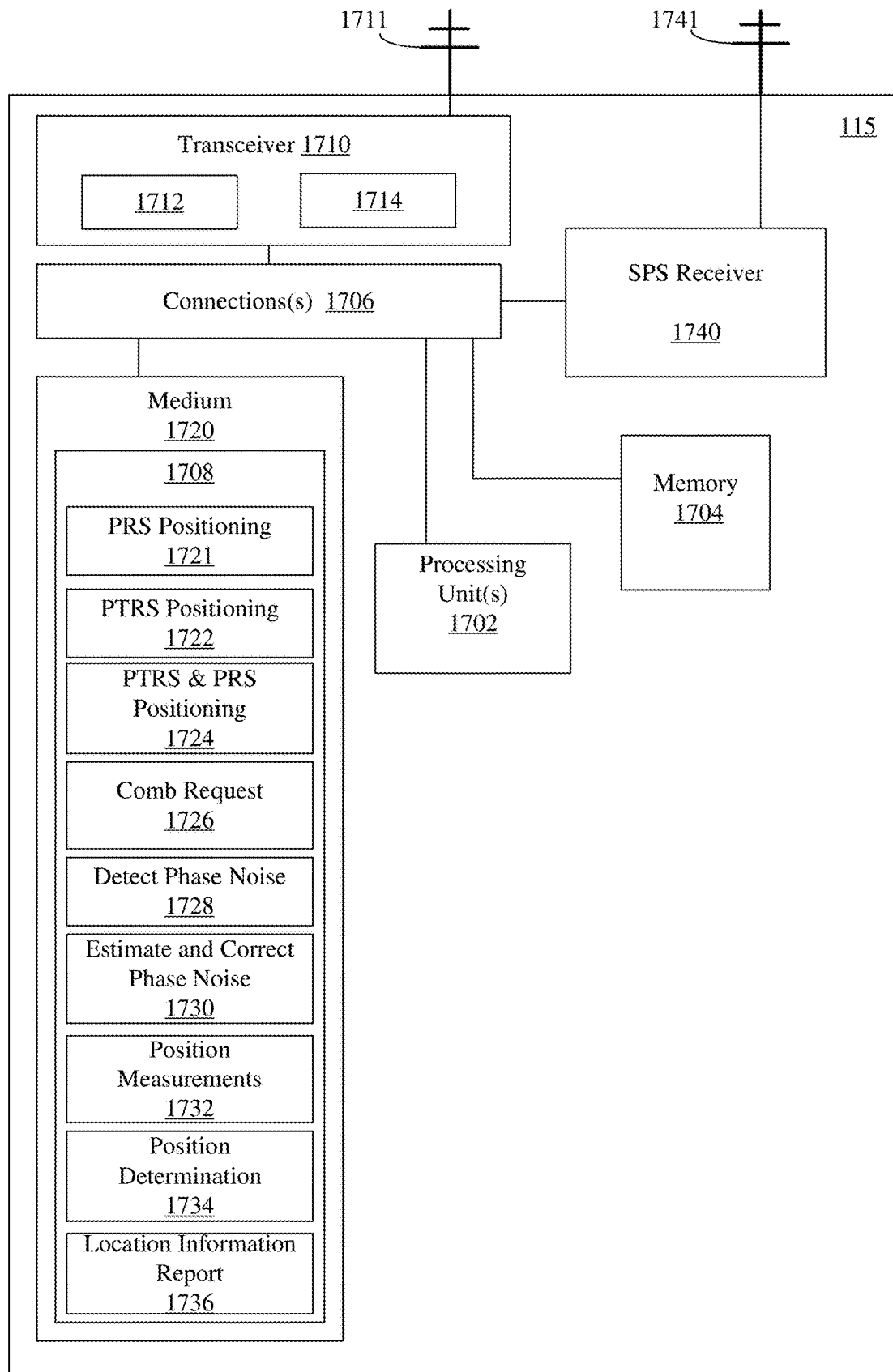
FIG. 17 illustrates a schematic block diagram showing certain exemplary features of a mobile device enabled to reduce the impact of phase noise in PRS signals for estimating a position of the mobile device.

FIG. 17 shows a schematic block diagram illustrating certain exemplary features of a mobile device, e.g., UE 115, enabled to support improvement of positioning accuracy in the presence of phase noise in high frequency radio network, such as in 5G NR operating in mmWave bands in a manner consistent with disclosed embodiments. Mobile device 115 may, for example, include one or more processors 1702, memory 1704, a transceiver 1710 (e.g., wireless network interface), and (as applicable) an SPS receiver 1740, which may be operatively coupled with one or more connections 1706 (e.g., buses, lines, fibers, links, etc.) to non-transitory computer readable medium 1720 and memory 1704. The mobile device 115 may further include additional items, which are not shown, such as a user interface that may include e.g., a display, a keypad or other input device, such as virtual keypad on the display, through which a user may interface with the mobile device. In certain example implementations, all or part of mobile device 115 may take the form of a chipset, and/or the like. The SPS receiver 1740 may be enabled to receive signals associated with one or more SPS resources. Transceiver 1710 may, for example, include a transmitter 1712 enabled to transmit one or more signals over one or more types of wireless communication networks and a receiver 1714 to receive one or more signals transmitted over the one or more types of wireless communication networks.

In some embodiments, mobile device 115 may include antennas 1711 and 1741, which may be internal or external. Mobile device antennas 1711 and 1741 may be used to transmit and/or receive signals processed by transceiver 1710 and SPS receiver 1740, respectively. In some embodiments, mobile device antennas 1711, and 1741 may be coupled to transceiver 1710 and SPS receiver 1740. In some embodiments, measurements of signals received (transmitted) by mobile device 115 may be performed at the point of connection of the mobile device antenna 1711 and transceiver 1710. For example, the measurement point of reference for received (transmitted) RF signal measurements may be an input (output) terminal of the receiver 1714 (transmitter 1712) and an output (input) terminal of the mobile device antennas 1711. In a mobile device 115 with multiple mobile device antennas 1711 or antenna arrays, the antenna connector may be viewed as a virtual point representing the aggregate output (input) of multiple mobile device antennas.

In some embodiments, mobile device 115 may measure received signals including signal strength and TOA measurements and the raw measurements may be processed by the one or more processors 1702. In some embodiments, the antennas 1711 and 1741 may be combined.

The one or more processors 1702 may be implemented using a combination of hardware, firmware, and software. For example, the one or more processors 1702 may be configured to perform the functions discussed herein by implementing one or more instructions or program code 1708 on a non-transitory computer readable medium, such as medium 1720 and/or memory 1704. In some embodiments, the one or more processors 1702 may represent one or more circuits configurable to perform at least a portion of a data signal computing procedure or process related to the operation of mobile device 115.

The medium 1720 and/or memory 1704 may store instructions or program code 1708 that contain executable code or software instructions that when executed by the one or more processors 1702 cause the one or more processors 1702 to operate as a special purpose computer programmed to perform the techniques disclosed herein. As illustrated in mobile device 115, the medium 1720 and/or memory 1704 may include one or more components or modules that may be implemented by the one or more processors 1702 to perform the methodologies described herein. While the components or modules are illustrated as software in medium 1720 that is executable by the one or more processors 1702, it should be understood that the components or modules may be stored in memory 1704 or may be dedicated hardware either in the one or more processors 1702 or off the processors.

A number of software modules and data tables may reside in the medium 1720 and/or memory 1704 and be utilized by the one or more processors 1702 in order to manage both communications and the functionality described herein. It should be appreciated that the organization of the contents of the medium 1720 and/or memory 1704 as shown in mobile device 115 is merely exemplary, and as such the functionality of the modules and/or data structures may be combined, separated, and/or be structured in different ways depending upon the implementation of the mobile device 115.

The medium 1720 and/or memory 1704 may include a PRS positioning unit 1721 that that when implemented by the one or more processors 1702 configures the one or more processors 1702 to perform positioning measurements from PRS signals received from one or more base stations e.g., via transceiver 1710.

The medium 1720 and/or memory 1704 may include a PTRS positioning unit 1722 that that when implemented by the one or more processors 1702 configures the one or more processors 1702 to perform positioning measurements from PTRS signals received from one or more base stations e.g., via transceiver 1710. The PTRS positioning unit 1722 may further configure the one or more processors 1702 to request PTRS for positioning, e.g., via transceiver 1710, if phase noise is detected in DL PRS. Additionally, the PTRS positioning unit 1722 may further configure the one or more processors 1702 to transmit PTRS for positioning in UL PRS, e.g., via transceiver 1710.

The medium 1720 and/or memory 1704 may include an PTRS and PRS positioning unit 1724 that that when implemented by the one or more processors 1702 configures the one or more processors 1702 to perform positioning measurements from PTRS and PRS signals received from one or more base stations e.g., via transceiver 1710. The PTRS and PRS positioning unit 1724 may further configure the one or more processors 1702 to request PTRS and PRS for positioning, e.g., via transceiver 1710, if phase noise is detected in DL PRS. Additionally, the PTRS and PRS positioning unit 1724 may further configure the one or more processors 1702 to transmit PTRS and PRS, e.g., SRS, for positioning in UL PRS, e.g., via transceiver 1710.

The medium 1720 and/or memory 1704 may include a comb request unit 1726 that that when implemented by the one or more processors 1702 configures the one or more processors 1702 to perform positioning measurements from PRS signals received from one or more base stations using a specific PRS frame structure, such as comb 2 or comb 1, e.g., via transceiver 1710. The comb request unit 1726 may further configure the one or more processors 1702 to request a specific PRS frame structure, such as comb 2 or comb 1, for positioning, e.g., via transceiver 1710, if phase noise is detected in DL PRS. Additionally, the comb request unit 1726 may further configure the one or more processors 1702 to transmit a specific frame structure, such as comb 2 or comb 1, for positioning in UL PRS, e.g., via transceiver 1710.

The medium 1720 and/or memory 1704 may include a detect phase noise unit 1728 that that when implemented by the one or more processors 1702 configures the one or more processors 1702 to determine if sufficient phase noise is present in received PRS signals to impact positioning measurements, e.g., as discussed in FIGS. 6A, 6B, 7A and 7B and FIGS. 10 and 11.

The medium 1720 and/or memory 1704 may include an estimate and correct phase noise unit 1730 that that when implemented by the one or more processors 1702 configures the one or more processors 1702 to estimate the phase noise present in received PRS signals and to correct the signals for phase noise, e.g., as discussed in FIGS. 6A, 6B, 7A, 7B, 8A, and 8B, and FIG. 12.

The medium 1720 and/or memory 1704 may include a position measurements unit 1732 that that when implemented by the one or more processors 1702 configures the one or more processors 1702 to generate position measurements using the received PRS signals. In some implementations, the position measurements unit 1732 may configure the one or more processors 1702 to generate position measurements using less than all symbols in the PRS signals. For example, the position measurements may be time of arrival (TOA) measurements of signals from the reference cell and one or more neighbor cells or may be DL Time Difference of Arrival (DL-TDOA), DL Angle of Departure (DL AoD), Enhanced Cell ID (ECID), or Rx-Tx measurements.

The medium 1720 and/or memory 1704 may include a positioning determination unit 1734 that that when implemented by the one or more processors 1702 configures the one or more processors 1702 to estimate the position of the UE 115 using the position measurements generated using the position measurements unit 1732, and in some implementations, with position measurements received from base stations.

The medium 1720 and/or memory 1704 may include a location information report unit 1736 that that when implemented by the one or more processors 1702 configures the one or more processors 1702 to transmit, e.g., via transceiver 1710, location information, such as position measurements and/or estimate of position to a location server.

The methodologies described herein may be implemented by various means depending upon the application. For example, these methodologies may be implemented in hardware, firmware, software, or any combination thereof. For a hardware implementation, the one or more processors 1702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1720 or memory 1704 that is connected to and executed by the one or more processors 1702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1708 on a non-transitory computer readable medium, such as medium 1720 and/or memory 1704. Examples include computer readable media encoded with a data structure and computer readable media encoded with a computer program 1708. For example, the non-transitory computer readable medium including program code 1708 stored thereon may include program code 1708 to support OTDOA measurements in a manner consistent with disclosed embodiments. Non-transitory computer readable medium 1720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1708 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1720, instructions and/or data may be provided as signals on transmission media included in a communication apparatus. For example, a communication apparatus may include a transceiver 1710 having signals indicative of instructions and data. The instructions and data are configured to cause one or more processors to implement the functions outlined in the claims. That is, the communication apparatus includes transmission media with signals indicative of information to perform disclosed functions.

Memory 1704 may represent any data storage mechanism. Memory 1704 may include, for example, a primary memory and/or a secondary memory. Primary memory may include, for example, a random access memory, read only memory, etc. While illustrated in this example as being separate from one or more processors 1702, it should be understood that all or part of a primary memory may be provided within or otherwise co-located/coupled with the one or more processors 1702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1720. As such, in certain example implementations, the methods and/or apparatuses presented herein may take the form in whole or part of a computer readable medium 1720 that may include computer implementable code 1708 stored thereon, which if executed by at least one processors 1702 may be operatively enabled to perform all or portions of the example operations as described herein. Computer readable medium 1720 may be a part of memory 1704.

An entity in a wireless network capable of estimating a position of a mobile device, such as UE 115, may include means for receiving reference symbols for positioning transmitted by one or more second entities in the wireless network, which may be, e.g., the wireless transceiver 1710 and antenna array 1711 and one or more processors 1702 with dedicated hardware or implementing executable code or software instructions in medium 1720 and/or memory 1704 such as the PTRS positioning unit 1722. Means for estimating phase offsets between each symbol relative to an anchor symbol in the reference symbols resulting from clock changes may be, e.g., one or more processors 1702 with dedicated hardware or implementing executable code or software instructions in medium 1720 and/or memory 1704 such as the estimate and correct phase noise unit 1730. Means for generating positioning measurements using the phase offsets in the reference symbols for estimating the position of the mobile device may be, e.g., one or more processors 1702 with dedicated hardware or implementing executable code or software instructions in medium 1720 and/or memory 1704 such as the position measurements unit 1732.

In one implementation, the means for generating positioning measurements using the phase offsets in the reference symbols may include means for correcting the phase offset between each symbol in the reference symbols based on the estimated phase offsets in the reference symbols, which may be, e.g., one or more processors 1702 with dedicated hardware or implementing executable code or software instructions in medium 1720 and/or memory 1704 such as the estimate and correct phase noise unit 1730. Means for generating positioning measurements using the corrected reference symbols for estimating the position of the mobile device may be, e.g., one or more processors 1702 with dedicated hardware or implementing executable code or software instructions in medium 1720 and/or memory 1704 such as the position measurements unit 1732.

In one implementation, the entity may include means for receiving positioning reference signals with the reference symbols, the positioning reference signals comprising a plurality of symbols where each symbol is comprised of a plurality of sub-carriers, which may be, e.g., the wireless transceiver 1710 and antenna array 1711 and one or more processors 1702 with dedicated hardware or implementing executable code or software instructions in medium 1720 and/or memory 1704 such as the PTRS & PRS positioning unit 1724. The means for generating positioning measurements using the phase offsets in the reference symbols may include means for correcting the phase offset between each symbol in the positioning reference signals based on the estimated phase offsets in the reference symbols, which may be, e.g., one or more processors 1702 with dedicated hardware or implementing executable code or software instructions in medium 1720 and/or memory 1704 such as the estimate and correct phase noise unit 1730. Means for generating positioning measurements using the corrected positioning reference signals for estimating the position of the mobile device may be, e.g., one or more processors 1702 with dedicated hardware or implementing executable code or software instructions in medium 1720 and/or memory 1704 such as the position measurements unit 1732.

In one implementation, the entity may further include means for requesting that the reference symbols are transmitted for positioning, which may be, e.g., the wireless transceiver 1710 and antenna array 1711 and one or more processors 1702 with dedicated hardware or implementing executable code or software instructions in medium 1720 and/or memory 1704 such as the PTRS positioning unit 1722. In one implementation, the entity further includes means for receiving positioning reference signals without reference symbols from the one or more second entities in the wireless network, which may be, e.g., the wireless transceiver 1710 and antenna array 1711 and one or more processors 1702 with dedicated hardware or implementing executable code or software instructions in medium 1720 and/or memory 1704 such as the PRS positioning unit 1721. Means for determining a presence of phase noise in the received positioning reference signals without reference symbols may be, e.g., one or more processors 1702 with dedicated hardware or implementing executable code or software instructions in medium 1720 and/or memory 1704 such as the detect phase noise unit 1728.

In one implementation, the means for estimating the phase offset may include means for determining a phase of each symbol in the reference symbols, which may be, e.g., one or more processors 1702 with dedicated hardware or implementing executable code or software instructions in medium 1720 and/or memory 1704 such as the estimate and correct phase noise unit 1730. Means for determining the phase offset between each symbol relative to the anchor symbol in the reference symbols based on the phase of the each symbol in the reference symbols may be, e.g., one or more processors 1702 with dedicated hardware or implementing executable code or software instructions in medium 1720 and/or memory 1704 such as the estimate and correct phase noise unit 1730.

An entity in a wireless network capable of estimating a position of a mobile device, such as UE 115, may include means for establishing a positioning session between the mobile device and a base station in the wireless network, which may be, e.g., the wireless transceiver 1710 and antenna array 1711 and one or more processors 1702 with dedicated hardware or implementing executable code or software instructions in medium 1720 and/or memory 1704. Means for requesting positioning reference signals are transmitted with a comb value may be, e.g., the wireless transceiver 1710 and antenna array 1711 and one or more processors 1702 with dedicated hardware or implementing executable code or software instructions in medium 1720 and/or memory 1704, such as the comb request unit 1726. Means for means for receiving positioning reference signals with the comb value from a second entity in the wireless network may be, e.g., the wireless transceiver 1710 and antenna array 1711 and one or more processors 1702 with dedicated hardware or implementing executable code or software instructions in medium 1720 and/or memory 1704, such as the PRS positioning unit 1721. Means for generating positioning measurements using the positioning reference signals with the comb value for estimating the position of the mobile device may be, e.g., one or more processors 1702 with dedicated hardware or implementing executable code or software instructions in medium 1720 and/or memory 1704, such as the position measurements unit 1732.

In one implementation, the positioning reference signals with the comb value received from the second entity is a second set of positioning reference signals with a second comb value, the entity further includes means for receiving a first set of positioning reference signals from the second entity before requesting the second set positioning reference signals are transmitted with the second comb value, the first set of positioning reference signals having a first comb value that is larger than the second comb value, which may be, e.g., the wireless transceiver 1710 and antenna array 1711 and one or more processors 1702 with dedicated hardware or implementing executable code or software instructions in medium 1720 and/or memory 1704, such as the PRS positioning unit 1721. Means for determining a presence of phase noise in the first set of positioning reference signals with the first comb value, may be, e.g., one or more processors 1702 with dedicated hardware or implementing executable code or software instructions in medium 1720 and/or memory 1704, such as the detect phase noise unit 1728.

An entity in a wireless network capable of estimating a position of a mobile device, such as UE 115, may include means for receiving positioning reference signals comprising a plurality of symbols where each symbol is comprised of a plurality of sub-carriers from a second entity in the wireless network, which may be, e.g., the wireless transceiver 1710 and antenna array 1711 and one or more processors 1702 with dedicated hardware or implementing executable code or software instructions in medium 1720 and/or memory 1704 such as the PRS positioning unit 1721. Means for generating positioning measurements using less than all of the plurality of symbols in the positioning reference signals for estimating the position of the mobile device may be, e.g., one or more processors 1702 with dedicated hardware or implementing executable code or software instructions in medium 1720 and/or memory 1704 such as the position measurements unit 1732.

In one implementation, the entity further includes means for determining a presence of phase noise in the received positioning reference signals using all of the plurality of symbols, which may be, e.g., one or more processors 1702 with dedicated hardware or implementing executable code or software instructions in medium 1720 and/or memory 1704 such as the detect phase noise unit 1728. The means for determining the presence of phase noise in the received positioning reference signals using all of the plurality of symbols may include means for generating positioning measurements using all of the plurality of symbols in the positioning reference signals, which may be, e.g., one or more processors 1702 with dedicated hardware or implementing executable code or software instructions in medium 1720 and/or memory 1704 such as the position measurements unit 1732. Means for detecting phase noise in the positioning measurements using all of the plurality of symbols may be, e.g., one or more processors 1702 with dedicated hardware or implementing executable code or software instructions in medium 1720 and/or memory 1704 such as the detect phase noise unit 1728. In one implementation, the entity further includes means for using the positioning measurements generated using all of the plurality of symbols in the positioning reference signals to generate the positioning measurements using less than all of the plurality of symbols in the positioning reference signals for estimating the position of the mobile device, which may be, e.g., one or more processors 1702 with dedicated hardware or implementing executable code or software instructions in medium 1720 and/or memory 1704 such as the position measurements unit 1732. The means for using the positioning measurements generated using all of the plurality of symbols in the positioning reference signals to generate the positioning measurements using less than all of the plurality of symbols in the positioning reference signals for estimating the position of the mobile device may include means for finding a first set of alias terms in the positioning measurements generated using all of the plurality of symbols in the positioning reference signals; means for finding a second set of alias terms in the positioning measurements generated using less than all of the plurality of symbols; and means for rejecting alias terms that are not common to the first set and the second set during estimating the position of the mobile device, which may be, e.g., one or more processors 1702 with dedicated hardware or implementing executable code or software instructions in medium 1720 and/or memory 1704 such as the position measurements unit 1732.

An entity in a wireless network capable of estimating a position of a mobile device, such as UE 115, may include means for receiving positioning reference signals comprising a plurality of symbols where each symbol is comprised of a plurality of sub-carriers from a second entity in the wireless network, the plurality of symbols being staggered, which may be, e.g., the wireless transceiver 1710 and antenna array 1711 and one or more processors 1702 with dedicated hardware or implementing executable code or software instructions in medium 1720 and/or memory 1704 such as the PRS positioning unit 1721. Means for determining a phase offset between each symbol relative to an anchor symbol may be, e.g., one or more processors 1702 with dedicated hardware or implementing executable code or software instructions in medium 1720 and/or memory 1704 such as the estimate and correct phase noise unit 1730. Means for removing phase offset from each symbol may be, e.g., one or more processors 1702 with dedicated hardware or implementing executable code or software instructions in medium 1720 and/or memory 1704 such as the estimate and correct phase noise unit 1730. Means for generating positioning measurements using the plurality of staggered symbols with removed phase offset for estimating the position of the mobile device may be, e.g., one or more processors 1702 with dedicated hardware or implementing executable code or software instructions in medium 1720 and/or memory 1704 such as the position measurements unit 1732.

In one implementation, the means for determining the phase offset between each symbol relative to the anchor symbol includes means for receiving reference symbols with the positioning reference signals, which may be, e.g., the wireless transceiver 1710 and antenna array 1711 and one or more processors 1702 with dedicated hardware or implementing executable code or software instructions in medium 1720 and/or memory 1704 such as the PTRS and PRS positioning unit 1724. Means for determining phase of the reference symbols may be, e.g., one or more processors 1702 with dedicated hardware or implementing executable code or software instructions in medium 1720 and/or memory 1704 such as the estimate and correct phase noise unit 1730. Means for determining the phase offset between each symbol relative to the anchor symbol based on a phase of the reference symbols may be, e.g., one or more processors 1702 with dedicated hardware or implementing executable code or software instructions in medium 1720 and/or memory 1704 such as the estimate and correct phase noise unit 1730. The means for determining the phase offset between each symbol relative to the anchor symbol may include means for determining for each symbol a phase ramp between sub-carriers may be, e.g., one or more processors 1702 with dedicated hardware or implementing executable code or software instructions in medium 1720 and/or memory 1704 such as the estimate and correct phase noise unit 1730. Means for determining the phase offset between each symbol relative to the anchor symbol based on the phase ramp may be, e.g., one or more processors 1702 with dedicated hardware or implementing executable code or software instructions in medium 1720 and/or memory 1704 such as the estimate and correct phase noise unit 1730.

In one implementation, the entity in a wireless network, such as UE 115, may include means for estimating the position of the mobile device using the positioning measurements, which may be, e.g., the wireless transceiver 1710 and antenna array 1711 and one or more processors 1702 with dedicated hardware or implementing executable code or software instructions in medium 1720 and/or memory 1704 such as the positioning determination unit 1734.

In one implementation, the entity in a wireless network may include means for sending the positioning measurements to a location server for estimating the position of the mobile device, which may be, e.g., the wireless transceiver 1710 and antenna array 1711 and one or more processors 1702 with dedicated hardware or implementing executable code or software instructions in medium 1720 and/or memory 1704 such as the location information report unit 1736.

Figure 18:
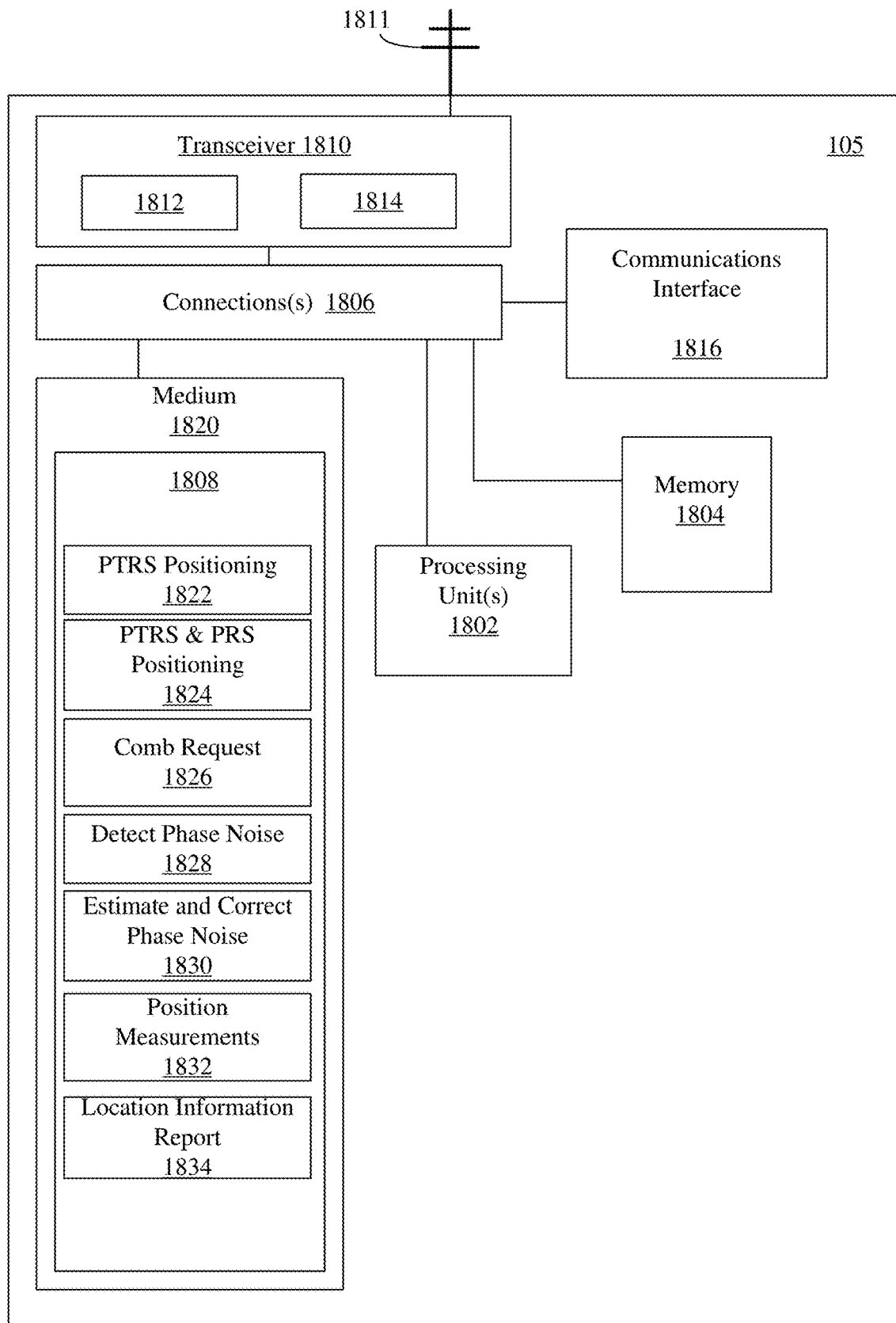
FIG. 18 illustrates a schematic block diagram showing certain exemplary features of a base station enabled to reduce the impact of phase noise in PRS signals for estimating a position of the mobile device.

FIG. 18 shows a schematic block diagram illustrating certain exemplary features of a base station, e.g., gNB 105, enabled to support improvement of positioning accuracy in the presence of phase noise in high frequency radio network, such as in 5G NR operating in mmWave bands in a manner consistent with disclosed embodiments. In some embodiments, base station 105 may include, for example, one or more processors 1802, memory 1804, a transceiver 1810 (e.g., wireless network interface), and (as applicable) communications interface 1880 (e.g., wireline or wireless network interface), which may be operatively coupled with one or more connections 1806 (e.g., buses, lines, fibers, links, etc.) to non-transitory computer readable medium 1820 and memory 1804. In certain example implementations, some portion of base station 105 may take the form of a chipset, and/or the like.

Transceiver 1810 may, for example, include a transmitter 1812 enabled to transmit one or more signals over one or more types of wireless communication networks and a receiver 1814 to receive one or more signals transmitted over the one or more types of wireless communication networks. Base station 105 may include antenna 1811 to transmit and/or receive signals processed by transceiver 1810.

Communications interface 1816 may include a variety of wired and wireless connections that support wired transmission and/or reception and, if desired, may additionally or alternatively support transmission and reception of one or more signals over one or more types of wireless communication networks. Communications interface 1806 may also include interfaces for communication with various other computers and peripherals. For example, in one embodiment, communications interface 1806 may comprise network interface cards, input-output cards, chips and/or ASICs that implement one or more of the communication functions performed by base station 105. In some embodiments, communications interface 1806 may also interface with network 100 to obtain a variety of network configuration related information, such as PCIs, configured PRS information, and/or timing information used by the base stations in the network.

The one or more processors 1802 may be implemented using a combination of hardware, firmware, and software. For example, one or more processors 1802 may be configured to perform the functions discussed herein by implementing one or more instructions or program code 1808 on a non-transitory computer readable medium, such as medium 1820 and/or memory 1804. In some embodiments, the one or more processors 1802 may represent one or more circuits configurable to perform at least a portion of a data signal computing procedure or process related to the operation of base station 105.

The medium 1820 and/or memory 1804 may store instructions or program code 1808 that contain executable code or software instructions that when executed by the one or more processors 1802 cause the one or more processors 1802 to operate as a special purpose computer programmed to perform the techniques disclosed herein. As illustrated in base station 105, the medium 1820 and/or memory 1804 may include one or more components or modules that may be implemented by the one or more processors 1802 to perform the methodologies described herein. While the components or modules are illustrated as software in medium 1820 that is executable by the one or more processors 1802, it should be understood that the components or modules may be stored in memory 1804 or may be dedicated hardware either in the one or more processors 1802 or off the processors.

A number of software modules and data tables may reside in the medium 1820 and/or memory 1804 and be utilized by the one or more processors 1802 in order to manage both communications and the functionality described herein. It should be appreciated that the organization of the contents of the medium 1820 and/or memory 1804 as shown in base station 1800 is merely exemplary, and as such the functionality of the modules and/or data structures may be combined, separated, and/or be structured in different ways depending upon the implementation of the base station 1800.

The medium 1820 and/or memory 1804 may include a PTRS positioning unit 1822 that that when implemented by the one or more processors 1802 configures the one or more processors 1802 to perform positioning measurements from PTRS signals received from a UE, e.g., via transceiver 1810. The PTRS positioning unit 1822 may further configure the one or more processors 1802 to request PTRS for positioning, e.g., via transceiver 1810, if phase noise is detected in UL PRS. Additionally, the PTRS positioning unit 1822 may further configure the one or more processors 1802 to transmit PTRS for positioning in DL PRS, e.g., via transceiver 1810.

The medium 1820 and/or memory 1804 may include an PTRS and PRS positioning unit 1824 that that when implemented by the one or more processors 1802 configures the one or more processors 1802 to perform positioning measurements from PTRS and PRS signals received from a UE, e.g., via transceiver 1810. The PTRS and PRS positioning unit 1824 may further configure the one or more processors 1802 to request PTRS and PRS for positioning, e.g., via transceiver 1810, if phase noise is detected in UL PRS. Additionally, the PTRS and PRS positioning unit 1824 may further configure the one or more processors 1802 to transmit PTRS and PRS for positioning in DL PRS, e.g., via transceiver 1810.

The medium 1820 and/or memory 1804 may include a comb request unit 1826 that that when implemented by the one or more processors 1802 configures the one or more processors 1802 to perform positioning measurements from PRS signals received from a UE using a specific PRS frame structure, such as comb 2 or comb 1, e.g., via transceiver 1810. The comb request unit 1826 may further configure the one or more processors 1802 to request a specific PRS frame structure, such as comb 2 or comb 1, for positioning, e.g., via transceiver 1810, if phase noise is detected in UL PRS. Additionally, the comb request unit 1826 may further configure the one or more processors 1802 to transmit a specific frame structure, such as comb 2 or comb 1, for positioning in DL PRS, e.g., via transceiver 1810.

The medium 1820 and/or memory 1804 may include a detect phase noise unit 1828 that that when implemented by the one or more processors 1802 configures the one or more processors 1802 to determine if sufficient phase noise is present in received PRS signals to impact positioning measurements, e.g., as discussed in FIGS. 6A, 6B, 7A and 7B and FIGS. 10 and 11.

The medium 1820 and/or memory 1804 may include an estimate and correct phase noise unit 1830 that that when implemented by the one or more processors 1802 configures the one or more processors 1802 to estimate the phase noise present in received PRS signals and to correct the signals for phase noise, e.g., as discussed in FIGS. 6A, 6B, 7A, 7B, 8A, and 8B, and FIG. 12.

The medium 1820 and/or memory 1804 may include a position measurements unit 1832 that that when implemented by the one or more processors 1802 configures the one or more processors 1802 to generate position measurements using the received PRS signals. In some implementations, the position measurements unit 1832 may configure the one or more processors 1802 to generate position measurements using less than all symbols in the PRS signals. For example, the position measurements may be UTDOA, UL-AoA, UL-RTOA, or Rx-Tx measurements.

The medium 1820 and/or memory 1804 may include a location information report unit 1834 that that when implemented by the one or more processors 1802 configures the one or more processors 1802 to transmit, e.g., via transceiver 1810, location information, such as position measurements and/or estimate of position to a location server.

An entity in a wireless network capable of estimating a position of a mobile device, such as base station 105, may include means for receiving reference symbols for positioning transmitted by one or more second entities in the wireless network, which may be, e.g., the wireless transceiver 1810 and antenna array 1811 and one or more processors 1802 with dedicated hardware or implementing executable code or software instructions in medium 1820 and/or memory 1804 such as the PTRS positioning unit 1822. Means for estimating phase offsets between each symbol relative to an anchor symbol in the reference symbols resulting from clock changes may be, e.g., one or more processors 1802 with dedicated hardware or implementing executable code or software instructions in medium 1820 and/or memory 1804 such as the estimate and correct phase noise unit 1830. Means for generating positioning measurements using the phase offsets in the reference symbols for estimating the position of the mobile device may be, e.g., one or more processors 1802 with dedicated hardware or implementing executable code or software instructions in medium 1820 and/or memory 1804 such as the position measurements unit 1832.

In one implementation, the means for generating positioning measurements using the phase offsets in the reference symbols may include means for correcting the phase offset between each symbol in the reference symbols based on the estimated phase offsets in the reference symbols, which may be, e.g., one or more processors 1802 with dedicated hardware or implementing executable code or software instructions in medium 1820 and/or memory 1804 such as the estimate and correct phase noise unit 1830. Means for generating positioning measurements using the corrected reference symbols for estimating the position of the mobile device may be, e.g., one or more processors 1802 with dedicated hardware or implementing executable code or software instructions in medium 1820 and/or memory 1804 such as the position measurements unit 1832.

In one implementation, the entity may include means for receiving positioning reference signals with the reference symbols, the positioning reference signals comprising a plurality of symbols where each symbol is comprised of a plurality of sub-carriers, which may be, e.g., the wireless transceiver 1810 and antenna array 1811 and one or more processors 1802 with dedicated hardware or implementing executable code or software instructions in medium 1820 and/or memory 1804 such as the PTRS & PRS positioning unit 1824. The means for generating positioning measurements using the phase offsets in the reference symbols may include means for correcting the phase offset between each symbol in the positioning reference signals based on the estimated phase offsets in the reference symbols, which may be, e.g., one or more processors 1802 with dedicated hardware or implementing executable code or software instructions in medium 1820 and/or memory 1804 such as the estimate and correct phase noise unit 1830. Means for generating positioning measurements using the corrected positioning reference signals for estimating the position of the mobile device may be, e.g., one or more processors 1802 with dedicated hardware or implementing executable code or software instructions in medium 1820 and/or memory 1804 such as the position measurements unit 1832.

In one implementation, the entity may further include means for requesting that the reference symbols are transmitted for positioning, which may be, e.g., the wireless transceiver 1810 and antenna array 1811 and one or more processors 1802 with dedicated hardware or implementing executable code or software instructions in medium 1820 and/or memory 1804 such as the PTRS positioning unit 1822. In one implementation, the entity further includes means for receiving positioning reference signals without reference symbols from the one or more second entities in the wireless network, which may be, e.g., the wireless transceiver 1810 and antenna array 1811 and one or more processors 1802 with dedicated hardware or implementing executable code or software instructions in medium 1820 and/or memory 1804 such as the PTRS & PRS positioning unit 1824. Means for determining a presence of phase noise in the received positioning reference signals without reference symbols may be, e.g., one or more processors 1802 with dedicated hardware or implementing executable code or software instructions in medium 1820 and/or memory 1804 such as the detect phase noise unit 1828.

In one implementation, the means for estimating the phase offset may include means for determining a phase of each symbol in the reference symbols, which may be, e.g., one or more processors 1802 with dedicated hardware or implementing executable code or software instructions in medium 1820 and/or memory 1804 such as the estimate and correct phase noise unit 1830. Means for determining the phase offset between each symbol relative to the anchor symbol in the reference symbols based on the phase of the each symbol in the reference symbols may be, e.g., one or more processors 1802 with dedicated hardware or implementing executable code or software instructions in medium 1820 and/or memory 1804 such as the estimate and correct phase noise unit 1830.

An entity in a wireless network capable of estimating a position of a mobile device, such as base station 105, may include means for establishing a positioning session between the mobile device and a base station in the wireless network, which may be, e.g., the wireless transceiver 1810 and antenna array 1811 and one or more processors 1802 with dedicated hardware or implementing executable code or software instructions in medium 1820 and/or memory 1804. Means for requesting positioning reference signals are transmitted with a comb value may be, e.g., the wireless transceiver 1810 and antenna array 1811 and one or more processors 1802 with dedicated hardware or implementing executable code or software instructions in medium 1820 and/or memory 1804, such as the comb request unit 1826. Means for means for receiving positioning reference signals with the comb value from a second entity in the wireless network may be, e.g., the wireless transceiver 1810 and antenna array 1811 and one or more processors 1802 with dedicated hardware or implementing executable code or software instructions in medium 1820 and/or memory 1804, such as the PRS positioning unit 1821. Means for generating positioning measurements using the positioning reference signals with the comb value for estimating the position of the mobile device may be, e.g., one or more processors 1802 with dedicated hardware or implementing executable code or software instructions in medium 1820 and/or memory 1804, such as the position measurements unit 1832.

In one implementation, the positioning reference signals with the comb value received from the second entity is a second set of positioning reference signals with a second comb value, the entity further includes means for receiving a first set of positioning reference signals from the second entity before requesting the second set positioning reference signals are transmitted with the second comb value, the first set of positioning reference signals having a first comb value that is larger than the second comb value, which may be, e.g., the wireless transceiver 1810 and antenna array 1811 and one or more processors 1802 with dedicated hardware or implementing executable code or software instructions in medium 1820 and/or memory 1804, such as the PRS positioning unit 1821. Means for determining a presence of phase noise in the first set of positioning reference signals with the first comb value, may be, e.g., one or more processors 1802 with dedicated hardware or implementing executable code or software instructions in medium 1820 and/or memory 1804, such as the detect phase noise unit 1828.

An entity in a wireless network capable of estimating a position of a mobile device, such as base station 105, may include means for receiving positioning reference signals comprising a plurality of symbols where each symbol is comprised of a plurality of sub-carriers from a second entity in the wireless network, which may be, e.g., the wireless transceiver 1810 and antenna array 1811 and one or more processors 1802 with dedicated hardware or implementing executable code or software instructions in medium 1820 and/or memory 1804 such as the PRS positioning unit 1821. Means for generating positioning measurements using less than all of the plurality of symbols in the positioning reference signals for estimating the position of the mobile device may be, e.g., one or more processors 1802 with dedicated hardware or implementing executable code or software instructions in medium 1820 and/or memory 1804 such as the position measurements unit 1832.

In one implementation, the entity further includes means for determining a presence of phase noise in the received positioning reference signals using all of the plurality of symbols, which may be, e.g., one or more processors 1802 with dedicated hardware or implementing executable code or software instructions in medium 1820 and/or memory 1804 such as the detect phase noise unit 1828. The means for determining the presence of phase noise in the received positioning reference signals using all of the plurality of symbols may include means for generating positioning measurements using all of the plurality of symbols in the positioning reference signals, which may be, e.g., one or more processors 1802 with dedicated hardware or implementing executable code or software instructions in medium 1820 and/or memory 1804 such as the position measurements unit 1832. Means for detecting phase noise in the positioning measurements using all of the plurality of symbols may be, e.g., one or more processors 1802 with dedicated hardware or implementing executable code or software instructions in medium 1820 and/or memory 1804 such as the detect phase noise unit 1828. In one implementation, the entity further includes means for using the positioning measurements generated using all of the plurality of symbols in the positioning reference signals to generate the positioning measurements using less than all of the plurality of symbols in the positioning reference signals for estimating the position of the mobile device, which may be, e.g., one or more processors 1802 with dedicated hardware or implementing executable code or software instructions in medium 1820 and/or memory 1804 such as the position measurements unit 1832. The means for using the positioning measurements generated using all of the plurality of symbols in the positioning reference signals to generate the positioning measurements using less than all of the plurality of symbols in the positioning reference signals for estimating the position of the mobile device may include means for finding a first set of alias terms in the positioning measurements generated using all of the plurality of symbols in the positioning reference signals; means for finding a second set of alias terms in the positioning measurements generated using less than all of the plurality of symbols; and means for rejecting alias terms that are not common to the first set and the second set during estimating the position of the mobile device, which may be, e.g., one or more processors 1802 with dedicated hardware or implementing executable code or software instructions in medium 1820 and/or memory 1804 such as the position measurements unit 1832.

An entity in a wireless network capable of estimating a position of a mobile device, such as base station 105, may include means for receiving positioning reference signals comprising a plurality of symbols where each symbol is comprised of a plurality of sub-carriers from a second entity in the wireless network, the plurality of symbols being staggered, which may be, e.g., the wireless transceiver 1810 and antenna array 1811 and one or more processors 1802 with dedicated hardware or implementing executable code or software instructions in medium 1820 and/or memory 1804 such as the PRS positioning unit 1821. Means for determining a phase offset between each symbol relative to an anchor symbol may be, e.g., one or more processors 1802 with dedicated hardware or implementing executable code or software instructions in medium 1820 and/or memory 1804 such as the estimate and correct phase noise unit 1830.

Means for removing phase offset from each symbol may be, e.g., one or more processors 1802 with dedicated hardware or implementing executable code or software instructions in medium 1820 and/or memory 1804 such as the estimate and correct phase noise unit 1830. Means for generating positioning measurements using the plurality of staggered symbols with removed phase offset for estimating the position of the mobile device may be, e.g., one or more processors 1802 with dedicated hardware or implementing executable code or software instructions in medium 1820 and/or memory 1804 such as the position measurements unit 1832.

In one implementation, the means for determining the phase offset between each symbol relative to the anchor symbol includes means for receiving reference symbols with the positioning reference signals, which may be, e.g., the wireless transceiver 1810 and antenna array 1811 and one or more processors 1802 with dedicated hardware or implementing executable code or software instructions in medium 1820 and/or memory 1804 such as the PTRS and PRS positioning unit 1824. Means for determining phase of the reference symbols may be, e.g., one or more processors 1802 with dedicated hardware or implementing executable code or software instructions in medium 1820 and/or memory 1804 such as the estimate and correct phase noise unit 1830. Means for determining the phase offset between each symbol relative to the anchor symbol based on a phase of the reference symbols may be, e.g., one or more processors 1802 with dedicated hardware or implementing executable code or software instructions in medium 1820 and/or memory 1804 such as the estimate and correct phase noise unit 1830. The means for determining the phase offset between each symbol relative to the anchor symbol may include means for determining for each symbol a phase ramp between sub-carriers may be, e.g., one or more processors 1802 with dedicated hardware or implementing executable code or software instructions in medium 1820 and/or memory 1804 such as the estimate and correct phase noise unit 1830. Means for determining the phase offset between each symbol relative to the anchor symbol based on the phase ramp may be, e.g., one or more processors 1802 with dedicated hardware or implementing executable code or software instructions in medium 1820 and/or memory 1804 such as the estimate and correct phase noise unit 1830.

In one implementation, the entity in a wireless network, such as base station 105, may include means for sending the positioning measurements to a location server for estimating the position of the mobile device, which may be, e.g., the wireless transceiver 1810 and antenna array 1811 and one or more processors 1802 with dedicated hardware or implementing executable code or software instructions in medium 1820 and/or memory 1804 such as the location information report unit 1834.

In one implementation (1), a method of estimating a position of a mobile device performed by an entity in a wireless network, comprising: establishing a positioning session between the mobile device and a base station in the wireless network; requesting positioning reference signals are transmitted with a comb value; receiving positioning reference signals with the comb value from a second entity in the wireless network; and generating positioning measurements using the positioning reference signals with the comb value for estimating the position of the mobile device.

There may be some implementations (2) of the above-described method (1), wherein the positioning reference signals with the comb value received from the second entity is a second set of positioning reference signals with a second comb value, the method further comprises: receiving a first set of positioning reference signals from the second entity before requesting the second set positioning reference signals are transmitted with the second comb value, the first set of positioning reference signals having a first comb value that is larger than the second comb value; determining a presence of phase noise in the first set of positioning reference signals with the first comb value; wherein requesting the second set of positioning reference signals are transmitted with the second comb value is in response to the presence of the phase noise in the first set of positioning reference signals with the first comb value.

There may be some implementations (3) of the above-described method (1), wherein the comb value is comb-2 or smaller.

There may be some implementations (4) of the above-described method (1), wherein the entity is the mobile device, and the second entity is the base station.

There may be some implementations (5) of the above-described method (4), further comprising estimating the position of the mobile device using the positioning measurements.

There may be some implementations (6) of the above-described method (1), further comprising sending the positioning measurements to a location server for estimating the position of the mobile device.

There may be some implementations (7) of the above-described method (1), wherein the entity is the base station, and the second entity is the mobile device.

In one implementation (8), an entity in a wireless network capable of estimating a position of a mobile device, comprising: an external interface for receiving and sending messages; at least one memory; and at least one processor coupled to the external interface and the at least one memory, the at least one processor configured to: establish a positioning session between the mobile device and a base station in the wireless network; request positioning reference signals are transmitted with a comb value; receive positioning reference signals with the comb value from a second entity in the wireless network; and generate positioning measurements using the positioning reference signals with the comb value for estimating the position of the mobile device.

There may be some implementations (9) of the above-described entity (8), wherein the positioning reference signals with the comb value received from the second entity is a second set of positioning reference signals with a second comb value, the at least one processor is further configured to: receive a first set of positioning reference signals from the second entity before requesting the second set positioning reference signals are transmitted with the second comb value, the first set of positioning reference signals having a first comb value that is larger than the second comb value; determine a presence of phase noise in the first set of positioning reference signals with the first comb value; wherein requesting the second set of positioning reference signals are transmitted with the second comb value is in response to the presence of the phase noise in the first set of positioning reference signals with the first comb value.

There may be some implementations (10) of the above-described entity (8), wherein the comb value is comb-2 or smaller.

There may be some implementations (11) of the above-described entity (8), wherein the entity is the mobile device, and the second entity is the base station.

There may be some implementations (12) of the above-described entity (11), wherein the at least one processor is further configured to estimate the position of the mobile device using the positioning measurements.

There may be some implementations (13) of the above-described entity (8), wherein the at least one processor is further configured to send the positioning measurements to a location server for estimating the position of the mobile device.

There may be some implementations (14) of the above-described entity (8), wherein the entity is the base station, and the second entity is the mobile device.

In one implementation (15), an entity in a wireless network capable of estimating a position of a mobile device, comprising: means for establishing a positioning session between the mobile device and a base station in the wireless network; means for requesting positioning reference signals are transmitted with a comb value; means for receiving positioning reference signals with the comb value from a second entity in the wireless network; and means for generating positioning measurements using the positioning reference signals with the comb value for estimating the position of the mobile device.

There may be some implementations (16) of the above-described entity (15), wherein the positioning reference signals with the comb value received from the second entity is a second set of positioning reference signals with a second comb value, the entity further comprises: means for receiving a first set of positioning reference signals from the second entity before requesting the second set positioning reference signals are transmitted with the second comb value, the first set of positioning reference signals having a first comb value that is larger than the second comb value; means for determining a presence of phase noise in the first set of positioning reference signals with the first comb value; wherein requesting the second set of positioning reference signals are transmitted with the second comb value is in response to the presence of the phase noise in the first set of positioning reference signals with the first comb value.

There may be some implementations (17) of the above-described entity (15), wherein the comb value is comb-2 or smaller.

There may be some implementations (18) of the above-described entity (15), wherein the entity is the mobile device, and the second entity is the base station.

There may be some implementations (19) of the above-described entity (18), further comprising means for estimating the position of the mobile device using the positioning measurements.

There may be some implementations (20) of the above-described entity (15), further comprising means for sending the positioning measurements to a location server for estimating the position of the mobile device.

There may be some implementations (21) of the above-described entity (15), wherein the entity is the base station, and the second entity is the mobile device.

In one implementation (22), a non-transitory computer readable storage medium including program code stored thereon, the program code is operable to configure at least one processor in an entity for supporting estimating a position of a mobile device, comprising: program code to establish a positioning session between the mobile device and a base station in a wireless network; program code to request positioning reference signals are transmitted with a comb value; program code to receive positioning reference signals with the comb value from a second entity in the wireless network; and program code to generate positioning measurements using the positioning reference signals with the comb value for estimating the position of the mobile device.

In one implementation (23), a method of estimating a position of a mobile device performed by an entity in a wireless network, comprising: receiving positioning reference signals comprising a plurality of symbols where each symbol is comprised of a plurality of sub-carriers from a second entity in the wireless network; and generating positioning measurements using less than all of the plurality of symbols in the positioning reference signals for estimating the position of the mobile device.

There may be some implementations (24) of the above-described method (23), further comprising: determining a presence of phase noise in the received positioning reference signals using all of the plurality of symbols; wherein generating the positioning measurements using less than all of the plurality of symbols is in response to the presence of the phase noise.

There may be some implementations (25) of the above-described method (24), wherein determining the presence of phase noise in the received positioning reference signals using all of the plurality of symbols comprises: generating the positioning measurements using all of the plurality of symbols in the positioning reference signals; and detecting phase noise in the positioning measurements using all of the plurality of symbols.

There may be some implementations (26) of the above-described method (25), further comprising using the positioning measurements generated using all of the plurality of symbols in the positioning reference signals to generate the positioning measurements using less than all of the plurality of symbols in the positioning reference signals for estimating the position of the mobile device.

There may be some implementations (27) of the above-described method (26), wherein using the positioning measurements generated using all of the plurality of symbols in the positioning reference signals to generate the positioning measurements using less than all of the plurality of symbols in the positioning reference signals for estimating the position of the mobile device comprises: finding a first set of alias terms in the positioning measurements generated using all of the plurality of symbols in the positioning reference signals; finding a second set of alias terms in the positioning measurements generated using less than all of the plurality of symbols; and rejecting alias terms that are not common to the first set and the second set during estimating the position of the mobile device.

There may be some implementations (28) of the above-described method (23), wherein the entity is the mobile device, and the second entity is a base station.

There may be some implementations (29) of the above-described method (28), further comprising estimating the position of the mobile device using the positioning measurements.

There may be some implementations (30) of the above-described method (23), further comprising sending the positioning measurements to a location server for estimating the position of the mobile device.

There may be some implementations (31) of the above-described method (23), wherein the entity is a base station, and the second entity is the mobile device.

In one implementation (32), an entity in a wireless network capable of estimating a position of a mobile device, comprising: an external interface for receiving and sending messages; at least one memory; and at least one processor coupled to the external interface and the at least one memory, the at least one processor configured to: receive positioning reference signals comprising a plurality of symbols where each symbol is comprised of a plurality of sub-carriers from a second entity in the wireless network; and generate positioning measurements using less than all of the plurality of symbols in the positioning reference signals for estimating the position of the mobile device.

There may be some implementations (33) of the above-described entity (32), wherein the at least one processor is further configured to: determine a presence of phase noise in the received positioning reference signals using all of the plurality of symbols; wherein the positioning measurements are generated using less than all of the plurality of symbols in response to the presence of the phase noise.

There may be some implementations (34) of the above-described entity (33), wherein the at least one processor is configured to determine the presence of phase noise in the received positioning reference signals using all of the plurality of symbols by being configured to: generate positioning measurements using all of the plurality of symbols in the positioning reference signals; and detect phase noise in the positioning measurements using all of the plurality of symbols.

There may be some implementations (35) of the above-described entity (34), the at least one processor is further configured to use the positioning measurements generated using all of the plurality of symbols in the positioning reference signals to generate the positioning measurements using less than all of the plurality of symbols in the positioning reference signals for estimating the position of the mobile device.

There may be some implementations (36) of the above-described entity (35), wherein the at least one processor is configured to use the positioning measurements generated using all of the plurality of symbols in the positioning reference signals to generate the positioning measurements using less than all of the plurality of symbols in the positioning reference signals for estimating the position of the mobile device by being configured to: find a first set of alias terms in the positioning measurements generated using all of the plurality of symbols in the positioning reference signals; find a second set of alias terms in the positioning measurements generated using less than all of the plurality of symbols; and reject alias terms that are not common to the first set and the second set during estimating the position of the mobile device.

There may be some implementations (37) of the above-described entity (32), wherein the entity is the mobile device, and the second entity is a base station.

There may be some implementations (38) of the above-described entity (37), wherein the at least one processor is further configured to estimate the position of the mobile device using the positioning measurements.

There may be some implementations (39) of the above-described entity (32), wherein the at least one processor is further configured to send the positioning measurements to a location server for estimating the position of the mobile device.

There may be some implementations (40) of the above-described entity (32), wherein the entity is a base station, and the second entity is the mobile device.

In one implementation (41), an entity in a wireless network capable of estimating a position of a mobile device, comprising: means for receiving positioning reference signals comprising a plurality of symbols where each symbol is comprised of a plurality of sub-carriers from a second entity in the wireless network; and means for generating positioning measurements using less than all of the plurality of symbols in the positioning reference signals for estimating the position of the mobile device.

There may be some implementations (42) of the above-described entity (41), further comprising: means for determining a presence of phase noise in the received positioning reference signals using all of the plurality of symbols; wherein the positioning measurements are generated using less than all of the plurality of symbols in response to the presence of the phase noise.

There may be some implementations (43) of the above-described entity (42), wherein the means for determining the presence of phase noise in the received positioning reference signals using all of the plurality of symbols comprises: means for generating positioning measurements using all of the plurality of symbols in the positioning reference signals; and means for detecting phase noise in the positioning measurements using all of the plurality of symbols.

There may be some implementations (44) of the above-described entity (43), further comprising means for using the positioning measurements generated using all of the plurality of symbols in the positioning reference signals to generate the positioning measurements using less than all of the plurality of symbols in the positioning reference signals for estimating the position of the mobile device.

There may be some implementations (45) of the above-described entity (44), wherein the means for using the positioning measurements generated using all of the plurality of symbols in the positioning reference signals to generate the positioning measurements using less than all of the plurality of symbols in the positioning reference signals for estimating the position of the mobile device comprises: means for finding a first set of alias terms in the positioning measurements generated using all of the plurality of symbols in the positioning reference signals; means for finding a second set of alias terms in the positioning measurements generated using less than all of the plurality of symbols; and means for rejecting alias terms that are not common to the first set and the second set during estimating the position of the mobile device.

There may be some implementations (46) of the above-described entity (41), wherein the entity is the mobile device, and the second entity is a base station.

There may be some implementations (47) of the above-described entity (46), further comprising means for estimating the position of the mobile device using the positioning measurements.

There may be some implementations (48) of the above-described entity (41), further comprising means for sending the positioning measurements to a location server for estimating the position of the mobile device.

There may be some implementations (49) of the above-described entity (41), wherein the entity is a base station, and the second entity is the mobile device.

In one implementation (50), a non-transitory computer readable storage medium including program code stored thereon, the program code is operable to configure at least one processor in an entity for supporting estimating a position of a mobile device, comprising: program code to receive positioning reference signals comprising a plurality of symbols where each symbol is comprised of a plurality of sub-carriers from a second entity in a wireless network; and program code to generate positioning measurements using less than all of the plurality of symbols in the positioning reference signals for estimating the position of the mobile device.

In one implementation (51), a method of estimating a position of a mobile device performed by an entity in a wireless network, comprising: receiving positioning reference signals comprising a plurality of symbols where each symbol is comprised of a plurality of sub-carriers from a second entity in the wireless network, the plurality of symbols being staggered; determining a phase offset between each symbol relative to an anchor symbol; removing phase offset from each symbol; generating positioning measurements using the plurality of staggered symbols with removed phase offset for estimating the position of the mobile device.

There may be some implementations (52) of the above-described method (51), wherein determining the phase offset between each symbol relative to the anchor symbol comprises: receiving reference symbols with the positioning reference signals; determining phase of the reference symbols; and determining the phase offset between each symbol relative to the anchor symbol based on a phase of the reference symbols.

There may be some implementations (53) of the above-described method (52), wherein the reference signals comprise phase tracking reference symbols.

There may be some implementations (54) of the above-described method (51), wherein determining the phase offset between each symbol relative to the anchor symbol comprises: determining for each symbol a phase ramp between sub-carriers; and determining the phase offset between each symbol relative to the anchor symbol based on the phase ramp.

There may be some implementations (55) of the above-described method (51), wherein the entity is the mobile device, and the second entity is a base station.

There may be some implementations (56) of the above-described method (55), further comprising estimating the position of the mobile device using the positioning measurements.

There may be some implementations (57) of the above-described method (51), further comprising sending the positioning measurements to a location server for estimating the position of the mobile device.

There may be some implementations (58) of the above-described method (51), wherein the entity is a base station, and the second entity is the mobile device.

In one implementation (59), an entity in a wireless network capable of estimating a position of a mobile device, comprising: an external interface for receiving and sending messages; at least one memory; and at least one processor coupled to the external interface and the at least one memory, the at least one processor configured to: receive positioning reference signals comprising a plurality of symbols where each symbol is comprised of a plurality of sub-carriers from a second entity in the wireless network, the plurality of symbols being staggered; determine a phase offset between each symbol relative to an anchor symbol; remove phase offset from each symbol; generate positioning measurements using the plurality of staggered symbols with removed phase offset for estimating the position of the mobile device.

There may be some implementations (60) of the above-described entity (59), wherein the at least one processor is configured to determine the phase offset between each symbol relative to the anchor symbol by being configured to: receive reference symbols with the positioning reference signals; determine phase of the reference symbols; and determine the phase offset between each symbol relative to the anchor symbol based on a phase of the reference symbols.

There may be some implementations (61) of the above-described entity (60), wherein the reference signals comprise phase tracking reference symbols.

There may be some implementations (62) of the above-described entity (59), wherein the at least one processor is configured to determine the phase offset between each symbol relative to the anchor symbol by being configured to: determine for each symbol a phase ramp between sub-carriers; and determine the phase offset between each symbol relative to the anchor symbol based on the phase ramp.

There may be some implementations (63) of the above-described entity (59), wherein the entity is the mobile device, and the second entity is a base station.

There may be some implementations (64) of the above-described entity (63), wherein the at least one processor is further configured to estimate the position of the mobile device using the positioning measurements.

There may be some implementations (65) of the above-described entity (59), wherein the at least one processor is further configured to send the positioning measurements to a location server for estimating the position of the mobile device.

There may be some implementations (66) of the above-described entity (59), wherein the entity is a base station, and the second entity is the mobile device.

In one implementation (67), an entity in a wireless network capable of estimating a position of a mobile device, comprising: means for receiving positioning reference signals comprising a plurality of symbols where each symbol is comprised of a plurality of sub-carriers from a second entity in the wireless network, the plurality of symbols being staggered; means for determining a phase offset between each symbol relative to an anchor symbol; means for removing phase offset from each symbol; means for generating positioning measurements using the plurality of staggered symbols with removed phase offset for estimating the position of the mobile device.

There may be some implementations (68) of the above-described entity (67), wherein the means for determining the phase offset between each symbol relative to the anchor symbol comprises: means for receiving reference symbols with the positioning reference signals; means for determining phase of the reference symbols; means for determining the phase offset between each symbol relative to the anchor symbol based on a phase of the reference symbols.

There may be some implementations (69) of the above-described entity (68), wherein the reference signals comprise phase tracking reference symbols.

There may be some implementations (70) of the above-described entity (67), wherein the means for determining the phase offset between each symbol relative to the anchor symbol comprises: means for determining for each symbol a phase ramp between sub-carriers; and means for determining the phase offset between each symbol relative to the anchor symbol based on the phase ramp.

There may be some implementations (71) of the above-described entity (67), wherein the entity is the mobile device, and the second entity is a base station.

There may be some implementations (72) of the above-described entity (71), further comprising means for estimating the position of the mobile device using the positioning measurements.

There may be some implementations (73) of the above-described entity (67), further comprising means for sending the positioning measurements to a location server for estimating the position of the mobile device.

There may be some implementations (74) of the above-described entity (67), wherein the entity is a base station, and the second entity is the mobile device.

In one implementation (75), a non-transitory computer readable storage medium including program code stored thereon, the program code is operable to configure at least one processor in an entity for supporting estimating a position of a mobile device, comprising: program code to receive positioning reference signals comprising a plurality of symbols where each symbol is comprised of a plurality of sub-carriers from a second entity in a wireless network, the plurality of symbols being staggered; program code to determine a phase offset between each symbol relative to an anchor symbol; program code to remove phase offset from each symbol; and program code to generate positioning measurements using the plurality of staggered symbols with removed phase offset for estimating the position of the mobile device.

Although the present disclosure is described in connection with specific embodiments for instructional purposes, the disclosure is not limited thereto. Various adaptations and modifications may be made to the disclosure without departing from the scope. Therefore, the spirit and scope of the appended claims should not be limited to the foregoing description.

What is claimed is:

1. A method of estimating a position of a mobile device performed by an entity in a wireless network, comprising:
receiving positioning reference signals comprising a plurality of symbols where each symbol is comprised of a plurality of sub-carriers from a second entity in the wireless network; and
generating positioning measurements using less than all of the plurality of symbols in the positioning reference signals for estimating the position of the mobile device.

2. The method of claim 1, further comprising:
determining a presence of phase noise in the received positioning reference signals using all of the plurality of symbols;
wherein generating the positioning measurements includes generating the positioning measurements using less than all of the plurality of symbols in response to the presence of the phase noise.

3. The method of claim 2, wherein determining the presence of phase noise in the received positioning reference signals using all of the plurality of symbols comprises:
generating the positioning measurements using all of the plurality of symbols in the positioning reference signals; and
detecting phase noise in the positioning measurements using all of the plurality of symbols.

4. The method of claim 3, further comprising using the positioning measurements generated using all of the plurality of symbols in the positioning reference signals to generate the positioning measurements using less than all of the plurality of symbols in the positioning reference signals for estimating the position of the mobile device.

5. The method of claim 4, wherein using the positioning measurements generated using all of the plurality of symbols in the positioning reference signals to generate the positioning measurements using less than all of the plurality of symbols in the positioning reference signals for estimating the position of the mobile device comprises:

finding a first set of alias terms in the positioning measurements generated using all of the plurality of symbols in the positioning reference signals;

finding a second set of alias terms in the positioning measurements generated using less than all of the plurality of symbols; and rejecting alias terms that are not common to the first set and the second set during estimating the position of the mobile device.

6. The method of claim 1, wherein the entity is the mobile device, and the second entity is a base station.

7. The method of claim 6, further comprising estimating the position of the mobile device using the positioning measurements.

8. The method of claim 1, further comprising sending the positioning measurements to a location server for estimating the position of the mobile device.

9. The method of claim 1, wherein the entity is a base station, and the second entity is the mobile device.

10. An entity in a wireless network capable of estimating a position of a mobile device, comprising:

an external interface for receiving and sending messages;

at least one memory; and at least one processor coupled to the external interface and the at least one memory, the at least one processor configured to:

receive positioning reference signals comprising a plurality of symbols where each symbol is comprised of a plurality of sub-carriers from a second entity in the wireless network; and generate positioning measurements using less than all of the plurality of symbols in the positioning reference signals for estimating the position of the mobile device.

11. The entity of claim 10, wherein the at least one processor is further configured to:

determine a presence of phase noise in the received positioning reference signals using all of the plurality of symbols;

wherein to generate the positioning measurements, the at least one processor is configured to generate the positioning measurements using less than all of the plurality of symbols in response to the presence of the phase noise.

12. The entity of claim 11, wherein the at least one processor is configured to determine the presence of phase noise in the received positioning reference signals using all of the plurality of symbols by being configured to:

generate positioning measurements using all of the plurality of symbols in the positioning reference signals; and detect phase noise in the positioning measurements using all of the plurality of symbols.

13. The entity of claim 12, wherein the at least one processor is further configured to use the positioning measurements generated using all of the plurality of symbols in the positioning reference signals to generate the positioning measurements using less than all of the plurality of symbols in the positioning reference signals for estimating the position of the mobile device.

14. The entity of claim 13, wherein the at least one processor is configured to use the positioning measurements generated using all of the plurality of symbols in the positioning reference signals to generate the positioning measurements using less than all of the plurality of symbols in the positioning reference signals for estimating the position of the mobile device by being configured to:

find a first set of alias terms in the positioning measurements generated using all of the plurality of symbols in the positioning reference signals;

find a second set of alias terms in the positioning measurements generated using less than all of the plurality of symbols; and reject alias terms that are not common to the first set and the second set during estimating the position of the mobile device.

15. The entity of claim 10, wherein the entity is the mobile device, and the second entity is a base station.

16. The entity of claim 15, wherein the at least one processor is further configured to estimate the position of the mobile device using the positioning measurements.

17. The entity of claim 10, wherein the at least one processor is further configured to send the positioning measurements to a location server for estimating the position of the mobile device.

18. The entity of claim 10, wherein the entity is a base station, and the second entity is the mobile device.

* * * * *